(12) United States Patent
Segami et al.

(10) Patent No.: US 12,501,185 B2
(45) Date of Patent: Dec. 16, 2025

(54) SOLID-STATE IMAGING DEVICE AND IMAGING SYSTEM

(71) Applicant: SONY SEMICONDUCTOR SOLUTIONS CORPORATION, Kanagawa (JP)

(72) Inventors: Masahiro Segami, Kanagawa (JP); Hideaki Togashi, Kanagawa (JP); Yasunori Tsukuda, Kanagawa (JP); Daisuke Nakagawa, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 153 days.

(21) Appl. No.: 18/546,638

(22) PCT Filed: Jan. 31, 2022

(86) PCT No.: PCT/JP2022/003516
§ 371 (c)(1),
(2) Date: Aug. 16, 2023

(87) PCT Pub. No.: WO2022/181215
PCT Pub. Date: Sep. 1, 2022

(65) Prior Publication Data
US 2024/0305908 A1 Sep. 12, 2024

(30) Foreign Application Priority Data
Feb. 25, 2021 (JP) .................. 2021-028642

(51) Int. Cl.
*H04N 25/705* (2023.01)
*H04N 25/40* (2023.01)
(Continued)

(52) U.S. Cl.
CPC .......... *H04N 25/705* (2023.01); *H04N 25/40* (2023.01); *H04N 25/47* (2023.01); *H10K 39/32* (2023.02)

(58) Field of Classification Search
CPC .... H04N 25/705; H04N 25/47; H04N 25/131; H04N 25/40; H04N 25/17; H10K 39/32; H01L 27/146
See application file for complete search history.

(56) References Cited

U.S. PATENT DOCUMENTS

2017/0347086 A1\* 11/2017 Watanabe ............ H04N 13/257
2022/0234594 A1\* 7/2022 Shimizu ................ G08B 25/04

FOREIGN PATENT DOCUMENTS

JP 2016-504889 A 2/2016
JP 2020-093600 A 6/2020
(Continued)

OTHER PUBLICATIONS

International Search Report and Written Opinion of PCT Application No. PCT/JP2022/003516, issued on Apr. 5, 2022, 08 pages of ISRWO.

*Primary Examiner* — Nasim N Nirjhar
(74) *Attorney, Agent, or Firm* — CHIP LAW GROUP

(57) ABSTRACT

Provided is a solid-state imaging device that includes a pixel unit, a first acquisition unit, and a second acquisition unit. The pixel unit includes a plurality of sets of a first pixel and a second pixel. The sets of the first pixel and the second pixel are arranged in a pixel region. The first pixel receives light other than visible light. The second pixel receives the visible light. The first acquisition unit acquires a first signal from the first pixel. The second acquisition unit acquires a second signal from the second pixel when an object within a predetermined distance range is detected based on the first signal.

12 Claims, 44 Drawing Sheets

(51) Int. Cl.
*H04N 25/47* (2023.01)
*H10K 39/32* (2023.01)

(56) References Cited

FOREIGN PATENT DOCUMENTS

WO     2020/027233 A1    2/2020
WO     2020/255999 A1    12/2020

* cited by examiner

R01

M02

FIG.33
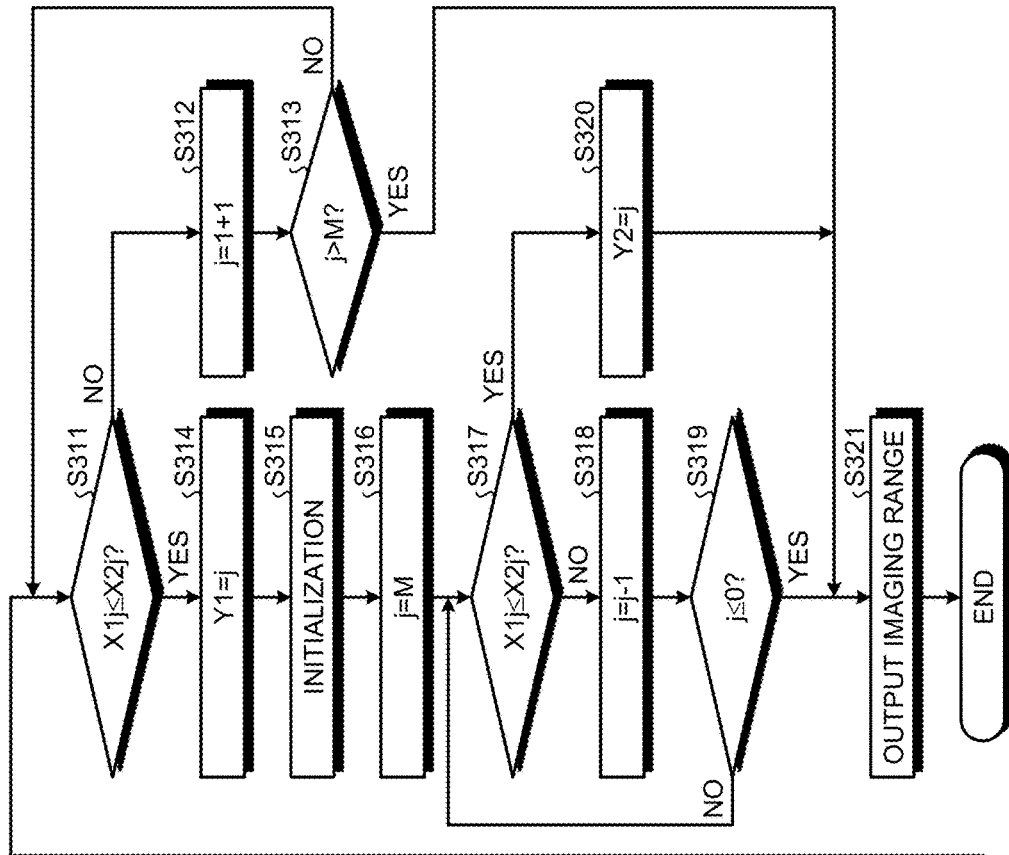
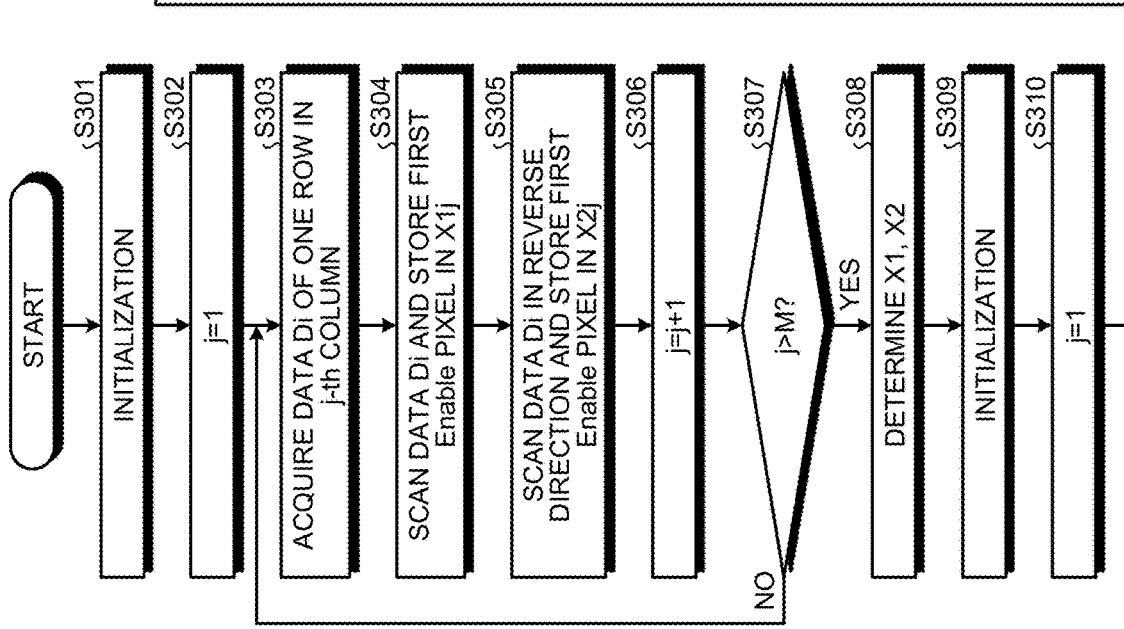

FIG.34

| HEADER | ROI IMAGE DATA (ONE OR MORE SETS) | FOOTER |

FIG.35

| HEADER | • OUTPUT START RECOGNITION INFORMATION<br>• NUMBER OF SCANNING REGIONS: K |
|---|---|
| ROI IMAGE DATA (ONE OR MORE SETS) | • SCANNING RANGE-RELATED INFORMATION 1_1 (ORIGIN COORDINATES, SIZE)<br>• IMAGE DATA D_1<br>• SCANNING RANGE-RELATED INFORMATION 1_2 (ORIGIN COORDINATES, SIZE)<br>• IMAGE DATA D_2<br>:<br>• SCANNING RANGE-RELATED INFORMATION I_K (ORIGIN COORDINATES, SIZE)<br>• IMAGE DATA D_K |
| FOOTER | • OUTPUT END RECOGNITION INFORMATION |

FIG.36

| HEADER | ·OUTPUT START RECOGNITION INFORMATION<br>·NUMBER OF SCANNING REGIONS: N<br>·SCANNING RANGE SIZE |
|---|---|
| ROI IMAGE DATA (ONE OR MORE SETS) | ·SCANNING RANGE-RELATED INFORMATION 1_1 (ORIGIN COORDINATES)<br>·IMAGE DATA D_1<br>·SCANNING RANGE-RELATED INFORMATION 1_2 (ORIGIN COORDINATES)<br>·IMAGE DATA D_2<br>:<br>·SCANNING RANGE-RELATED INFORMATION I_K (ORIGIN COORDINATES)<br>·IMAGE DATA D_K |
| FOOTER | ·OUTPUT END RECOGNITION INFORMATION |

FIG.38
FIG. 38A   BEFORE CORRECTION
FIG. 38B   ENLARGEMENT
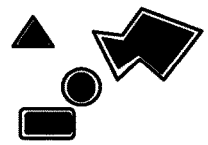
FIG. 38C   SMOOTHING
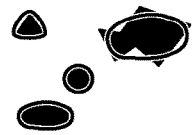
FIG. 38D   SINGLE CONNECTION
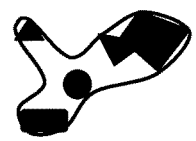
FIG. 38E   CONVEXIZATION
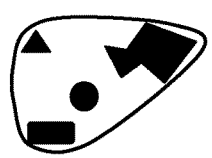
FIG. 38F   NORMALIZATION
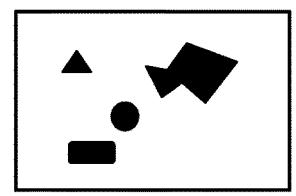

SOLID-STATE IMAGING DEVICE AND IMAGING SYSTEM

CROSS REFERENCE TO RELATED APPLICATIONS

This application is a U.S. National Phase of International Patent Application No. PCT/JP2022/003516 filed on Jan. 31, 2022, which claims priority benefit of Japanese Patent Application No. JP 2021-028642 filed in the Japan Patent Office on Feb. 25, 2021. Each of the above-referenced applications is hereby incorporated herein by reference in its entirety.

FIELD

The present disclosure relates to a solid-state imaging device and an imaging system.

BACKGROUND

In the related art, there is a technique of reading out a signal of a region of interest (ROI) to be subjected to image processing from a solid-state imaging device. In an image sensor according to the technique, for example, the ROI is determined by reading out pixels using a high-speed readout circuit having low accuracy but capable of reading out the pixels at a high speed. Next, the image sensor reads out pixels belonging to the determined ROI by a precision readout circuit capable of reading out the pixels at a low speed but with high accuracy.

CITATION LIST

Patent Literature

Patent Literature 1: JP 2016-504889 A

SUMMARY

Technical Problem

In the above technique, since it is necessary to read out pixels and perform processing on the read image in order to determine the ROI, it takes time to obtain an output image. For example, in the case of capturing an image of an object moving at a high speed, if it takes time from determination of an ROI including a desired object to acquisition of an output image, there is a possibility that capturing the image of the object cannot be performed.

Therefore, the present disclosure proposes a solid-state imaging device and an imaging system capable of further shortening the time until imaging.

It is noted that the above-described problem or object is merely one of the plurality of problems or objects that can be solved or achieved by a plurality of embodiments disclosed in the present specification.

Solution to Problem

According to the present disclosure, a solid-state imaging device is provided. The solid-state imaging device includes a pixel unit, a first acquisition unit, and a second acquisition unit. The pixel unit includes a plurality of sets of a first pixel and a second pixel. The sets of the first pixel and the second pixel are arranged in a pixel region. The first pixel receives light other than visible light. The second pixel receives the visible light. The first acquisition unit acquires a first signal from the first pixel. The second acquisition unit acquires a second signal from the second pixel when an object within a predetermined distance range is detected based on the first signal.

BRIEF DESCRIPTION OF DRAWINGS

FIG. 33 is a flowchart illustrating an example of a flow of calculation processing of the imaging range according to the embodiment of the present disclosure.

FIG. 34 is a diagram illustrating an example of a format of image data output by the solid-state imaging device according to the embodiment of the present disclosure.

FIG. 35 is a diagram illustrating an example of a format of image data output by the solid-state imaging device according to the embodiment of the present disclosure.

FIG. 36 is a diagram illustrating another example of the format of the image data output by the solid-state imaging device according to the embodiment of the present disclosure.

FIGS. 38A, 38B, 38C, 38D, 38E, and 38F are diagrams illustrating a correction example of an effective region by the solid-state imaging device according to the embodiment of the present disclosure.

DESCRIPTION OF EMBODIMENTS

Figure 1:
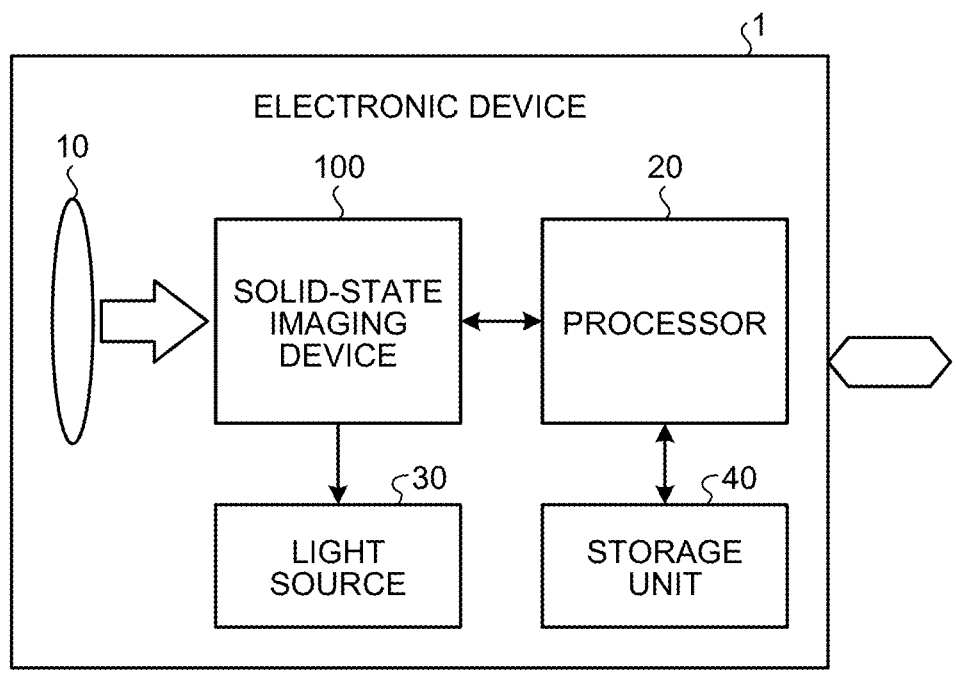
FIG. 1 is a diagram illustrating a configuration example of an imaging system according to an embodiment of the present disclosure.

Hereinafter, embodiments of the present disclosure will be described in detail with reference to the accompanying drawings. It is noted that, in the present specification and the drawings, components having substantially the same functional configuration are denoted by the same reference numerals, and redundant description is omitted.

In addition, in the present specification and the drawings, similar components of the embodiments may be distinguished by attaching different alphabets after the same reference numerals. However, in a case where it is not necessary to particularly distinguish each of similar components, only the same reference numeral is assigned.

One or more embodiments (including examples and modifications) described below can each be implemented independently. On the other hand, at least some of the plurality of embodiments described below may be appropriately combined with at least some of other embodiments to be implemented. The plurality of embodiments may include novel features different from each other. Therefore, the plurality of embodiments can contribute to solving different objects or problems, and can exhibit different effects.

It is noted that the description will be given in the following order.

1. Outline of imaging system
   1.1. Configuration example of imaging system
   1.2. Imaging processing
2. Configuration of solid-state imaging device
   2.1. Schematic configuration example of solid-state imaging device
   2.2. Configuration example of pixel array unit
   2.3. Cross-sectional structure example of unit pixel
   2.4. Circuit structure example of unit pixel
   2.5. Modification of pixel array unit
   2.6. Organic material
3. Operation example of solid-state imaging device
   3.1. Readout operation
   3.2. Detection operation
   3.3. Imaging operation
   3.4. Output format
4. Other embodiments
   4.1. Correction of effective region
   4.2. Correction of captured image
   4.3. Setting of second imaging condition
   4.4. Imaging processing by processor
5. Application example
6. Summary 1. Outline of Imaging System <1.1. Configuration Example of Imaging System>

FIG. 1 is a diagram illustrating a configuration example of an imaging system 1 according to an embodiment of the present disclosure. As illustrated in FIG. 1, the imaging system 1 includes an imaging lens 10, a solid-state imaging device 100, a light source 30, a storage unit 40, and a processor 20. The imaging system 1 is an electronic device having an imaging function, such as a camera.

The imaging lens 10 is an example of an optical system configured to condense incident light and to form an image thereof on a light receiving surface of the solid-state imaging device 100. The light receiving surface may be a surface on which photoelectric conversion elements are arranged in the solid-state imaging device 100.

The solid-state imaging device 100 includes at least two imaging units. The solid-state imaging device 100 photoelectrically converts light other than visible light (for example, infrared light) among the incident light using one imaging unit, and detects an object existing in a predetermined distance range (range of interest). Such an imaging unit is also referred to as a first imaging system.

Furthermore, the solid-state imaging device 100 photoelectrically converts visible light among the incident light using the other imaging unit to generate image data. Such an imaging unit is also referred to as a second imaging system.

The solid-state imaging device 100 executes imaging processing, detects, for example, whether or not an object exists in a predetermined distance range, and generates image data in a case where the object is detected.

The light source 30 is a laser diode, and is driven to emit, for example, laser light. As the light source 30, a vertical cavity surface emitting laser (VCSEL) that emits laser light can be applied as a surface light source. However, the light source 30 is not limited to the VCSEL, and various light sources such as a light emitting diode (LED) may be used. Furthermore, the light source 30 may be any one of a point light source, a surface light source, and a line light source. In the case of the surface light source or the line light source, the light source 30 may have, for example, a configuration in which a plurality of point light sources (for example, VCSELs) are arranged one-dimensionally or two-dimensionally. It is noted that, in the present embodiment, for example, the light source 30 may emit light of a wavelength band (light other than visible light) different from the wavelength band of visible light, such as infrared (IR) light.

The storage unit 40 is configured with, for example, a flash memory, a dynamic random access memory (DRAM), a static random access memory (SRAM), or the like, and records image data or the like input from the solid-state imaging device 100.

The processor 20 is configured using, for example, a central processing unit (CPU) or the like, and may include an application processor configured to execute an operating system, various application software, or the like, a graphics processing unit (GPU), a baseband processor, or the like. The processor 20 executes various pieces of processing as necessary on the image data input from the solid-state imaging device 100, the image data read out from the storage unit 40, and the like, executes display to a user, and transmits the image data to the outside via a predetermined network.

<1.2. Imaging Processing>

Next, an outline of imaging processing by the imaging system 1 will be described. The imaging processing is executed by, for example, the solid-state imaging device 100.

Figure 2:
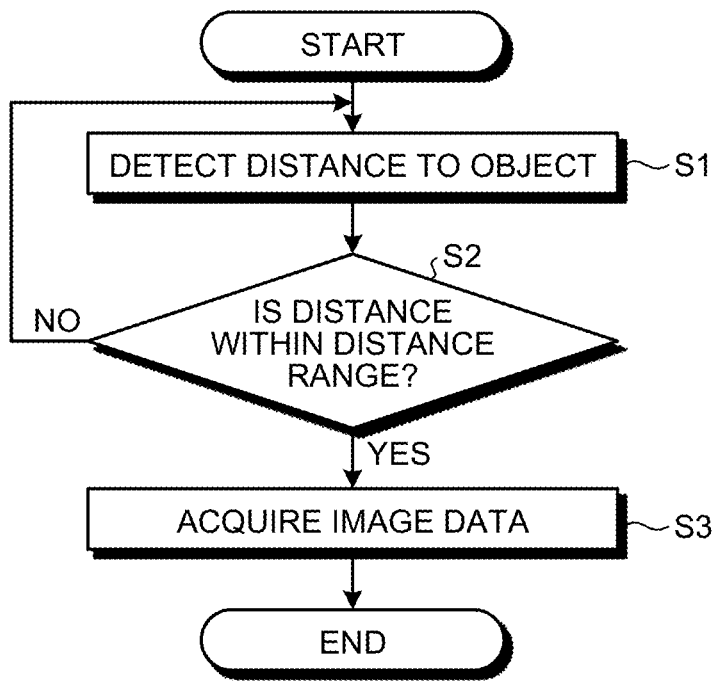
FIG. 2 is a diagram illustrating an example of imaging processing by a solid-state imaging device according to the embodiment of the present disclosure.
Figure 3:
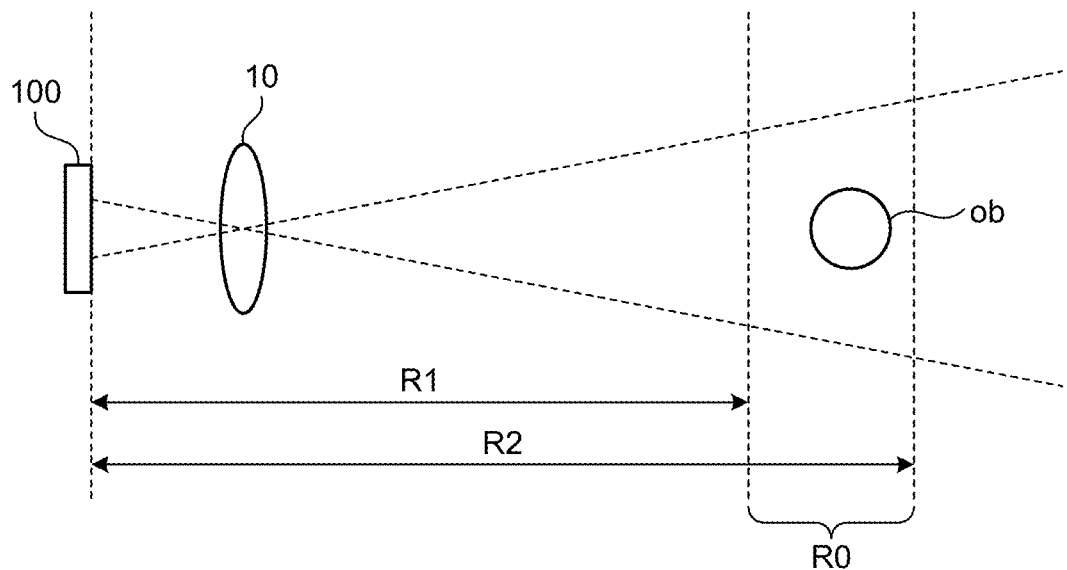
FIG. 3 is a diagram illustrating an example of imaging processing by the solid-state imaging device according to the embodiment of the present disclosure.
Figure 4:
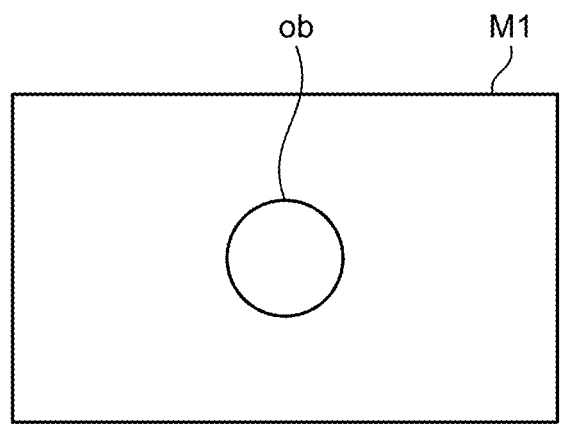
FIG. 4 is a diagram illustrating an example of imaging processing by the solid-state imaging device according to the embodiment of the present disclosure.

FIGS. 2 to 4 are diagrams illustrating an example of imaging processing by the solid-state imaging device 100 according to the embodiment of the present disclosure.

As illustrated in FIG. 2, the solid-state imaging device 100 detects an object ob existing in a predetermined distance range R0 via the imaging lens 10. Here, the distance range R0 is a range in which a distance to the light receiving surface of the solid-state imaging device 100 is between R1 and R2. As will be described later, the distance range R0 is determined, for example, in response to an instruction from the user. In addition, the imaging lens 10 is set so as to be focused on the distance range R0. It is noted that the imaging lens 10 is assumed to have a focus position set in advance by a so-called placing pin in a space where the object ob does not exist.

The solid-state imaging device 100 detects whether or not an object exists in the distance range R0. As illustrated in FIG. 3, first, the solid-state imaging device 100 detects a distance to the object using, for example, a first imaging system (distance measurement using IR) (step S1). For example, the solid-state imaging device 100 functions as a time of flight (ToF) sensor to detect a distance to an object.

Next, the solid-state imaging device 100 determines whether or not the detected distance is included in the distance range R0 (step S2). When the detected distance is not included in distance range R0 (step S2; No), the processing returns to step S1, and the solid-state imaging device 100 detects the distance to the object.

On the other hand, when the detected distance is included in the distance range R0 (step S2; Yes), the solid-state imaging device 100 performs imaging using a second imaging system (RGB imaging) to acquire image data (step S3).

For example, the solid-state imaging device 100 functions as an image sensor configured to capture an image of an RGB image to acquire image data.

As a result, the solid-state imaging device 100 captures the entire screen including the object ob, as illustrated in FIG. 2, and acquires image data M1 illustrated in FIG. 4.

Figure 5:
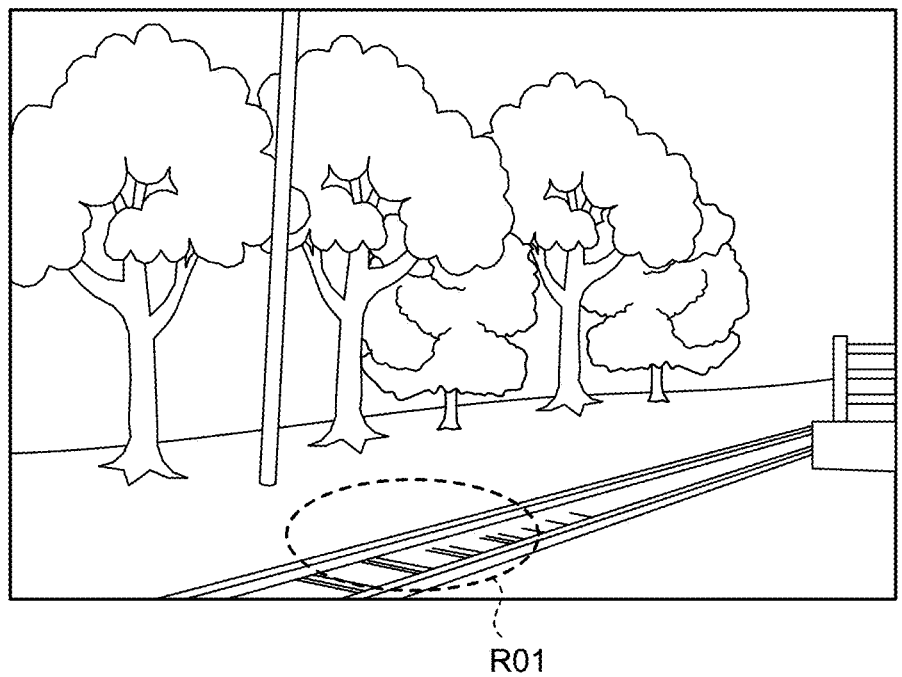
FIG. 5 is a diagram illustrating image data that can be acquired by imaging processing according to the embodiment of the present disclosure.
Figure 6:
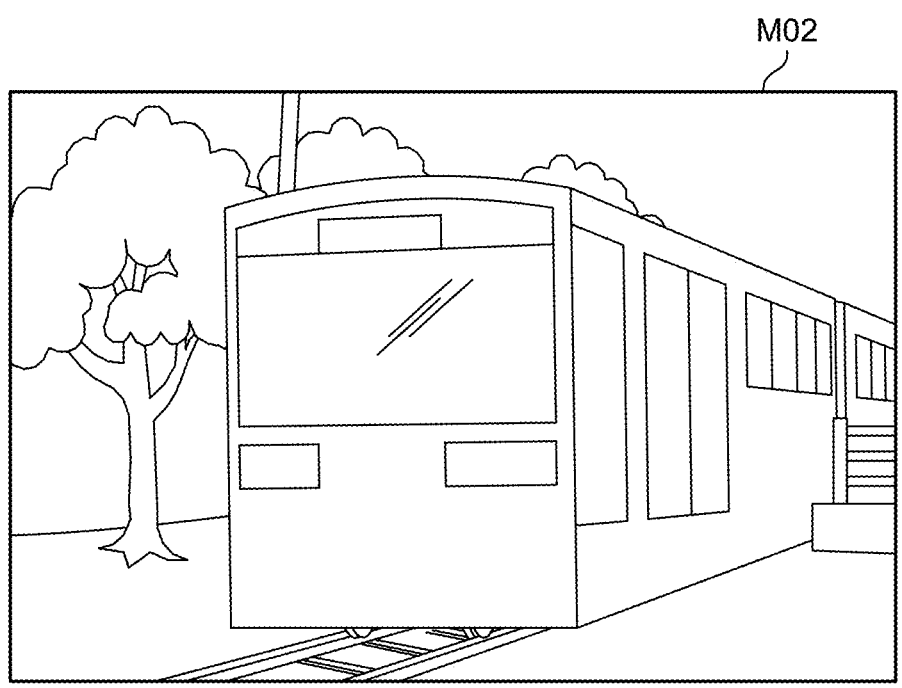
FIG. 6 is a diagram illustrating image data that can be acquired by imaging processing according to the embodiment of the present disclosure.

FIGS. 5 and 6 are diagrams illustrating image data that can be acquired by imaging processing according to the embodiment of the present disclosure.

Here, it is assumed that a distance to a track included in a region R01 indicated by a dotted line in FIG. 5 is set to the distance range R0. In this case, when an object (for example, a train) enters the distance range R0, the solid-state imaging device 100 performs imaging and acquires image data M02 as illustrated in FIG. 6.

As described above, the solid-state imaging device 100 according to the embodiment of the present disclosure can acquire the image data M02 in a case where the object exists in the distance range R0. The solid-state imaging device 100 determines whether or not an object exists in the distance range R0 by distance measurement using light other than visible light (for example, infrared light). Such determination can be performed in a shorter time than the case of determination by image processing of image data. Therefore, the solid-state imaging device 100 can further shorten the time until imaging, that is, the time from the detection of the object to the acquisition of the image data.

It is noted that, here, the imaging in the second imaging system by the solid-state imaging device 100 is performed in the maximum imaging range that can be imaged by the solid-state imaging device 100, but the present disclosure is not limited thereto. For example, an extraction region (for example, ROI) including the object ob detected by the solid-state imaging device 100 may be imaged. This point will be described with reference to FIGS. 7 and 8.

Figure 7:
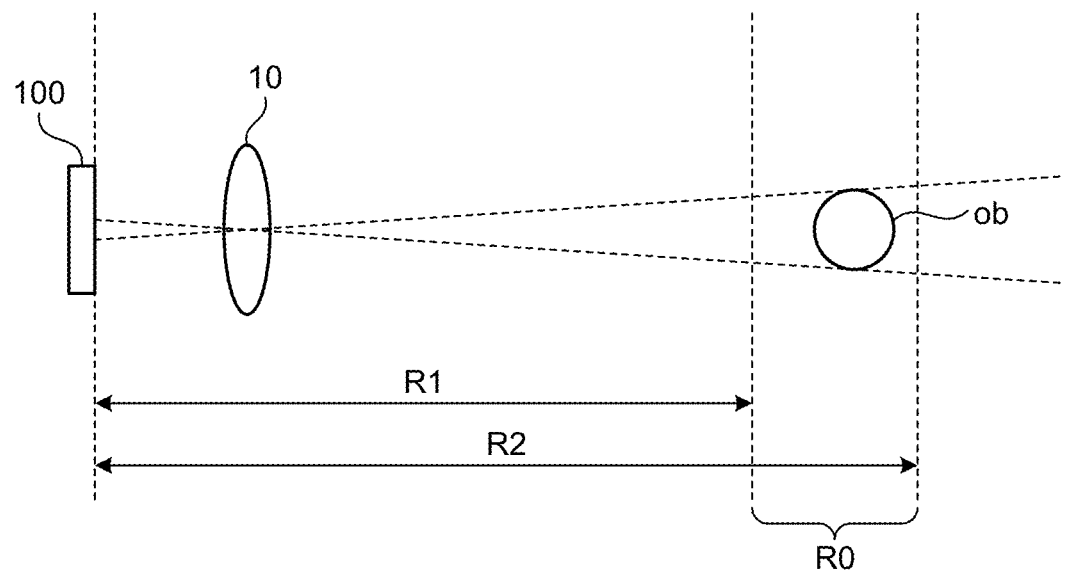
FIG. 7 is a diagram illustrating an example of imaging processing by the solid-state imaging device according to the embodiment of the present disclosure.
Figure 8:
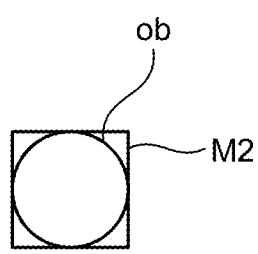
FIG. 8 is a diagram illustrating an example of imaging processing by the solid-state imaging device according to the embodiment of the present disclosure.

FIGS. 7 and 8 are diagrams illustrating an example of imaging processing by the solid-state imaging device 100 according to the embodiment of the present disclosure.

As illustrated in FIG. 7, when detecting the object ob using the first imaging system, the solid-state imaging device 100 extracts a region including the object ob on the screen as an ROI, and images the extracted ROI using the second imaging system.

As a result, the solid-state imaging device 100 can acquire image data M2 of the ROI including the object ob, as illustrated in FIG. 8.

Figure 9:
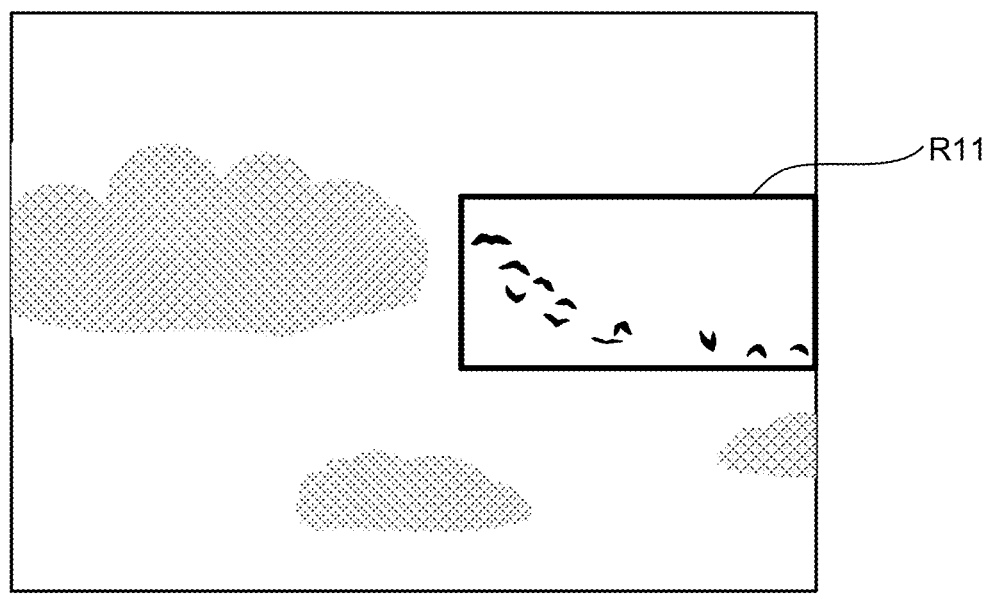
FIG. 9 is a diagram illustrating image data that can be acquired by imaging processing according to the embodiment of the present disclosure.
Figure 10:
FIG. 10 is a diagram illustrating image data that can be acquired by imaging processing according to the embodiment of the present disclosure.

FIGS. 9 and 10 are diagrams illustrating image data that can be acquired by imaging processing according to the embodiment of the present disclosure.

Here, in a case where an object is detected in a predetermined distance range R0, the solid-state imaging device 100 performs imaging in an imaging region (ROI) including the detected object.

For example, when detecting an object (flock of birds in FIG. 9) within the distance range R0, the solid-state imaging device 100 captures an image of an imaging region R11 including the object. As a result, as illustrated in FIG. 10, the solid-state imaging device 100 acquires image data M12 as a captured image of an imaging region including a flock of birds.

As described above, the solid-state imaging device 100 performs imaging only in the ROI, so that the time until imaging, that is, the time from the detection of the object to the acquisition of the image data M2 can be further shortened. Furthermore, the solid-state imaging device 100 can reduce the data amount of the image data M2 and further reduce a data output band.

2. Configuration of Solid-State Imaging Device

<2.1. Schematic Configuration Example of Solid-State Imaging Device>

Figure 11:
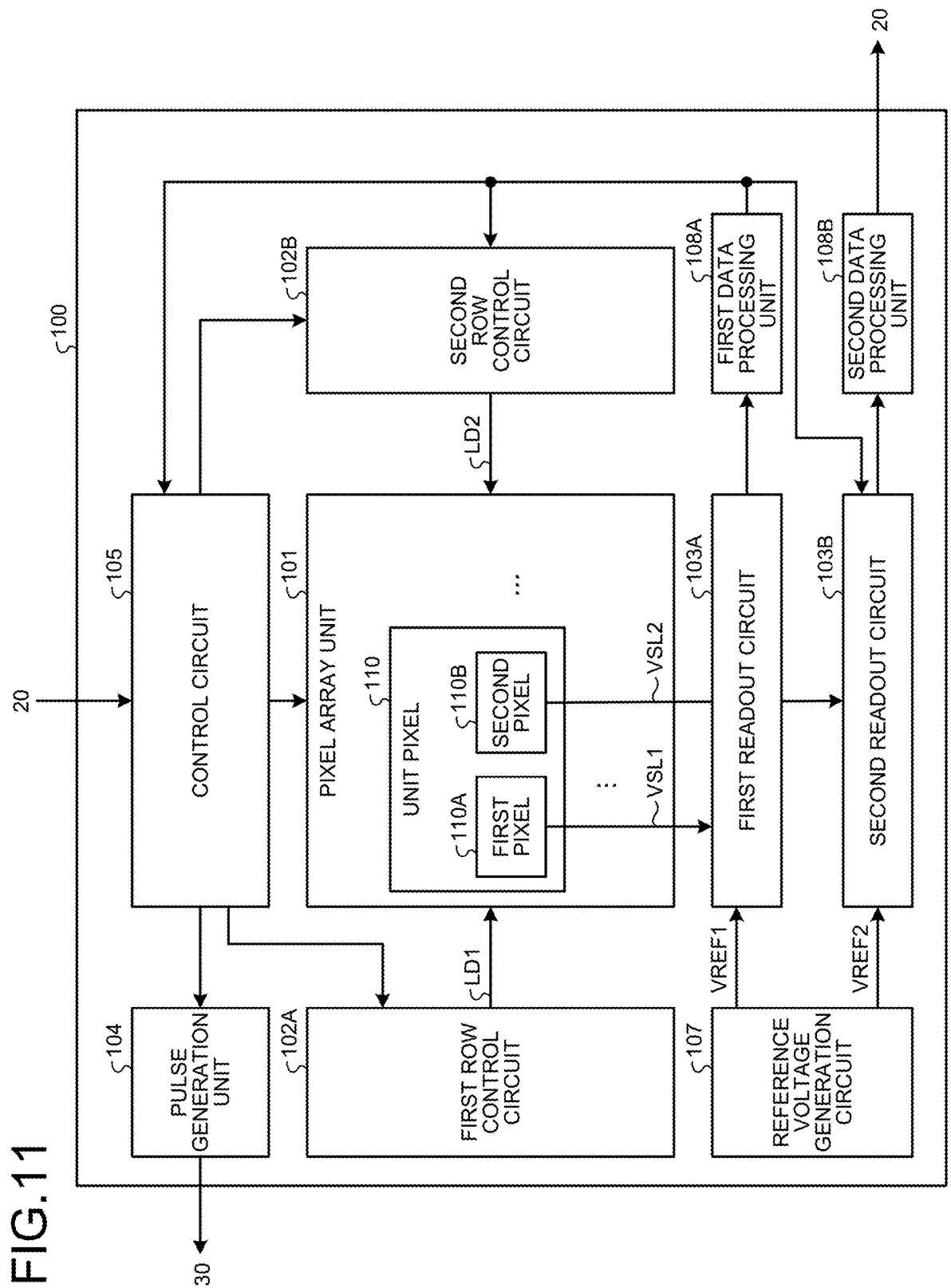
FIG. 11 is a block diagram illustrating an example of a schematic configuration of the solid-state imaging device according to the embodiment of the present disclosure.

Next, an example of the solid-state imaging device 100 will be described. FIG. 11 is a block diagram illustrating an example of a schematic configuration of the solid-state imaging device 100 according to the embodiment of the present disclosure. As illustrated in FIG. 11, the solid-state imaging device 100 includes, for example, a pixel array unit 101, a first row control circuit 102A, a second row control circuit 102B, a first readout circuit 103A, and a second readout circuit 103B. Furthermore, the solid-state imaging device 100 includes a pulse generation unit 104, a control circuit 105, a reference voltage generation circuit 107, a first data processing unit 108A, and a second data processing unit 108B.

The pixel array unit 101 has a configuration in which unit pixels 110 are arranged in a row direction and a column direction, that is, in a two-dimensional lattice shape (also referred to as a matrix shape). Here, the row direction refers to an arrangement direction of pixels in a pixel row (lateral direction in drawing), and the column direction refers to an arrangement direction of pixels in a pixel column (longitudinal direction in drawing).

Each unit pixel 110 includes a first pixel 110A and a second pixel 110B formed in a predetermined pixel region. Although details of a specific circuit configuration and a pixel structure of the unit pixel 110 will be described later, the first pixel 110A and the second pixel 110B include a photoelectric conversion element that generates and accumulates a charge according to the amount of received light, and generate a pixel signal of a voltage according to the amount of incident light. The first pixel 110A and the second pixel 110B are arranged in the vicinity of each other, such as arranged along the incident direction or arranged adjacent to each other. The first pixel 110A is an IR pixel that receives light other than visible light (for example, infrared light). Meanwhile, the second pixel 110B is an RGB pixel that receives visible light (for example, red light, green light, and blue light). In the present description, the first pixel 110A may be simply referred to as an IR pixel 110A, and the second pixel 110B may be simply referred to as an RGB pixel 110B.

In the pixel array unit 101, pixel drive lines LD1 and LD2 are wired along the row direction for each pixel row, and vertical signal lines VSL1 and VSL2 are wired along the column direction for each pixel column with respect to the matrix-shaped pixel array. For example, the pixel drive line LD1 is connected to the first pixel 110A in each row, and the pixel drive line LD2 is connected to the second pixel 110B in each row.

For example, the vertical signal line VSL1 is connected to the first pixel 110A in each column, and the vertical signal line VSL2 is connected to the second pixel 110B in each column. However, the present disclosure is not limited thereto, and the pixel drive lines LD1 and LD2 may be wired so as to be orthogonal to each other. Similarly, the vertical signal lines VSL1 and VSL2 may be wired so as to be orthogonal to each other. For example, the pixel drive line LD1 may be wired in the row direction, the pixel drive line LD2 may be wired in the column direction, the vertical signal line VSL1 may be wired in the column direction, and the vertical signal line VSL2 may be wired in the row direction.

The pixel drive line LD1 transmits a control signal for performing driving when a pixel signal is read out from the first pixel 110A. The pixel drive line LD2 transmits a control signal for performing driving when a pixel signal is read out from the second pixel 110B.

In FIG. 11, each of the pixel drive lines LD1 and LD2 is illustrated as one wiring, but the number thereof is not limited to one. One end of the pixel drive line LD1 is connected to an output end corresponding to each row of the first row control circuit 102A, and one end of the pixel drive line LD2 is connected to an output end corresponding to each row of the second row control circuit 102B.

(Drive Configuration of IR Pixel)

As will be described in detail later, the first pixel 110A includes a photoelectric conversion unit configured to photoelectrically convert incident light to generate a charge, and a pixel circuit configured to generate a pixel signal having a voltage value corresponding to the amount of charge of the charge generated in the photoelectric conversion unit. The first pixel 110A causes a pixel signal to appear in the vertical signal line VSL1 under the control of the first row control circuit 102A.

The first row control circuit 102A includes a shift register, an address decoder, and the like, and drives the first pixels 110A of the pixel array unit 101 at the same time for all pixels or on a row-by-row basis. That is, the first row control circuit 102A forms a drive unit configured to control the operation of each first pixel 110A of the pixel array unit 101 together with the control circuit 105 configured to control the first row control circuit 102A. Although a specific configuration of the first row control circuit 102A is not illustrated, the first row control circuit 102A generally includes two scanning systems of a readout scanning system and a sweep scanning system.

The readout scanning system sequentially selects and scans each pixel of the pixel array unit 101 on a row-by-row basis in order to read out a signal from each pixel. The pixel signal read out from each pixel is an analog signal. The sweep scanning system performs sweep scanning on a read row on which read scanning is performed by the readout scanning system prior to the read scanning by an exposure time.

By the sweep scanning performed by the sweep scanning system, an unnecessary charge is swept out from the photoelectric conversion element of each pixel of the read row, whereby the photoelectric conversion element is reset. Then, by sweeping out (resetting) the unnecessary charge in the sweeping scanning system, a so-called electronic shutter operation is performed. Here, the electronic shutter operation refers to an operation of discarding a charge of the photoelectric conversion element and newly starting exposure (starting accumulation of a charge).

The signal read out by the readout operation by the readout scanning system corresponds to the amount of light received after the immediately preceding readout operation or electronic shutter operation. Then, a period from the readout timing by the immediately preceding readout operation or the sweep timing by the electronic shutter operation to the readout timing by the current readout operation becomes a charge accumulation period (also referred to as an exposure period) in each pixel.

The pixel signal output from each first pixel 110A of the pixel row selectively scanned by the first row control circuit 102A is input to the first readout circuit 103A through each of the vertical signal lines VSL1 for each pixel column. The first readout circuit 103A performs predetermined signal processing on the pixel signal output from each first pixel 110A of the selected row through the vertical signal line VSL1 for each pixel column of the pixel array unit 101, and temporarily holds the pixel signal after the signal processing.

Specifically, the first readout circuit 103A performs, as the signal processing, at least noise removal processing, for example, correlated double sampling (CDS) processing or double data sampling (DDS) processing. For example, fixed pattern noise unique to the pixel such as a reset noise and a threshold variation of an amplification transistor in the pixel is removed by the CDS processing. The first readout circuit 103A also has, for example, an analog-digital (AD) conversion function, and the same converts an analog pixel signal read out from the photoelectric conversion element into a digital signal, and outputs the digital signal.

(Drive Configuration of RGB Pixel)

As will be described in detail later, the second pixel 110B includes a photoelectric conversion unit configured to photoelectrically convert incident light to generate a charge, and a pixel circuit configured to generate a pixel signal having a voltage value corresponding to the amount of charge of the charge generated in the photoelectric conversion unit. The second pixel 110B causes a pixel signal to appear in the vertical signal line VSL2 under the control of the second row control circuit 102B.

The second row control circuit 102B and the second readout circuit 103B have the same configurations as those of the first row control circuit 102A and the first readout circuit 103A except that a processing target is the second pixel 110B, and thus, the description thereof is omitted here.

(Other Configurations)

The reference voltage generation circuit 107 supplies a first reference signal VREF1 to the first readout circuit 103A, and supplies a second reference signal VREF2 to the second readout circuit 103B. The reference voltage generation circuit 107 is configured using, for example, a DA conversion circuit or the like. The first reference signal VREF1 is used as a reference signal of AD conversion performed by the first readout circuit 103A. The second reference signal VREF2 is used as a reference signal of AD conversion performed by the second readout circuit 103B.

It is noted that the first reference signal VREF1 and the second reference signal VREF2 can be set to different values for each pixel to be read out. As a result, the solid-state imaging device 100 can maintain the S/N for each pixel.

The control circuit 105 includes a timing generator configured to generate various timing signals and the like, and performs drive control of the row control circuit 102, the readout circuit 103, the pulse generation unit 104, and the like based on various timings generated by the timing generator.

Furthermore, the control circuit 105 may have a horizontal drive (column control) function. The horizontal drive function can be realized by, for example, a configuration such as a shift register or an address decoder. The readout circuits (hereinafter, referred to as pixel circuits) corresponding to the pixel columns of the readout circuit 103 are sequentially selected by the horizontal drive function. By the selective scanning by the horizontal drive function, pixel signals subjected to signal processing for each pixel circuit in the readout circuit 103 are sequentially output.

The pulse generation unit 104 generates a drive pulse signal for driving the light source 30 under the control of the control circuit 105. The pulse generation unit 104 outputs the generated drive pulse signal to the light source 30. Thus, the light source 30 emits, for example, infrared light.

The first data processing unit 108A has at least an arithmetic processing function, and the same performs various signal processing such as arithmetic processing on the pixel signal output from the first readout circuit 103A. For example, the first data processing unit 108A detects an object within the distance range R0, and determines an imaging region (ROI) of the second imaging system according to a detection result. The first data processing unit 108A is a first acquisition unit configured to acquire a pixel signal (first signal) from the first pixel 110A via the first readout circuit 103A.

The first data processing unit 108A outputs information on the determined imaging region (hereinafter, referred to as ROI information) to the second row control circuit 102B, the second readout circuit 103B, and the control circuit 105.

The second data processing unit 108B has at least an arithmetic processing function, and the same performs various signal processing such as arithmetic processing on the pixel signal output from the second readout circuit 103B. As will be described later, the second data processing unit 108B is a second acquisition unit configured to acquire a pixel signal (second signal) from the second pixel 110B via the second readout circuit 103B in a case where an object in the distance range R0 is detected. The second data processing unit 108B outputs the image data generated by performing the signal processing to the processor 20. For example, the image data may be subjected to predetermined processing in the processor 20 (refer to FIG. 1) or the like in the imaging system 1 including the solid-state imaging device 100, or may be transmitted to the outside via a predetermined network.

It is noted that the solid-state imaging device 100 may include a storage unit configured to temporarily store data necessary for signal processing in the data processing unit 108, data processed by any one or more of the readout circuit 103 and the data processing unit 108, and the like.

(Modification of Device Configuration)

It is noted that the configuration of the solid-state imaging device 100 is not limited to the example of FIG. 11. For example, some functions and configurations of the first imaging system and the second imaging system can be shared.

Figure 12:
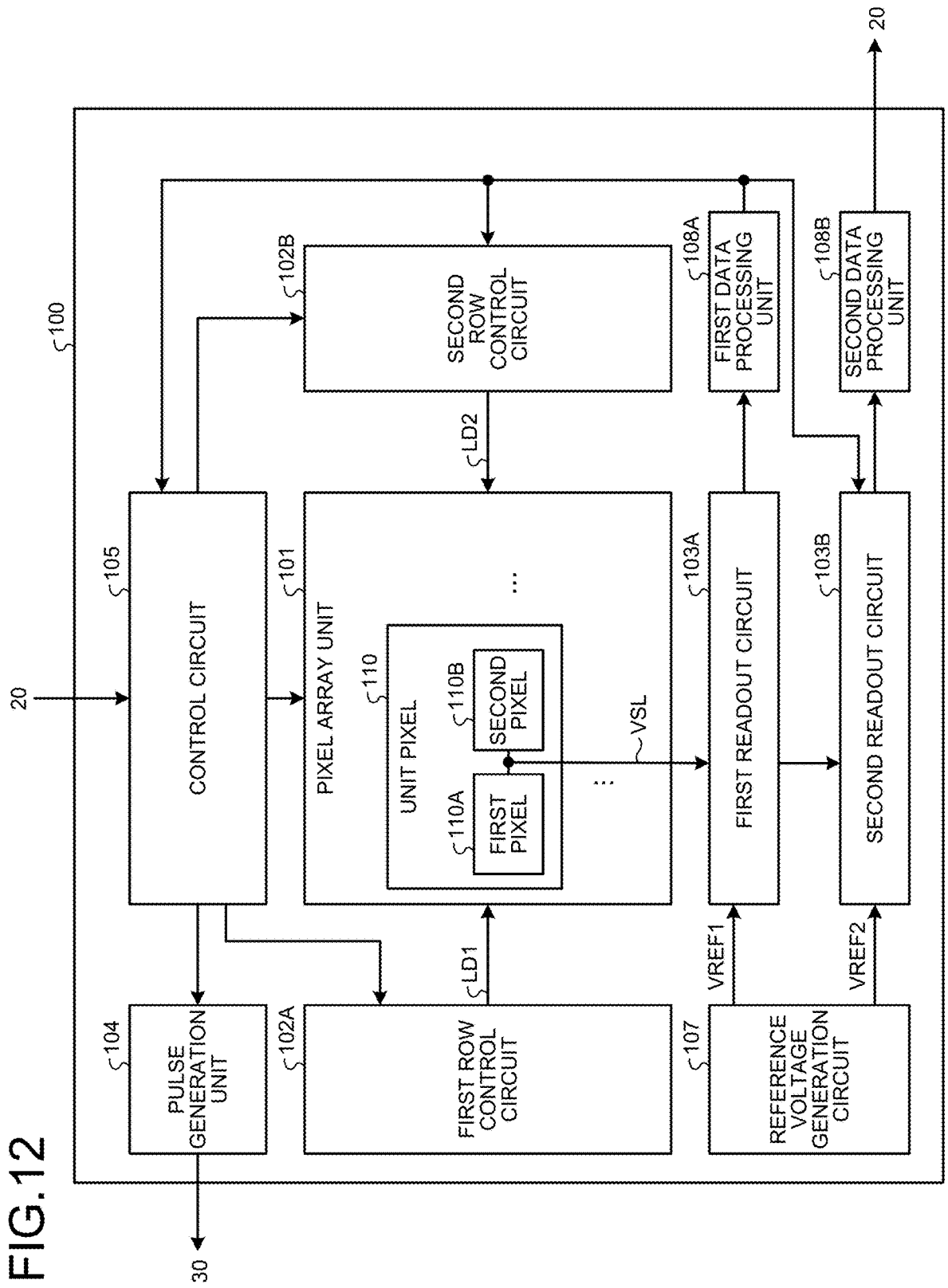
FIG. 12 is a block diagram illustrating another example of the schematic configuration of the solid-state imaging device according to the embodiment of the present disclosure.

FIG. 12 is a block diagram illustrating another example of the schematic configuration of the solid-state imaging device 100 according to the embodiment of the present disclosure. A solid-state imaging device 100 illustrated in FIG. 12 is different from the solid-state imaging device 100 in FIG. 11 in that a vertical signal line VSL is wired along the column direction for each pixel column instead of the vertical signal lines VSL1 and VSL2. That is, in the solid-state imaging device 100 illustrated in FIG. 12, the first pixel 110A and the second pixel 110B share the vertical signal line VSL. The solid-state imaging device 100 reads out the pixel signal from the first pixel 110A and reads out the pixel signal from the second pixel 110B in a time division manner via the vertical signal line VSL.

As a result, the wiring of the solid-state imaging device 100 can be reduced, and a pixel pitch can be reduced.

Figure 13:
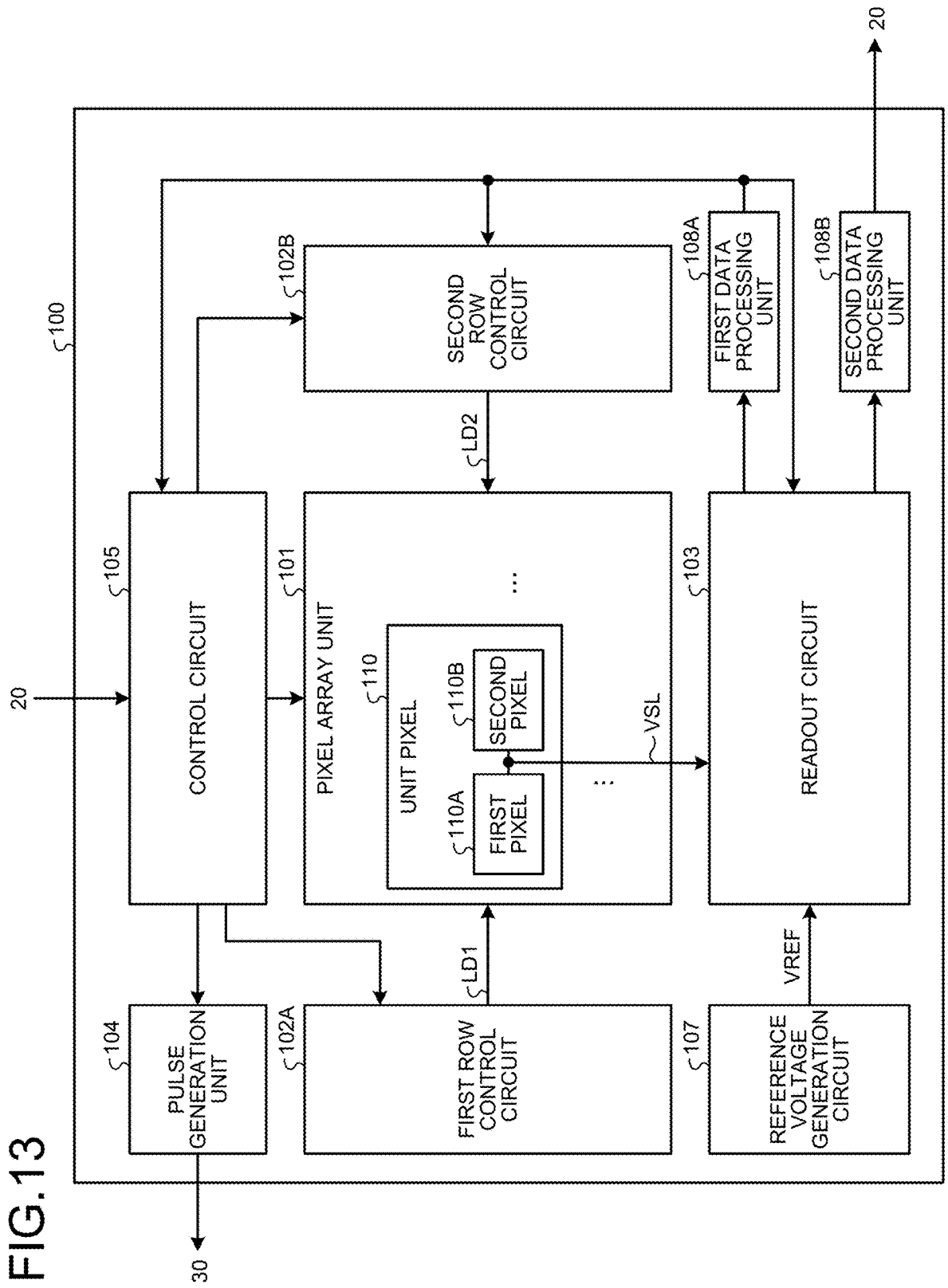
FIG. 13 is a block diagram illustrating another example of the schematic configuration of the solid-state imaging device according to the embodiment of the present disclosure.

FIG. 13 is a block diagram illustrating another example of the schematic configuration of the solid-state imaging device 100 according to the embodiment of the present disclosure. The solid-state imaging device 100 illustrated in FIG. 13 is different from the solid-state imaging device 100 in FIG. 12 in that a readout circuit 103 is provided instead of the first readout circuit 103A and the second readout circuit 103B. That is, in the solid-state imaging device 100 illustrated in FIG. 13, the first pixel 110A and the second pixel 110B share the readout circuit 103. The solid-state imaging device 100 executes reading of the pixel signal by the readout circuit 103 and reading of the first pixel 110A and the second pixel 110B in a time division manner.

As a result, the solid-state imaging device 100 can reduce the area of the peripheral circuit of the pixel array unit 101.

<2.2. Configuration Example of Pixel Array Unit>

Next, a configuration example of the pixel array unit 101 will be described. It is noted that, here, a description will be given, as an example, as to a case in which the unit pixel 110 includes the RGB pixel 110B for acquiring a color image of three primary colors of RGB and the IR pixel 110A for acquiring a monochrome image of infrared (IR) light. In addition, in FIG. 14 and the following descriptions, when color filters 31$r$, 31$g$, or 31$b$ configured to transmit the light of the respective color components forming RGB three primary colors are not distinguished, the reference numeral is 31.

Figure 14:
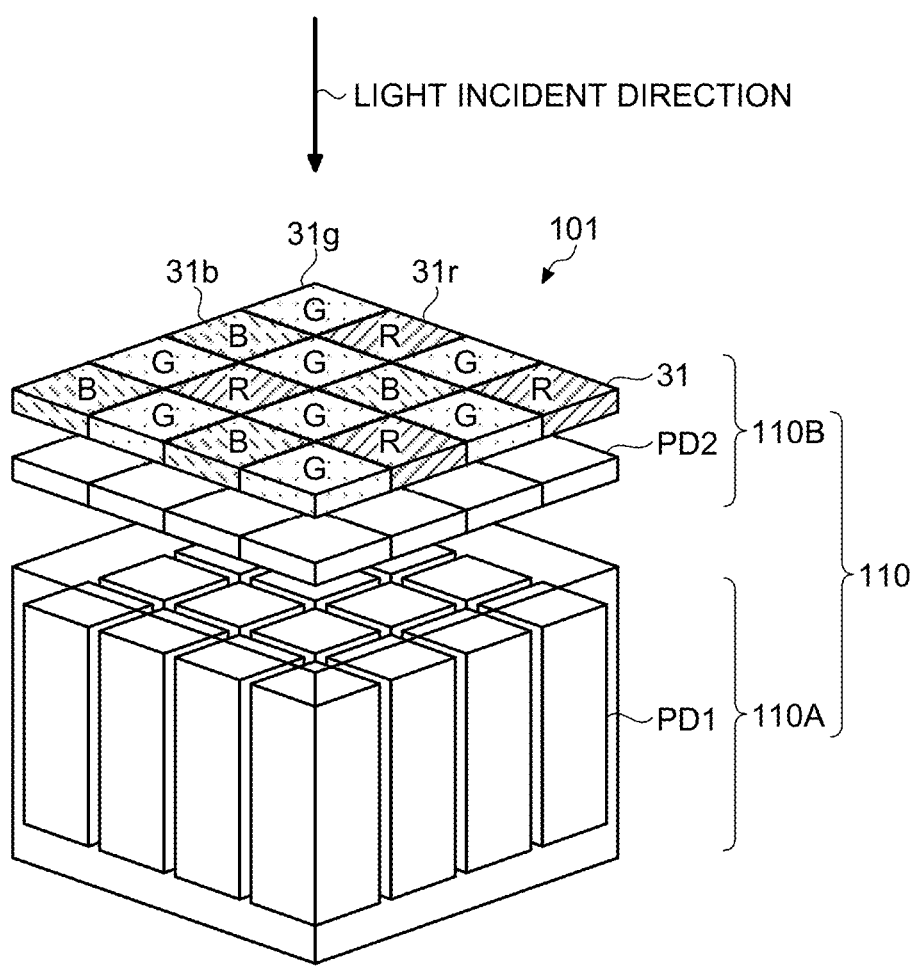
FIG. 14 is a schematic diagram illustrating a schematic configuration example of a pixel array unit according to the embodiment of the present disclosure.

FIG. 14 is a schematic diagram illustrating a schematic configuration example of the pixel array unit 101 according to the embodiment of the present disclosure. As illustrated in FIG. 14, the pixel array unit 101 has a structure in which the unit pixels 110 including the RGB pixel 110B and the IR pixel 110A are arranged along the light incident direction. Furthermore, the unit pixels 110 are arranged in a two-dimensional lattice pattern. That is, in FIG. 14, the RGB pixel 110B and the IR pixel 110A are positioned in a direction perpendicular to the arrangement direction (planar direction) of the unit pixels 110. Thus, in the present embodiment, the light transmitted through the RGB pixel 110B located on the upstream side in the optical path of the incident light is incident on the IR pixel 110A located on the downstream side of the RGB pixel 110B. According to such a configuration, a photoelectric conversion unit PD1 of the IR pixel 110A is arranged on the surface side opposite the incident surface of the incident light in a photoelectric conversion unit PD2 of the RGB pixel 110B. As a result, in the present embodiment, the optical axes of the incident light of the RGB pixel 110B and the IR pixel 110A arranged along the light incident direction coincide or substantially coincide with each other.

It is noted that FIG. 14 illustrates a case in which the photoelectric conversion unit PD2 forming the RGB pixel 110B is made of an organic material, and the photoelectric conversion unit PD1 forming the IR pixel 110A is made of a semiconductor material such as silicon, but the present disclosure is not limited thereto. For example, both the photoelectric conversion unit PD1 and the photoelectric conversion unit PD2 may be made of a semiconductor material, both the photoelectric conversion unit PD1 and the photoelectric conversion unit PD2 may be made of an organic material, or the photoelectric conversion unit PD2 may be made of a semiconductor material and the photoelectric conversion unit PD1 may be made of an organic material. Alternatively, at least one of the photoelectric conversion unit PD1 and the photoelectric conversion unit PD2 may be made of a photoelectric conversion material different from the organic material and the semiconductor material.

<2.3. Cross-Sectional Structure Example of Unit Pixel>

Figure 15:
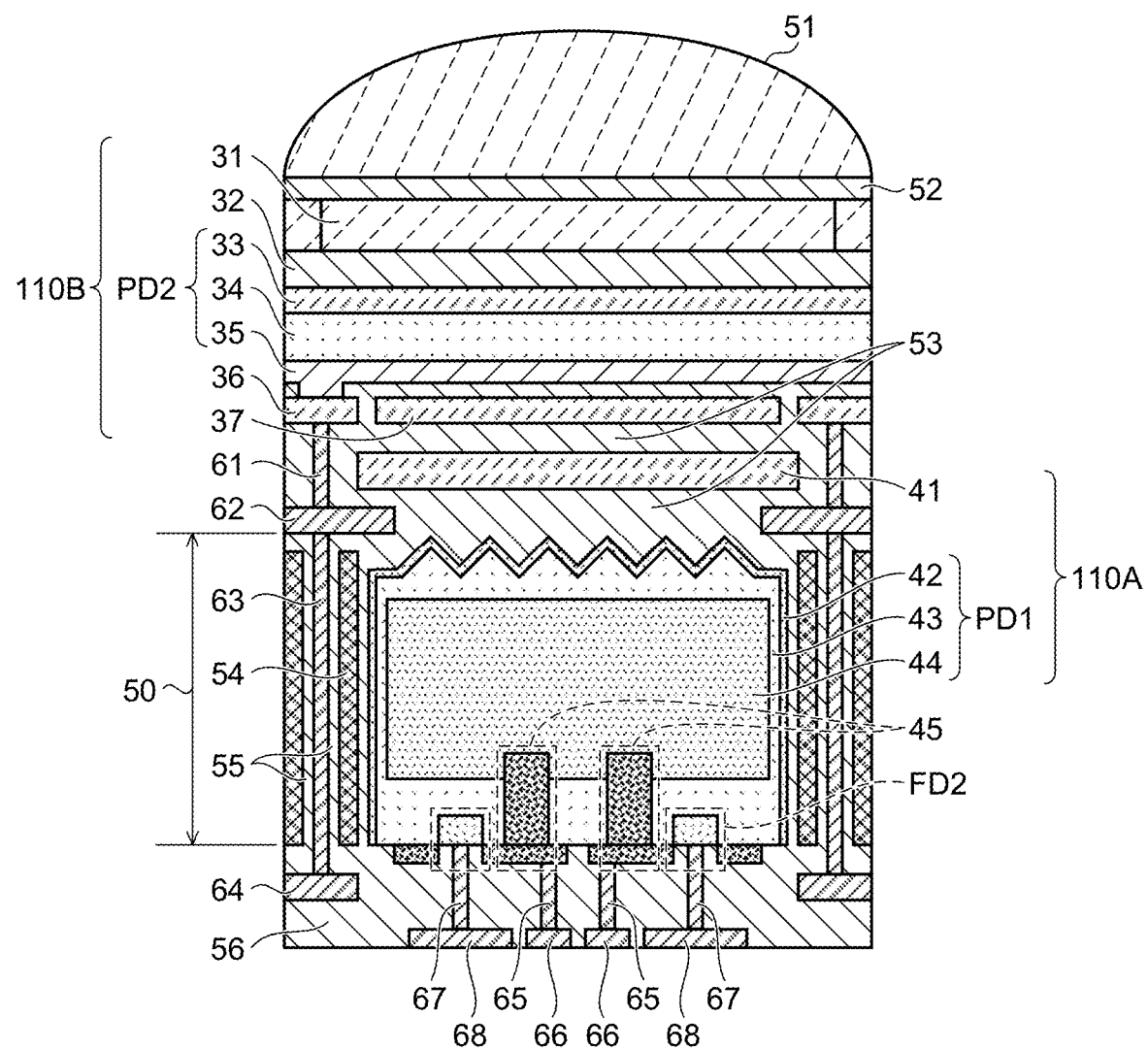
FIG. 15 is a cross-sectional view illustrating a cross-sectional structure example of the solid-state imaging device according to the embodiment of the present disclosure.

Next, a cross-sectional structure example of the solid-state imaging device 100 according to the embodiment of the present disclosure will be described with reference to FIG. 15. FIG. 15 is a cross-sectional view illustrating a cross-sectional structure example of the solid-state imaging device 100 according to the embodiment of the present disclosure. Here, a cross-sectional structure example will be described focusing on a semiconductor chip in which the photoelectric conversion units PD1 and PD2 in the unit pixel 110 are formed.

In addition, in the following descriptions, a so-called back surface irradiation type cross-sectional structure in which the light incident surface is on the back surface side (opposite side to the element formation surface) of a semiconductor substrate 50 is exemplified, but the present disclosure is not limited thereto, and a so-called front surface irradiation type cross-sectional structure in which the light incident surface is on the front surface side (element formation surface side) of the semiconductor substrate 50 may be used. Furthermore, in the present description, a case in which an organic material is used for the photoelectric conversion unit PD2 of the RGB pixel 110B will be exemplified, but as described above, one or both of an organic material and a semiconductor material (also referred to as an inorganic material) may be used as the photoelectric conversion material of each of the photoelectric conversion units PD1 and PD2.

It is noted that, in a case where a semiconductor material is used for both the photoelectric conversion material of the photoelectric conversion unit PD2 and the photoelectric conversion material of the photoelectric conversion unit PD1, the solid-state imaging device 100 may have a cross-sectional structure in which the photoelectric conversion unit PD2 and the photoelectric conversion unit PD1 are built in the same semiconductor substrate 50, may have a cross-sectional structure in which the semiconductor substrate in which the photoelectric conversion unit PD2 is built and the semiconductor substrate in which the photoelectric conversion unit PD1 is built are bonded to each other, or may have a cross-sectional structure in which one of the photoelectric conversion units PD1 and PD2 is built in the semiconductor substrate 50 and the other is built in a semiconductor layer formed on the back surface or the front surface of the semiconductor substrate 50.

As illustrated in FIG. 15, the present embodiment has a structure in which the photoelectric conversion unit PD1 of the IR pixel 110A is formed on the semiconductor substrate 50, and the photoelectric conversion unit PD2 of the RGB pixel 110B is provided on the back surface side (opposite side to the element formation surface) of the semiconductor substrate 50. In FIG. 15, for convenience of description, the back surface of the semiconductor substrate 50 is located on the upper side in the plane of drawing, and the front surface is located on the lower side.

For the semiconductor substrate 50, for example, a semiconductor material such as silicon (Si) may be used. However, the semiconductor material is not limited thereto, and various semiconductor materials including compound semiconductors such as GaAs, InGaAs, InP, AlGaAs, InGaP, AlGaInP, and InGaAsP may be used.

(RGB Pixel 110B)

The photoelectric conversion unit PD2 of the RGB pixel 110B is provided on the back surface side of the semiconductor substrate 50 with an insulating layer 53 interposed therebetween. The photoelectric conversion unit PD2 includes, for example, a photoelectric conversion film 34 made of an organic material, and a transparent electrode 33 and a semiconductor layer 35 arranged so as to sandwich the photoelectric conversion film 34. The transparent electrode 33 provided on the upper side in the plane of drawing with respect to the photoelectric conversion film 34 (hereinafter, the upper side in the plane of drawing is defined as the upper surface side, and the lower side is defined as the lower surface side) functions as, for example, an anode of the photoelectric conversion unit PD2, and the semiconductor layer 35 provided on the lower surface side functions as a cathode of the photoelectric conversion unit PD2.

The semiconductor layer 35 functioning as a cathode is electrically connected to a readout electrode 36 formed in the insulating layer 53. The readout electrode 36 is electrically extended to the front surface (lower surface) side of the semiconductor substrate 50 by being connected to wirings 61, 62, 63, and 64 penetrating the insulating layer 53 and the semiconductor substrate 50. Although not illustrated in FIG. 15, the wiring 64 is electrically connected to a floating diffusion region FD1 illustrated in FIG. 4.

An accumulation electrode 37 is provided on the lower surface side of the semiconductor layer 35 functioning as a cathode with the insulating layer 53 interposed therebetween. Although not illustrated in FIG. 15, the accumulation electrode 37 is connected to a transfer control line in the pixel drive line LD. As described above, at the time of exposure, a voltage for collecting charges generated in the photoelectric conversion unit PD2 to the semiconductor layer 35 in the vicinity of the accumulation electrode 37 is applied, and at the time of readout, a voltage for causing the charges collected in the semiconductor layer 35 in the vicinity of the accumulation electrode 37 to flow out via the readout electrode 36 is applied.

Similarly to the transparent electrode 33, the readout electrode 36 and the accumulation electrode 37 may be transparent conductive films. For example, a transparent conductive film such as indium tin oxide (ITO) or zinc oxide (IZO) may be used for the transparent electrode 33, the readout electrode 36, and the accumulation electrode 37. However, the present disclosure is not limited thereto, and various conductive films may be used as long as the photoelectric conversion unit PD1 is a conductive film capable of transmitting light in a wavelength band to be detected.

Further, for the semiconductor layer 35, for example, a transparent semiconductor layer such as IGZO may be used. However, the present disclosure is not limited thereto, and various semiconductor layers may be used as long as the photoelectric conversion unit PD1 is a semiconductor layer capable of transmitting light in a wavelength band to be detected.

Furthermore, as the insulating layer 53, for example, an insulating film such as a silicon oxide film ($SiO_2$) or a silicon nitride film (SiN) may be used. However, the present disclosure is not limited thereto, and various insulating films may be used as long as the photoelectric conversion unit PD1 is an insulating film capable of transmitting light in a wavelength band to be detected.

A color filter 31 is provided on the upper surface side of the transparent electrode 33 functioning as an anode with a sealing film 32 interposed therebetween. The sealing film 32 is made of, for example, an insulating material such as silicon nitride (SiN), and the same may include atoms of aluminum (Al), titanium (Ti), and the like in order to prevent the atoms from diffusing from the transparent electrode 33.

Although the arrangement of the color filters 31 will be described later, for example, the color filter 31 configured to selectively transmit light of a specific wavelength component is provided for one RGB pixel 110B. However, in a case where a monochrome pixel that acquires luminance information is provided instead of the RGB pixel 110B that acquires color information, the color filter 31 may be omitted.

(IR Pixel 110A)

The photoelectric conversion unit PD1 of the IR pixel 110A includes, for example, a p-type semiconductor region 43 formed in a p-well region 42 in the semiconductor substrate 50 and an n-type semiconductor region 44 formed near the center of the p-type semiconductor region 43. The n-type semiconductor region 44 functions as, for example, a charge accumulation region that accumulates a charge (an electron) generated by photoelectric conversion, and the p-type semiconductor region 43 functions as a region that forms a potential gradient for collecting the charge generated by photoelectric conversion into the n-type semiconductor region 44.

For example, an IR filter 41 configured to selectively transmit IR light is disposed on the light incident surface side of the photoelectric conversion unit PD1. The IR filter 41 may be disposed, for example, in the insulating layer 53 provided on the back surface side of the semiconductor substrate 50. By disposing the IR filter 41 on the light incident surface of the photoelectric conversion unit PD1, it is possible to suppress the incidence of visible light on the photoelectric conversion unit PD1, and as such, it is possible to improve the S/N ratio of IR light to visible light. Accordingly, it is possible to obtain a more accurate detection result of IR light.

For example, a fine uneven structure is provided on the light incident surface of the semiconductor substrate 50 in order to suppress reflection of incident light (IR light in this example). This uneven structure may be a structure called a moth-eye structure, or may be an uneven structure having a size and a pitch different from those of the moth-eye structure.

A vertical transistor 45 functioning as a transfer transistor 21 and a floating diffusion region FD2 functioning as a charge accumulation unit are provided on the front surface (lower surface in the plane of drawing) side of the semiconductor substrate 50, that is, the element formation surface side. The gate electrode of the vertical transistor 45 reaches the n-type semiconductor region 44 from the front surface of the semiconductor substrate 50, and the same is connected to the row control circuit 102 via wirings 65 and 66 (part of the transfer control line of the pixel drive line LD) formed in an interlayer insulating film 56.

The charge flowing out through the vertical transistor 45 is accumulated in the floating diffusion region FD2. The floating diffusion region FD2 is connected to the source of a reset transistor 22 and the gate of an amplification transistor 23 via wirings 67 and 68 formed in the interlayer insulating film 56. It is noted that the reset transistor 22, the amplification transistor 23, and a selection transistor 24 may be provided on the element formation surface of the semiconductor substrate 50, or the same may be provided on a semiconductor substrate different from the semiconductor substrate 50.

It is noted that FIG. 15 illustrates a case in which two vertical transistors 45 (transfer transistors 21) are provided for one photoelectric conversion unit PD1, but the present disclosure is not limited thereto, and one vertical transistor 45 may be provided, or three or more vertical transistors 45 may be provided. Similarly, a case where two floating diffusion regions FD2 are provided for one photoelectric conversion unit PD1 is exemplified, but the present disclosure is not limited thereto, and one floating diffusion region FD2 may be provided, or three or more floating diffusion regions FD2 may be provided.

(Pixel Isolation Structure)

The semiconductor substrate 50 is provided with a pixel isolation unit 54 configured to electrically isolate the plurality of unit pixels 110 from each other, and the photoelectric conversion unit PD1 is provided in each region partitioned by the pixel isolation unit 54. For example, in a case where the solid-state imaging device 100 is viewed from the back surface (upper surface in the drawing) side of the semiconductor substrate 50, the pixel isolation unit 54 has, for example, a lattice shape interposed between the plurality of unit pixels 110, and each photoelectric conversion unit PD1 is formed in each region partitioned by the pixel isolation unit 54.

For the pixel isolation unit 54, for example, a reflection film that reflects light such as tungsten (W) or aluminum (Al) may be used. As a result, the incident light entering the photoelectric conversion unit PD1 can be reflected by the pixel isolation unit 54, so that the optical path length of the incident light in the photoelectric conversion unit PD1 can be increased. In addition, since the pixel isolation unit 54 has a light reflection structure, it is possible to reduce leakage of light to adjacent pixels, and thus, it is also possible to further improve image quality, distance measurement accuracy, and the like. It is noted that the configuration in which the pixel isolation unit 54 has the light reflection structure is not limited to the configuration using the reflection film, and can be realized, for example, by using a material having a refractive index different from that of the semiconductor substrate 50 for the pixel isolation unit 54.

For example, a fixed charge film 55 is provided between the semiconductor substrate 50 and the pixel isolation unit 54. The fixed charge film 55 is formed using, for example, a high dielectric material having a negative fixed charge so that a positive charge (hole) accumulation region is formed at an interface portion with the semiconductor substrate 50 and generation of a dark current is suppressed. Since the fixed charge film 55 is formed to have a negative fixed charge, an electric field is applied to an interface with the semiconductor substrate 138 by the negative fixed charge, and the positive charge (hole) accumulation region is formed.

The fixed charge film 55 can be formed of, for example, a hafnium oxide film (HfO2 film). In addition, the fixed charge film 55 can be formed to contain at least one of oxides such as hafnium, zirconium, aluminum, tantalum, titanium, magnesium, yttrium, and lanthanoid elements.

It is noted that FIG. 15 illustrates a case in which the pixel isolation unit 54 has a so-called full trench isolation (FTI) structure reaching from the front surface to the back surface of the semiconductor substrate 50, but the present disclosure is not limited thereto. For example, various element isolation structures such as a so-called deep trench isolation (DTI) structure in which the pixel isolation unit 54 is formed from the back surface or the front surface of the semiconductor substrate 50 to the vicinity of the middle of the semiconductor substrate 50 can be adopted.

(Pupil Correction)

A planarization film 52 made of a silicon oxide film, a silicon nitride film, or the like is provided on the upper surface of the color filter 31. The upper surface of the planarization film 52 is planarized by, for example, chemical mechanical polishing (CMP), and an on-chip lens 51 for each unit pixel 110 is provided on the planarized upper surface. The on-chip lens 51 of each unit pixel 110 has a curvature so that incident light is collected in the photoelectric conversion units PD1 and PD2. It is noted that a positional relationship among the on-chip lens 51, the color filter 31, the IR filter 41, and the photoelectric conversion unit PD1 in each unit pixel 110 may be adjusted according to, for example, a distance (image height) from the center of the pixel array unit 101 (pupil correction).

Furthermore, in the structure illustrated in FIG. 15, a light shielding film for preventing obliquely incident light from leaking into the adjacent pixel may be provided. The light shielding film can be located above the pixel isolation unit 54 provided inside the semiconductor substrate 50 (upstream side in the optical path of the incident light). However, when pupil correction is performed, the position of the light shielding film may be adjusted according to, for example, the distance (image height) from the center of the pixel array unit 101. Such a light shielding film may be provided, for example, in the sealing film 32 or the planarization film 52. Furthermore, as a material of the light shielding film, for example, a light shielding material such as aluminum (Al) or tungsten (W) may be used.

<2.4. Circuit Structure Example of Unit Pixel>

Figure 16:
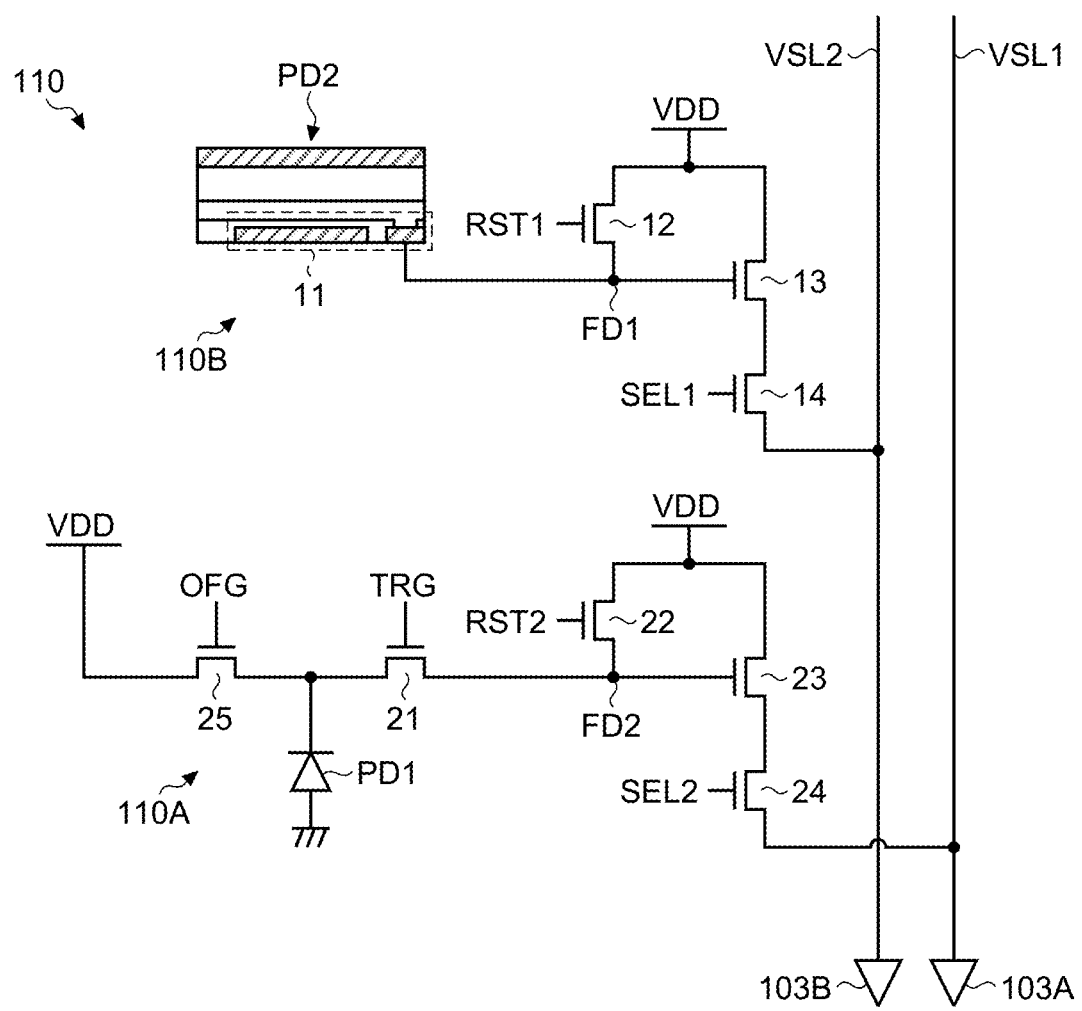
FIG. 16 is a circuit diagram illustrating a schematic configuration example of a unit pixel according to the present embodiment.

Next, a circuit configuration example of the unit pixel 110 will be described. FIG. 16 is a circuit diagram illustrating a schematic configuration example of the unit pixel 110 according to the present embodiment. As illustrated in FIG. 16, the unit pixel 110 includes one RGB pixel 110B and one IR pixel 110A.

(RGB Pixel 110B)

The RGB pixel 110B includes, for example, the photoelectric conversion unit PD2, a transfer gate 11, the floating diffusion region FD1, a reset transistor 12, an amplification transistor 13, and a selection transistor 14.

A selection control line included in the pixel drive line LD is connected to a gate of the selection transistor 14, a reset control line included in the pixel drive line LD is connected to a gate of the reset transistor 12, and a transfer control line included in the pixel drive line LD2 is connected to an accumulation electrode (refer to the accumulation electrode 37 in FIG. 15) to be described later of the transfer gate 11. Furthermore, the vertical signal line VSL2 having one end connected to the second readout circuit 103B is connected to the source of the amplification transistor 13 via the selection transistor 14.

In the following descriptions, the reset transistor 12, the amplification transistor 13, and the selection transistor 14 are also collectively referred to as a pixel circuit. The pixel circuit may include the floating diffusion region FD1 and/or the transfer gate 11.

The photoelectric conversion unit PD2 is made of, for example, an organic material, and photoelectrically converts incident light. The transfer gate 11 transfers the charge generated in the photoelectric conversion unit PD2. The floating diffusion region FD1 accumulates the charge transferred by the transfer gate 11. The amplification transistor 13 causes a pixel signal having a voltage value corresponding to the charge accumulated in the floating diffusion region FD1 to appear in the vertical signal line VSL2. The reset transistor 12 releases the charge accumulated in the floating diffusion region FD1. The selection transistor 14 selects the RGB pixel 110B to be read out.

The anode of the photoelectric conversion unit PD2 is grounded, and the cathode thereof is connected to the transfer gate 11. As described above with reference to FIG. 15, the transfer gate 11 includes, for example, the accumulation electrode 37 and the readout electrode 36. At the time of exposure, a voltage for collecting charges generated in the photoelectric conversion unit PD2 to the semiconductor layer 35 in the vicinity of the accumulation electrode 37 is applied to the accumulation electrode 37 via the transfer control line. At the time of reading out, a voltage for causing charges collected in the semiconductor layer 35 in the vicinity of the accumulation electrode 37 to flow out through the readout electrode 36 is applied to the accumulation electrode 37 via the transfer control line.

The charges flowing out through the readout electrode 36 are accumulated in the floating diffusion region FD1 formed by a wiring structure connecting the readout electrode 36, the source of the reset transistor 12, and the gate of the amplification transistor 13. It is noted that the drain of the reset transistor 12 may be connected to, for example, a power supply line to which the power supply voltage VDD or a reset voltage different from the power supply voltage VDD is supplied.

The drain of the amplification transistor 13 may be connected to, for example, the power supply line. The source of the amplification transistor 13 is connected to the drain of the selection transistor 14, and the source of the selection transistor 14 is connected to the vertical signal line VSL2.

The floating diffusion region FD1 converts the accumulated charge into a voltage having a voltage value corresponding to the amount of charge. It is noted that the floating diffusion region FD1 may be, for example, a capacitance-to-ground. However, the present disclosure is not limited thereto, and the floating diffusion region FD1 may be a capacitance or the like added by intentionally connecting a capacitor or the like to a node to which the drain of the transfer gate 11, the source of the reset transistor 12, and the gate of the amplification transistor 13 are connected.

The vertical signal line VSL2 is connected to an analog-to-digital (AD) conversion circuit (not illustrated) provided for each column (that is, for each vertical signal line VSL2) in the second readout circuit 103B. The AD conversion circuit includes, for example, a comparator and a counter, and converts an analog pixel signal into a digital pixel signal by comparing a reference voltage such as a single slope or a ramp shape input from the reference voltage generation circuit 107 (digital-to-analog converter (DAC)) with the pixel signal appearing in the vertical signal line VSL2. It is noted that the AD conversion circuit may include, for example, a correlated double sampling (CDS) circuit and the like, and may be configured to be able to reduce kTC noise and the like.

(IR Pixel 110A)

The IR pixel 110A includes, for example, the photoelectric conversion unit PD1, the transfer transistor 21, the floating diffusion region FD2, the reset transistor 22, the amplification transistor 23, the selection transistor 24, and a discharge transistor 25. That is, in the IR pixel 110A, the transfer gate 11 in the RGB pixel 110B is replaced with the transfer transistor 21, and the discharge transistor 25 is added.

A connection relationship of the floating diffusion region FD2, the reset transistor 22, and the amplification transistor 23 with respect to the transfer transistor 21 may be similar to a connection relationship of the floating diffusion region FD1, the reset transistor 12, and the amplification transistor 13 with respect to the transfer gate 11 in the RGB pixel 110B. Furthermore, a connection relationship among the amplification transistor 23, the selection transistor 24, and the vertical signal line VSL1 may be similar to a connection relationship among the amplification transistor 13, the selection transistor 14, and the vertical signal line VSL2 in the RGB pixel 110B.

The source of the transfer transistor 21 is connected to, for example, the cathode of the photoelectric conversion unit PD1, and the drain thereof is connected to the floating diffusion region FD2. Furthermore, a transfer control line included in the pixel drive line LD is connected to the gate of the transfer transistor 21.

The source of the discharge transistor 25 may be connected to, for example, the cathode of the photoelectric conversion unit PD1, and the drain thereof may be connected to a power supply line to which the power supply voltage VDD or a reset voltage different from the power supply voltage VDD is supplied. Further, the gate of the discharge transistor 25 is connected to a discharge control line included in the pixel drive line LD1.

In the following descriptions, the reset transistor 22, the amplification transistor 23, and the selection transistor 24 are also collectively referred to as a pixel circuit. The pixel circuit may include one or more of the floating diffusion region FD2, the transfer transistor 21, and the discharge transistor 25.

The photoelectric conversion unit PD1 is made of, for example, a semiconductor material, and photoelectrically converts incident light. The transfer transistor 21 transfers the charge generated in the photoelectric conversion unit PD1. The floating diffusion region FD2 accumulates the charge transferred by the transfer transistor 21. The amplification transistor 23 causes a pixel signal having a voltage value corresponding to the charge accumulated in the floating diffusion region FD2 to appear in the vertical signal line VSL1. The reset transistor 22 releases the charge accumulated in the floating diffusion region FD2. The selection transistor 24 selects the IR pixel 110A to be read out.

The anode of the photoelectric conversion unit PD1 is grounded, and the cathode thereof is connected to the transfer transistor 21. The drain of the transfer transistor 21 is connected to the source of the reset transistor 22 and the gate of the amplification transistor 23, and a wiring structure connecting these components forms the floating diffusion region FD2. The charge flowing out from the photoelectric conversion unit PD1 via the transfer transistor 21 is accumulated in the floating diffusion region FD2.

The floating diffusion region FD2 converts the accumulated charge into a voltage having a voltage value corresponding to the amount of charge. It is noted that the floating diffusion region FD2 may be, for example, a capacitance-to-ground. However, the present disclosure is not limited thereto, and the floating diffusion region FD2 may be a capacitance or the like added by intentionally connecting a capacitor or the like to a node to which the drain of the transfer transistor 21, the source of the reset transistor 22, and the gate of the amplification transistor 23 are connected.

The discharge transistor 25 is turned on when discharging the charge accumulated in the photoelectric conversion unit PD1 and resetting the photoelectric conversion unit PD1. As a result, the charge accumulated in the photoelectric conversion unit PD1 flows out to the power supply line via the discharge transistor 25, and the photoelectric conversion unit PD1 is reset to a state of not being exposed.

Similarly to the vertical signal line VSL2, the vertical signal line VSL 1 is connected to an AD conversion circuit (not illustrated) provided for each column (that is, for each vertical signal line VSL1) in the first readout circuit 103A. The AD conversion circuit of the first readout circuit 103A may have a configuration similar to that of the AD conversion circuit of the second readout circuit 103B.

(Modification of Circuit Configuration)

Next, a modification of the circuit configuration of the unit pixel 110 illustrated in FIG. 16 will be described with some examples.

Figure 17:
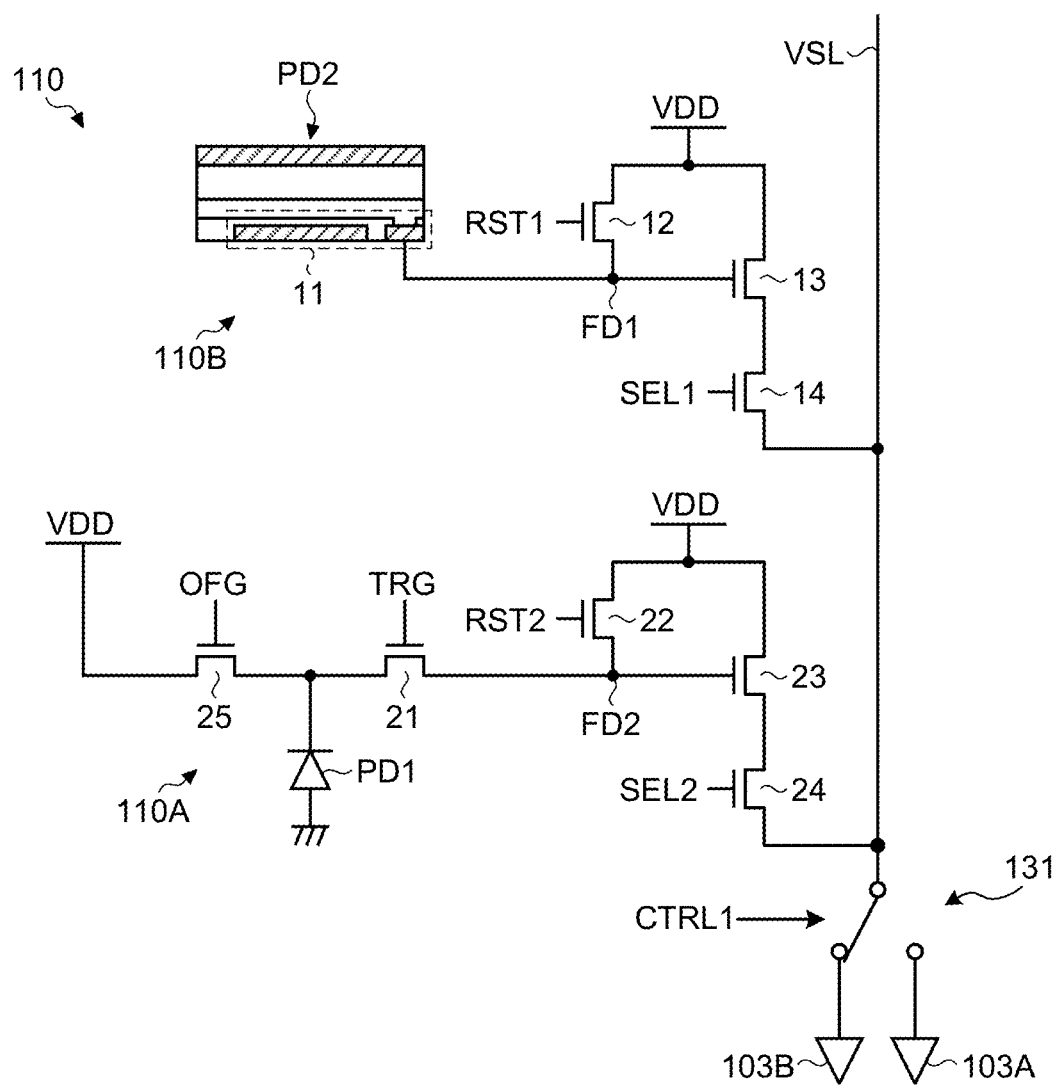
FIG. 17 is a circuit diagram illustrating another example of the schematic configuration of the unit pixel according to the embodiment of the present disclosure.

FIG. 17 is a circuit diagram illustrating another example of the schematic configuration of the unit pixel 110 according to the embodiment of the present disclosure. As illustrated in FIG. 17, the unit pixel 110 is configured so that the vertical signal line VSL is connected to the first readout circuit 103A and the second readout circuit 103B (refer to FIG. 12) via a switch circuit 132 instead of the vertical signal lines VSL1 and VSL2 in the same configuration as the unit pixel 110 illustrated in FIG. 16.

Therefore, in FIG. 17, a switch circuit 131 configured to switch which of the first readout circuit 103A and the second readout circuit 103B the vertical signal line VSL is connected to is provided. For example, the switch circuit 131 may be provided on the same semiconductor substrate as the pixel circuit of the RGB pixel 110B and/or the IR pixel 110A, may be provided on the semiconductor substrate on which the readout circuit 103 is disposed, or may be provided on a semiconductor substrate different from these. Furthermore, a control signal for controlling the switch circuit 131 may be supplied from the row control circuit 102, may be supplied from the control circuit 105, or may be supplied from another configuration (for example, the processor 20 or the like in FIG. 1).

Furthermore, in a case where the solid-state imaging device 100 includes the common readout circuit 103 instead of the first readout circuit 103A and the second readout circuit 103B (refer to FIG. 13), the switch circuit 131 can be omitted.

According to such a configuration, it is possible to reduce the circuit scale of the vertical signal line VSL and the readout circuit 103, thereby making it possible to reduce the size, increase the resolution, and the like of the solid-state imaging device 100 by improving area efficiency.

Figure 18:
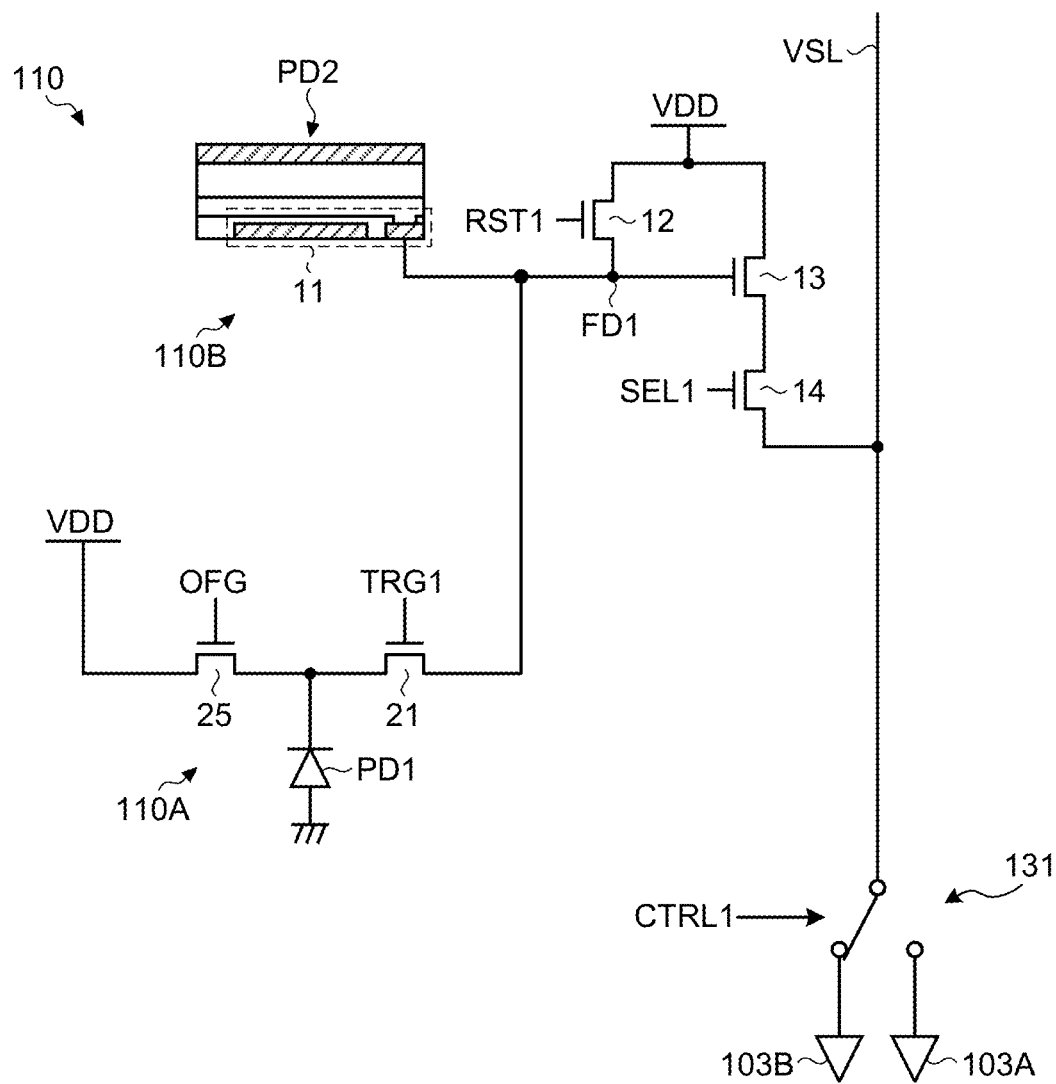
FIG. 18 is a circuit diagram illustrating another example of the schematic configuration of the unit pixel according to the embodiment of the present disclosure.

FIG. 18 is a circuit diagram illustrating another example of the schematic configuration of the unit pixel 110 according to the embodiment of the present disclosure. As illustrated in FIG. 17, the unit pixel 110 is configured to share at least a part of the pixel circuit of the RGB pixel 110B and the pixel circuit of the IR pixel 110A in the same configuration as the unit pixel 110 illustrated in FIG. 17. In FIG. 18, the reset transistor 22, the amplification transistor 23, and the selection transistor 24 are omitted, and the RGB pixel 110B and the IR pixel 110A share the reset transistor 12, the amplification transistor 13, and the selection transistor 14.

According to such a configuration, the circuit scale of the pixel circuit can be reduced, thereby making it possible to reduce the size, increase the resolution, and the like of the solid-state imaging device 100 by improving area efficiency.

It is noted that although the case where a pixel circuit is shared by the RGB pixel 110B and the IR pixel 110A is shown here, for example, a plurality of RGB pixels 110B may share a pixel circuit, and a plurality of IR pixels 110A may share a pixel circuit.

<2.5. Modification of Pixel Array Unit>

As described above, FIG. 14 illustrates, as an example, a case in which one RGB pixel 110B is associated with one IR pixel 110A. On the other hand, here, a case where a plurality of RGB pixels 110B are associated with one IR pixel 110A will be described as an example.

(Configuration Example 1 of Pixel Array Unit 101)

Figure 19:
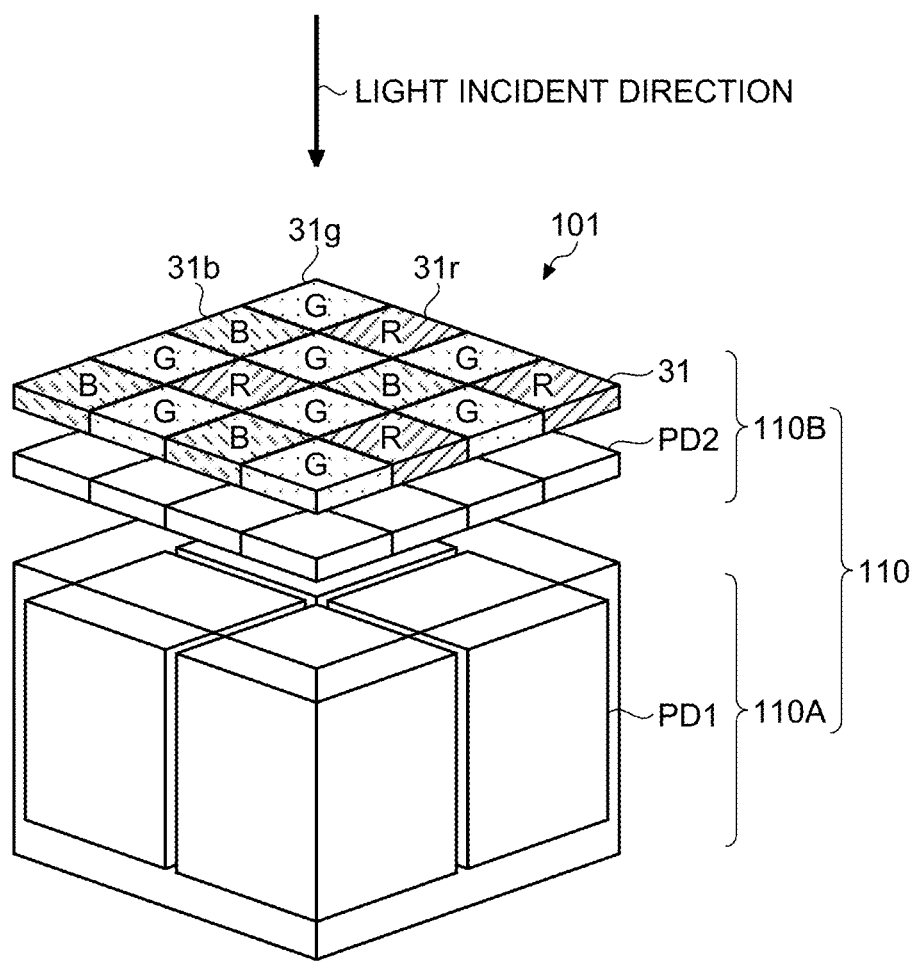
FIG. 19 is a schematic diagram illustrating another example of the schematic configuration of the pixel array unit according to the embodiment of the present disclosure.

FIG. 19 is a schematic diagram illustrating another example of the schematic configuration of the pixel array unit 101 according to the embodiment of the present disclosure. As illustrated in FIG. 19, the pixel array unit 101 has a configuration in which the unit pixels 110 having a structure in which one IR pixel 110A is arranged in the light incident direction with respect to four RGB pixels 110B arranged in two rows and two columns are arranged in a two-dimensional lattice pattern. That is, in FIG. 19, one IR pixel 110A is positioned in the direction perpendicular to the arrangement direction (planar direction) of the unit pixels 110 with respect to the four RGB pixels 110B. As a result, the light transmitted through the four RGB pixels 110B located on the upstream side in the optical path of the incident light is configured to be incident on one IR pixel 110A located on the downstream side of the four RGB pixels 110B. Therefore, in FIG. 19, the optical axes of the incident light of the unit array of the Bayer array including the four RGB pixels 110B and the IR pixel 110A coincide or substantially coincide with each other.

(Cross-Sectional Structure Example of Unit Pixel)

Figure 20:
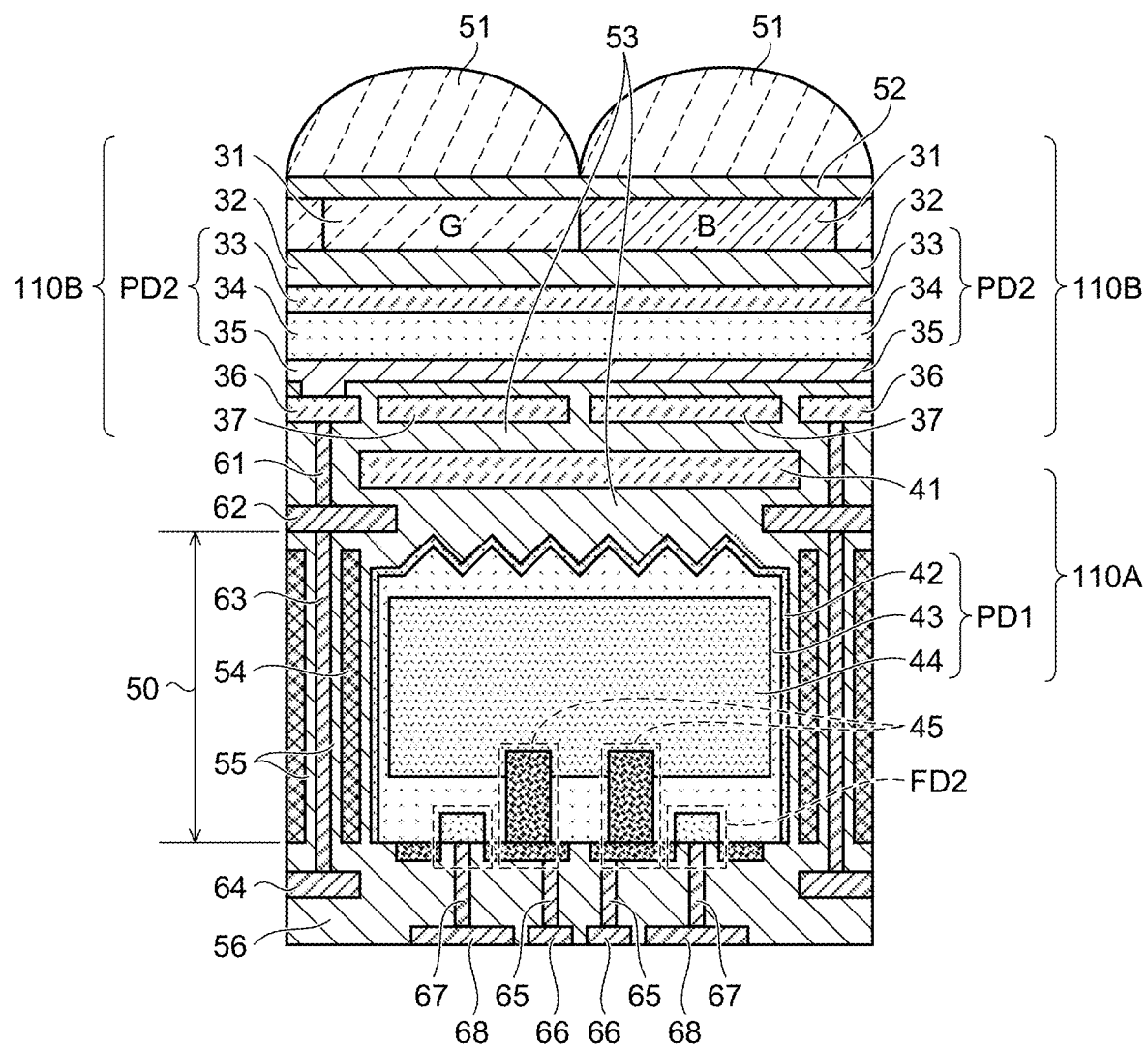
FIG. 20 is a cross-sectional view illustrating another example of the cross-sectional structure of the solid-state imaging device according to the embodiment of the present disclosure.

FIG. 20 is a cross-sectional view illustrating another example of the cross-sectional structure of the solid-state imaging device 100 according to the embodiment of the present disclosure. It is noted that, in the present description, similarly to FIG. 19, a case where each unit pixel 110 includes four RGB pixels 110B arranged in two rows and two columns and one IR pixel 110A will be described as an example. Furthermore, in the following descriptions, a cross-sectional structure example thereof will be described focusing on a semiconductor chip in which the photoelectric conversion units PD1 and PD2 in the unit pixel 110 are formed, similarly to FIG. 15. Furthermore, in the following descriptions, structures similar to the cross-sectional structure of the solid-state imaging device 100 described with reference to FIG. 15 are cited, and redundant description is omitted.

As illustrated in FIG. 20, in a cross-sectional structure similar to the cross-sectional structure illustrated in FIG. 15, the on-chip lens 51, the color filter 31, and the accumulation electrode 37 are divided into four in two rows and two columns (however, two out of four are illustrated in FIG. 20), thereby forming four RGB pixels 110B. It is noted that the four RGB pixels 110B in each unit pixel 110 may form a basic array of the Bayer array.

(Circuit Configuration Example of Unit Pixel)

Figure 21:
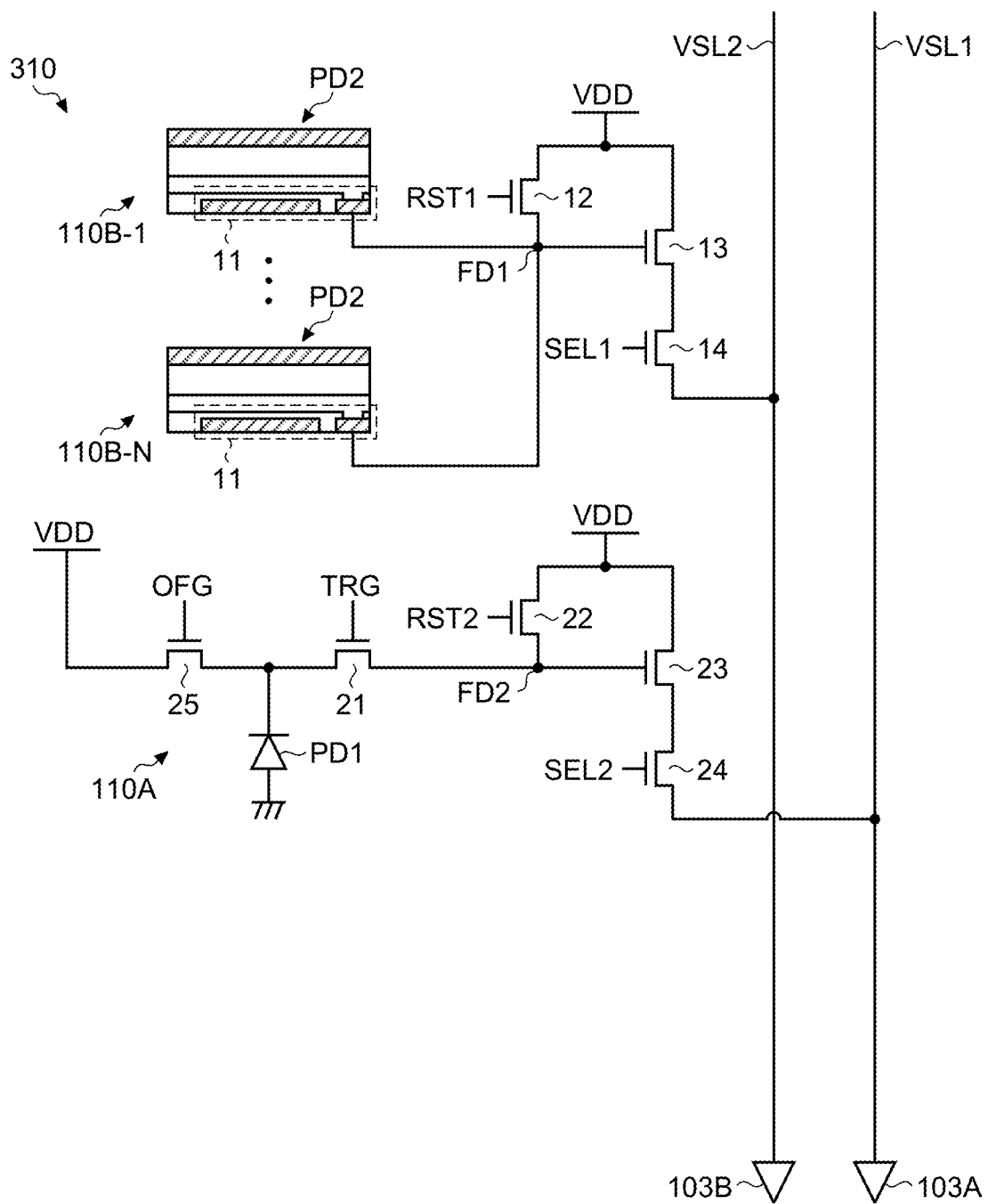
FIG. 21 is a circuit diagram illustrating another example of the schematic configuration of the unit pixel according to the embodiment of the present disclosure.

FIG. 21 is a circuit diagram illustrating another example of the schematic configuration of the unit pixel 110 according to the embodiment of the present disclosure. It is noted that, in FIG. 21, the unit pixel 110 illustrated in FIG. 16 is used as a base, but the present disclosure is not limited thereto, and the unit pixel 110 of FIG. 17 or 18 can also be used as a base.

As illustrated in FIG. 21, the unit pixel 110 includes a plurality of RGB pixels 110B-1 to 110B-N (in FIG. 19, N is four) and one IR pixel 110A. As described above, in a case where one unit pixel 110 includes a plurality of RGB pixels 110B, one pixel circuit (reset transistor 12, floating diffusion region FD1, amplification transistor 13, and selection transistor 14) can be shared by the plurality of RGB pixels 110B (pixel sharing). Therefore, in FIG. 21, the plurality of RGB pixels 110B-1 to 110B-N share a pixel circuit including the reset transistor 12, the floating diffusion region FD1, the amplification transistor 13, and the selection transistor 14. That is, in FIG. 21, the plurality of photoelectric conversion units PD1 and the transfer gate 11 are connected to the common floating diffusion region FD1.

(Configuration Example 2 of Pixel Array Unit 101)

It is noted that, in the pixel array unit 101 described above, the IR pixel 110A and the RGB pixel 110B are stacked, but the present disclosure is not limited thereto. The IR pixel 110A and the RGB pixel 110B may be arranged on the same plane.

Figure 22:
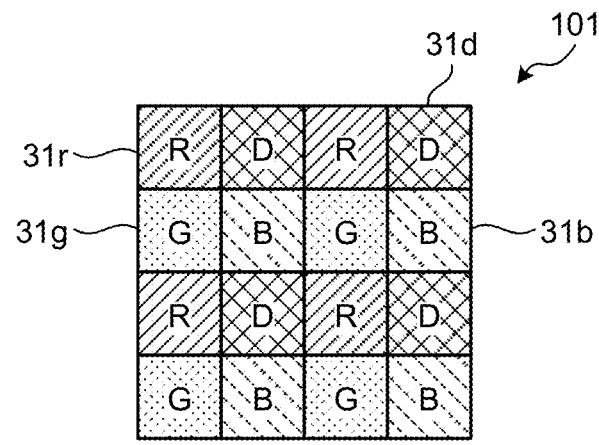
FIG. 22 is a schematic diagram illustrating another example of the schematic configuration of the pixel array unit according to the embodiment of the present disclosure.
Figure 23:
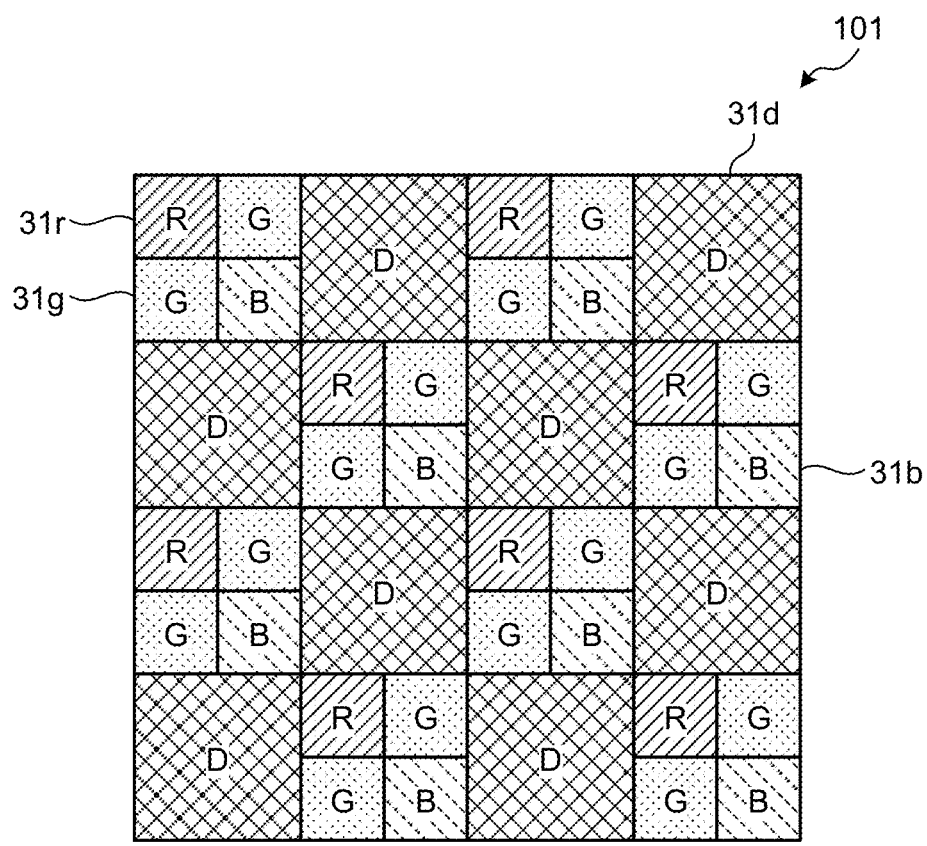
FIG. 23 is a schematic diagram illustrating another example of the schematic configuration of the pixel array unit according to the embodiment of the present disclosure.

FIGS. 22 and 23 are schematic diagrams illustrating another example of the schematic configuration of the pixel array unit 101 according to the embodiment of the present disclosure. FIGS. 22 and 23 illustrate the pixel array unit 101 as viewed from the light incident direction. It is noted that, here, a description will be given, as an example, as to a case in which the unit pixel 110 includes the RGB pixel 110B for acquiring a color image of three primary colors of RGB and the IR pixel 110A for acquiring a monochrome image of infrared (IR) light.

As illustrated in FIG. 22, the pixel array unit 101 has a configuration in which unit pixels 110 in which three RGB pixels 110B and one IR pixel 110A are arranged in two rows and two columns are arranged in a two-dimensional lattice pattern. A filter 31d is a filter configured to selectively transmit infrared light (IR).

Alternatively, as illustrated in FIG. 23, one IR pixel 110A may be arranged on the same plane with respect to four RGB pixels 110B arranged in two rows and two columns. In FIG. 23, four RGB pixels 110B and one IR pixel 110A are arranged in a two-dimensional lattice pattern as one unit pixel 110.

(Cross-sectional structure example of unit pixel) FIGS. 24A, 24B, 24C 24D, 24E, 24F, 24G, 24H, and 24I are schematic diagrams illustrating another example of the cross-sectional structure of the solid-state imaging device 100 according to the embodiment of the present disclosure. FIGS. 24A, 24B, 24C, 24D, 24E, 24F, 24G, 24H, and 24I are schematic diagrams, and are not necessarily strictly illustrated. FIGS. 24A, 24B, 24C, 24D, 24E, 24F, 24G, 24H, and 24I are diagrams illustrating an arrangement example of the photoelectric conversion units PD1 and PD2, and description of components unnecessary for description is omitted.

Figure 24A:
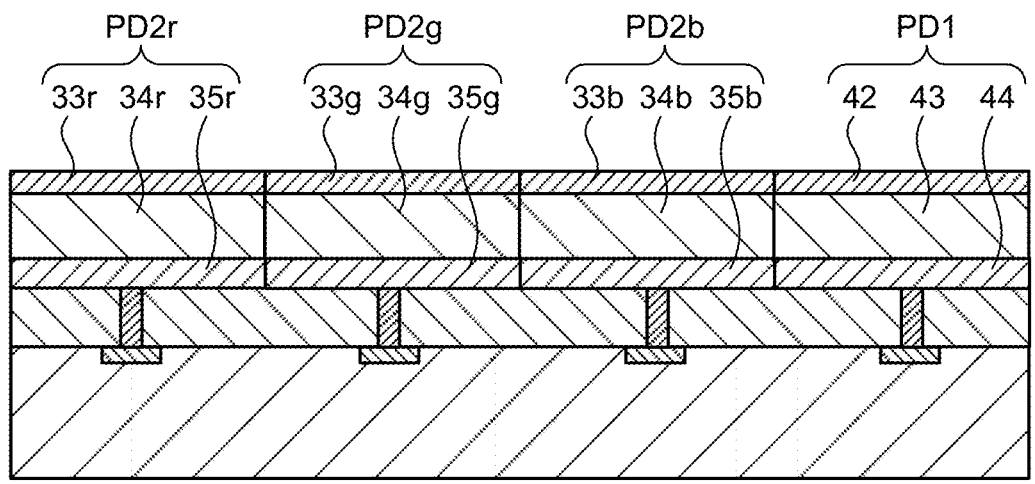
FIG. 24A is a schematic diagram illustrating another example of the cross-sectional structure of the solid-state imaging device according to the embodiment of the present disclosure.

In the example of FIG. 24A, the photoelectric conversion units PD1 and PD2 are arranged on the same plane. The photoelectric conversion unit PD2 includes a photoelectric conversion unit PD2r configured to photoelectrically convert red light, a photoelectric conversion unit PD2b configured to photoelectrically convert green light, and a photoelectric conversion unit PD2b configured to photoelectrically convert blue light.

Figure 24B:
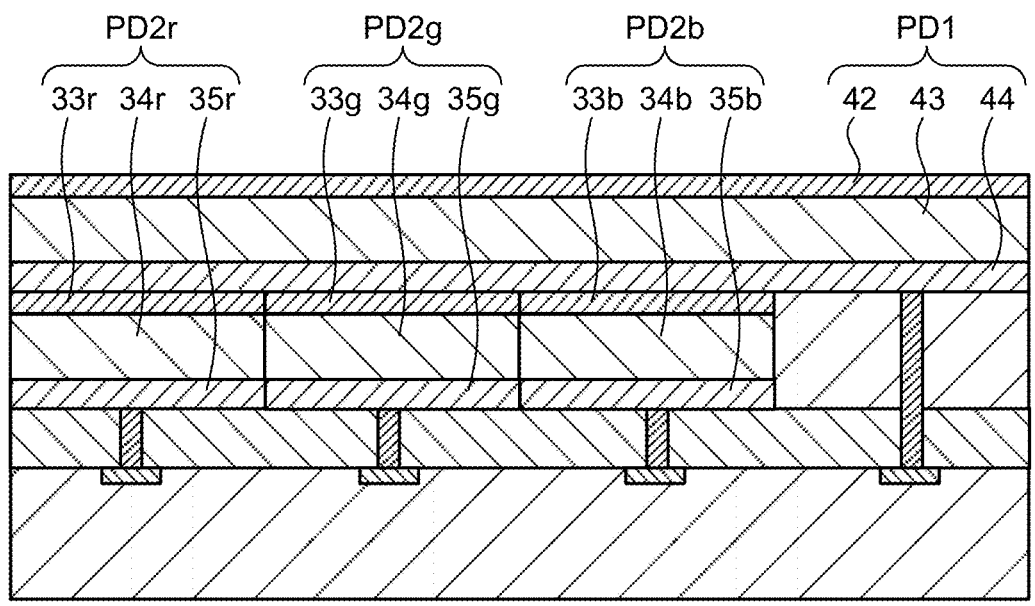
FIG. 24B is a schematic diagram illustrating another example of the cross-sectional structure of the solid-state imaging device according to the embodiment of the present disclosure.
Figure 24C:
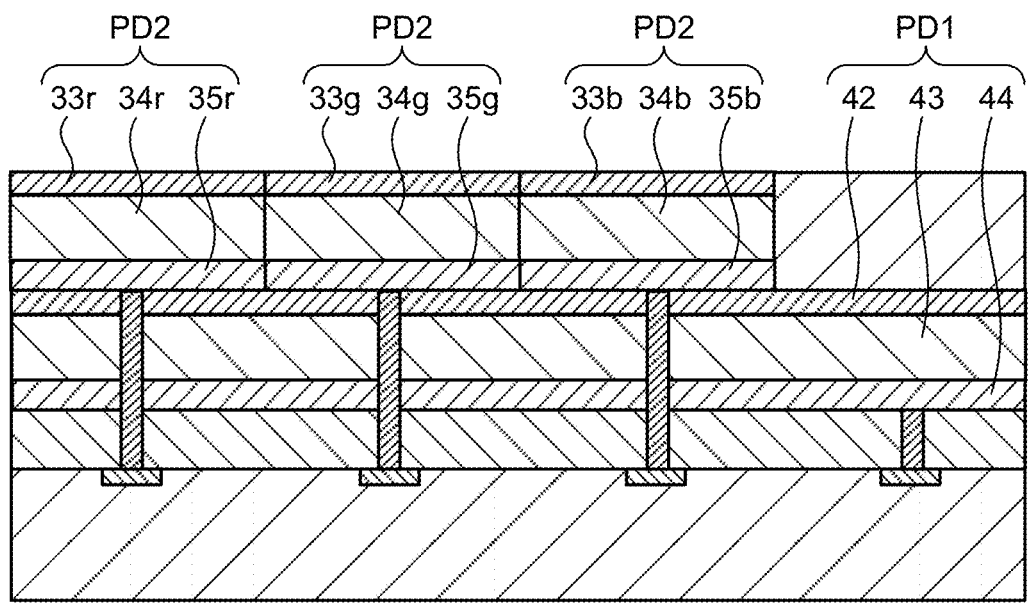
FIG. 24C is a schematic diagram illustrating another example of the cross-sectional structure of the solid-state imaging device according to the embodiment of the present disclosure.

As illustrated in FIGS. 24B and 24C, the photoelectric conversion unit PD1 and the photoelectric conversion unit PD2 may be stacked and disposed. In FIG. 24B, the photoelectric conversion unit PD1 is arranged on the upstream side and the photoelectric conversion unit PD2 is arranged on the downstream side in the optical path of the incident light. In FIG. 24C, the photoelectric conversion unit PD2 is arranged on the upstream side and the photoelectric conversion unit PD1 is arranged on the downstream side in the optical path of the incident light. As in FIG. 24A, the photoelectric conversion unit PD2 in FIGS. 24B and 24C includes the photoelectric conversion unit PD2r configured to photoelectrically convert red light, the photoelectric conversion unit PD2b configured to photoelectrically convert green light, and the photoelectric conversion unit PD2b configured to photoelectrically convert blue light.

Figure 24D:
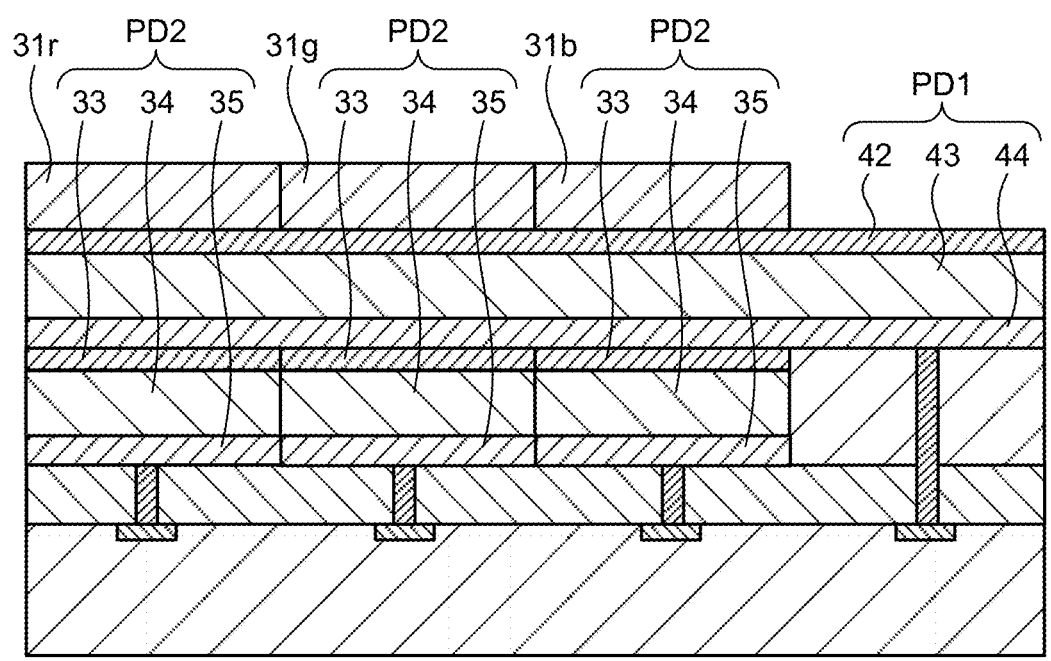
FIG. 24D is a schematic diagram illustrating another example of the cross-sectional structure of the solid-state imaging device according to the embodiment of the present disclosure.
Figure 24E:
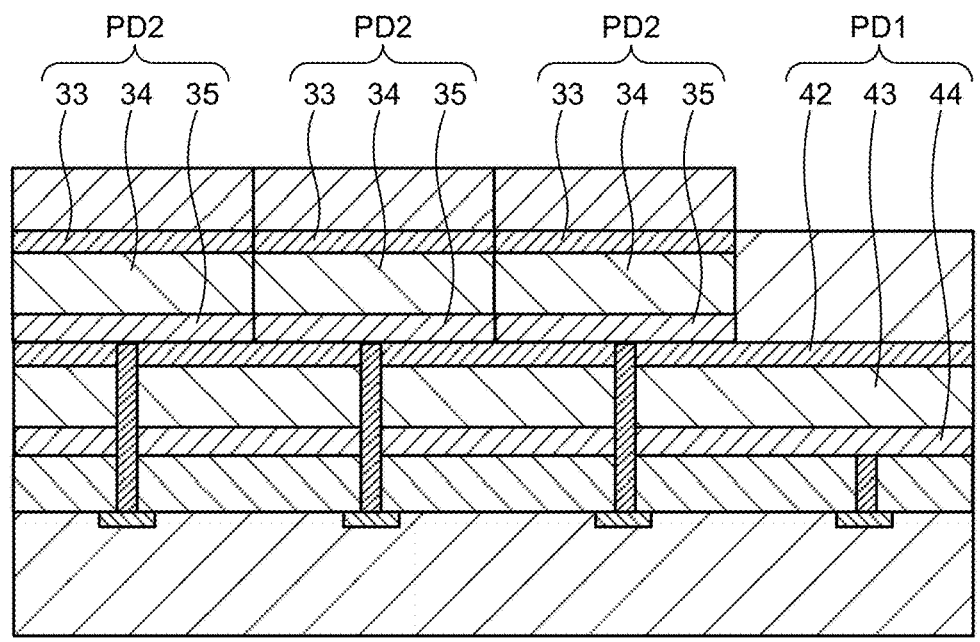
FIG. 24E is a schematic diagram illustrating another example of the cross-sectional structure of the solid-state imaging device according to the embodiment of the present disclosure.

For example, instead of the photoelectric conversion units PD2r, PD2g, and PD2b configured to photoelectrically convert predetermined visible light, the photoelectric conversion unit PD2 may be configured using a photoelectric conversion film configured to photoelectrically convert substantially all visible light from an ultraviolet region to a red region, such as a panchromatic photosensitive organic photoelectric conversion film to be described later. In this case, as illustrated in FIGS. 24D and 24E, color filters 31r, 31g, and 31b are provided for the respective photoelectric conversion units PD2, so that the photoelectric conversion units PD2 perform photoelectric conversion of red, green, and blue light, respectively. It is noted that FIG. 24D illustrates a case in which the photoelectric conversion unit PD1 is arranged on the upstream side and the photoelectric conversion unit PD2 is arranged on the downstream side in the optical path of the incident light. FIG. 24E illustrates a case in which the photoelectric conversion unit PD2 is arranged on the upstream side and the photoelectric conversion unit PD1 is arranged on the downstream side in the optical path of the incident light.

In addition, the material of the photoelectric conversion unit PD2 may be different according to the light to be photoelectrically converted. For example, the photoelectric conversion unit PD2g configured to photoelectrically convert green light may be made of an organic semiconductor material, and the photoelectric conversion units PD2r and PD2b configured to photoelectrically convert red and blue light may be made of a semiconductor material such as silicon.

Figure 24F:
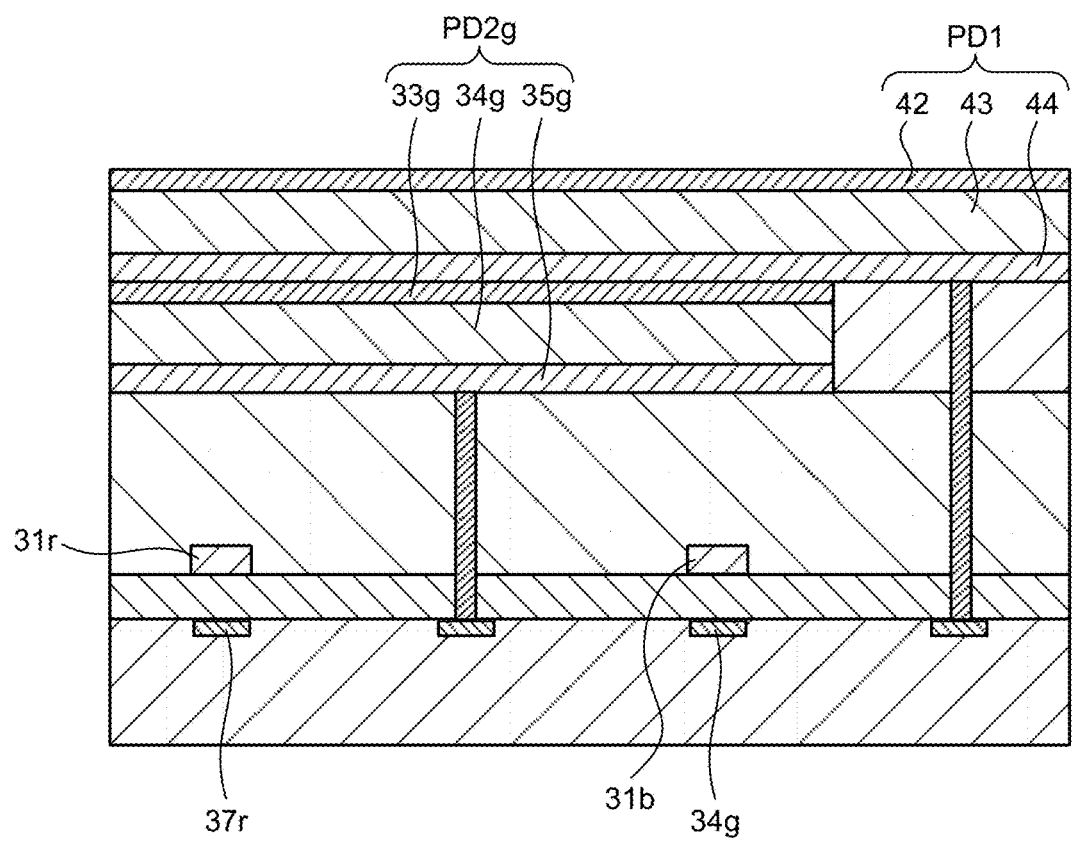
FIG. 24F is a schematic diagram illustrating another example of the cross-sectional structure of the solid-state imaging device according to the embodiment of the present disclosure.
Figure 24G:
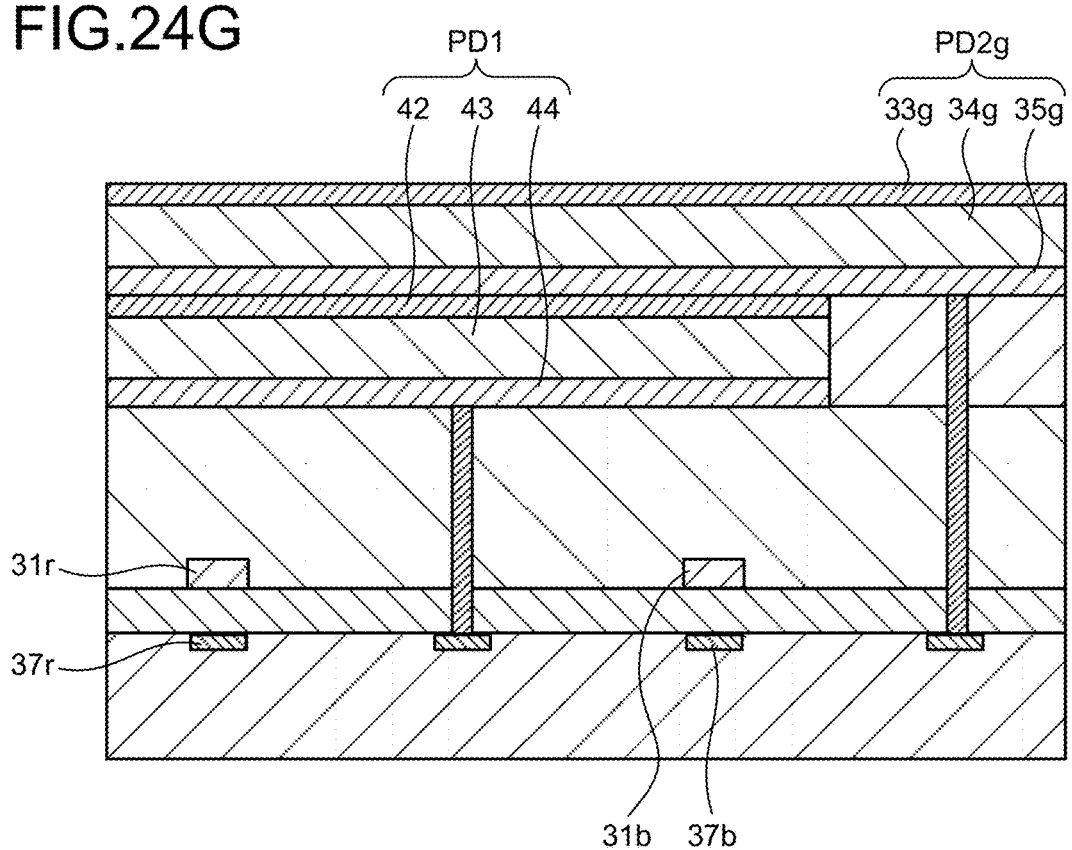
FIG. 24G is a schematic diagram illustrating another example of the cross-sectional structure of the solid-state imaging device according to the embodiment of the present disclosure.

In the example of FIG. 24F, a case where the photoelectric conversion unit PD1 is arranged on the upstream side and the photoelectric conversion unit PD2 is arranged on the downstream side in the optical path of the incident light is illustrated. The photoelectric conversion unit PD2g configured to photoelectrically convert green light in the photoelectric conversion unit PD2 is disposed between the photoelectric conversion units PD2r and PD2b configured to photoelectrically convert red and blue light and the photoelectric conversion unit PD1. In addition, the color filters 31r and 31b are provided for the photoelectric conversion units PD2r and PD2b, respectively. It is noted that FIG. 24G has the same configuration as that in FIG. 24F except that the photoelectric conversion unit PD2g is arranged on the upstream side and the photoelectric conversion unit PD1 is arranged on the downstream side in the optical path of the incident light.

Figure 24H:
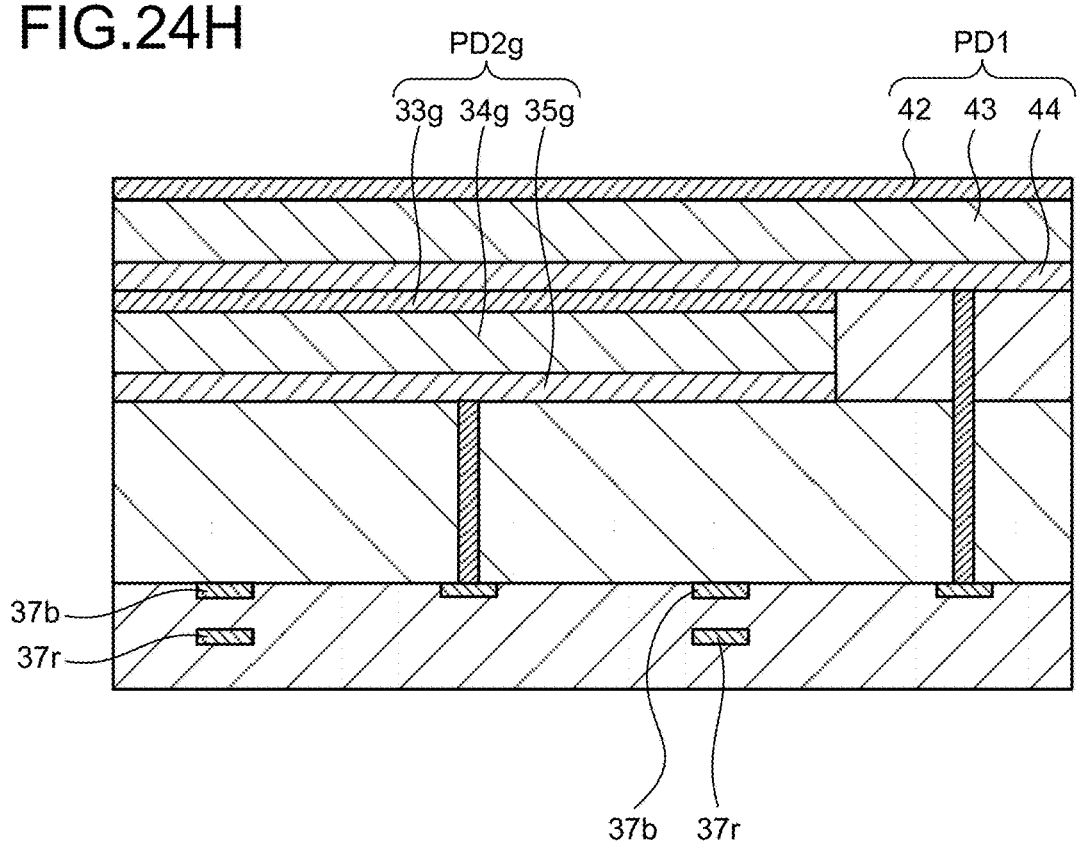
FIG. 24H is a schematic diagram illustrating another example of the cross-sectional structure of the solid-state imaging device according to the embodiment of the present disclosure.
Figure 24I:
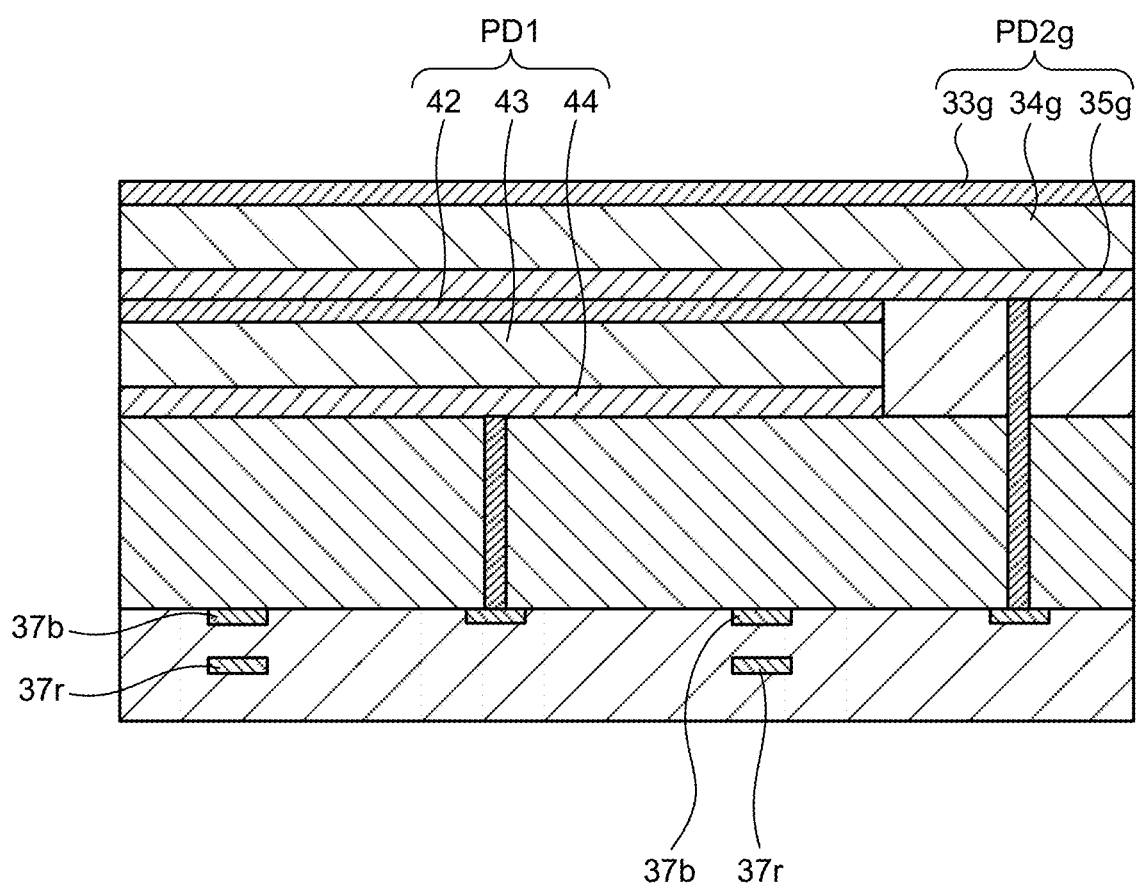
FIG. 24I is a schematic diagram illustrating another example of the cross-sectional structure of the solid-state imaging device according to the embodiment of the present disclosure.

The photoelectric conversion units PD2r and PD2b made of a semiconductor material such as silicon may be stacked in the incident direction. In the example of FIG. 24H, a case where the photoelectric conversion unit PD2b is arranged on the upstream side and the photoelectric conversion unit PD2r is arranged on the downstream side in the optical path of the incident light is illustrated. It is noted that FIG. 24I has the same configuration as that in FIG. 24H except that the photoelectric conversion unit PD2g is arranged on the upstream side and the photoelectric conversion unit PD1 is arranged on the downstream side in the optical path of the incident light.

<2.6. Organic Material>

In the embodiment of the present disclosure, when an organic semiconductor is used as the material of the photoelectric conversion film 34, the layer structure of the photoelectric conversion film 34 can have the following structure. However, in the case of the stacked structure, the stacking order can be appropriately changed.

(1) Single-layer structure of p-type organic semiconductor
(2) Single-layer structure of n-type organic semiconductor
(3-1) Stacked structure of p-type organic semiconductor layer/n-type organic semiconductor layer
(3-2) Stacked structure of p-type organic semiconductor layer/mixed layer (bulk hetero structure) of p-type organic semiconductor and n-type organic semiconductor/n-type organic semiconductor layer
(3-3) Stacked structure of p-type organic semiconductor layer/mixed layer (bulk hetero structure) of p-type organic semiconductor and n-type organic semiconductor
(3-4) Stacked structure of n-type organic semiconductor layer/mixed layer (bulk hetero structure) of p-type organic semiconductor and n-type organic semiconductor (4) Mixed layer of p-type organic semiconductor and p-type organic semiconductor (bulk hetero structure)

Here, examples of the p-type organic semiconductor include a naphthalene derivative, an anthracene derivative, a phenanthrene derivative, a pyrene derivative, a perylene derivative, a tetracene derivative, a pentacene derivative, a quinacridone derivative, a thiophene derivative, a thienothiophene derivative, a benzothiophene derivative, a benzothienobenzothiophene derivative, a triallylamine derivative, a carbazole derivative, a perylene derivative, a picene derivative, a chrysene derivative, a fluoranthene derivative, a phthalocyanine derivative, a subphthalocyanine derivative, a subporphyrazine derivative, a metal complex having a heterocyclic compound as a ligand, a polythiophene derivative, a polybenzothiadiazole derivative, a polyfluorene derivative, and the like.

Examples of the n-type organic semiconductor include fullerene and a fullerene derivative <for example, fullerene (higher fullerenes, endohedral fullerenes, and the like) such as C60, C70, or C74, or a fullerene derivative (for example, fullerene fluoride, PCBM fullerene compound, fullerene multimer, and the like)>, an organic semiconductor having a larger (deeper) HOMO and LUMO than the p-type organic semiconductor, and a transparent inorganic metal oxide.

Specific examples of the n-type organic semiconductor include a heterocyclic compound containing a nitrogen atom, an oxygen atom, and a sulfur atom, such as an organic molecule having, as a part of the molecular skeletons, a pyridine derivative, a pyrazine derivative, a pyrimidine derivative, a triazine derivative, a quinoline derivative, a quinoxaline derivative, an isoquinoline derivative, an acridine derivative, a phenazine derivative, a phenanthroline derivative, a tetrazole derivative, a pyrazole derivative, an imidazole derivative, a thiazole derivative, an oxazole derivative, an imidazole derivative, a benzimidazole derivative, a benzotriazole derivative, a benzoxazole derivative, a benzoxazole derivative, a carbazole derivative, a benzofuran derivative, a dibenzofuran derivative, a subporphyrazine derivative, a polyphenylenevinylene derivative, a polybenzothiadiazole derivative, a polyfluorene derivative or the like, an organometallic complex, and a subphthalocyanine derivative.

Examples of a group or the like contained in a fullerene derivative can include a halogen atom; a linear, a branched or cyclic alkyl or phenyl group; a group having linear or condensed aromatic compound; a group having halide; a partial fluoroalkyl group; a perfluoroalkyl group; a silylalkyl group; a silyl alkoxy group; an arylsilyl group; an arylsulfanyl group; an alkylsulfanyl group; an arylsulfonyl group; an alkylsulfonyl group; an aryl sulfide group; an alkyl sulfide group; an amino group; an alkylamino group; an arylamino group; a hydroxy group; an alkoxy group; an acylamino group; an acyloxy group; a carbonyl group; a carboxy group; a carboxamide group; a carboalkoxy group; an acyl group; a sulfonyl group; a cyano group; a nitro group; a group having chalcogenide; a phosphine group; a phosphon group; and derivatives of these groups.

The film thickness of the photoelectric conversion film 34 made of the organic material as described above is not limited to the following value, but may be, for example, $1 \times 10^{-8}$ m (meter) to $5 \times 10^{-7}$ m, preferably $2.5 \times 10^{-8}$ m to $3 \times 10^{-7}$ m, more preferably $2.5 \times 10^{-8}$ m to $2 \times 10^{-7}$ m, and still more preferably $1 \times 10^{-7}$ m to $1.8 \times 10^{-7}$ m. It is noted that the organic semiconductor is often classified into a p-type and an n-type, but the p-type means that holes are easily transported, and the n-type means that electrons are easily transported, and the organic semiconductor is not limited to the interpretation that it has holes or electrons as a majority carrier of thermal excitation like the inorganic semiconductor.

Examples of a material forming the photoelectric conversion film 34 configured to photoelectrically convert light having a green wavelength include a rhodamine dye, a melacyanine dye, a quinacridone derivative, a subphthalocyanine dye (subphthalocyanine derivative), and the like.

In addition, examples of a material forming the photoelectric conversion film 34 configured to photoelectrically convert blue light include a coumaric acid dye, tris-8-hydroxyquinoline aluminum (Alq3), a melacyanine dye, and the like.

Furthermore, examples of a material forming the photoelectric conversion film 34 configured to photoelectrically convert red light include a phthalocyanine dye, a subphthalocyanine dye (subphthalocyanine derivative), and the like.

Furthermore, as the photoelectric conversion film 34, a panchromatic photosensitive organic photoelectric conversion film that is sensitive to substantially all visible light from the ultraviolet region to the red region can be used.

3. Operation Example of Solid-State Imaging Device

<3.1. Readout Operation>

Next, a pixel signal readout operation by the solid-state imaging device 100 will be described.

(IR Pixel 110A)

Figure 25:
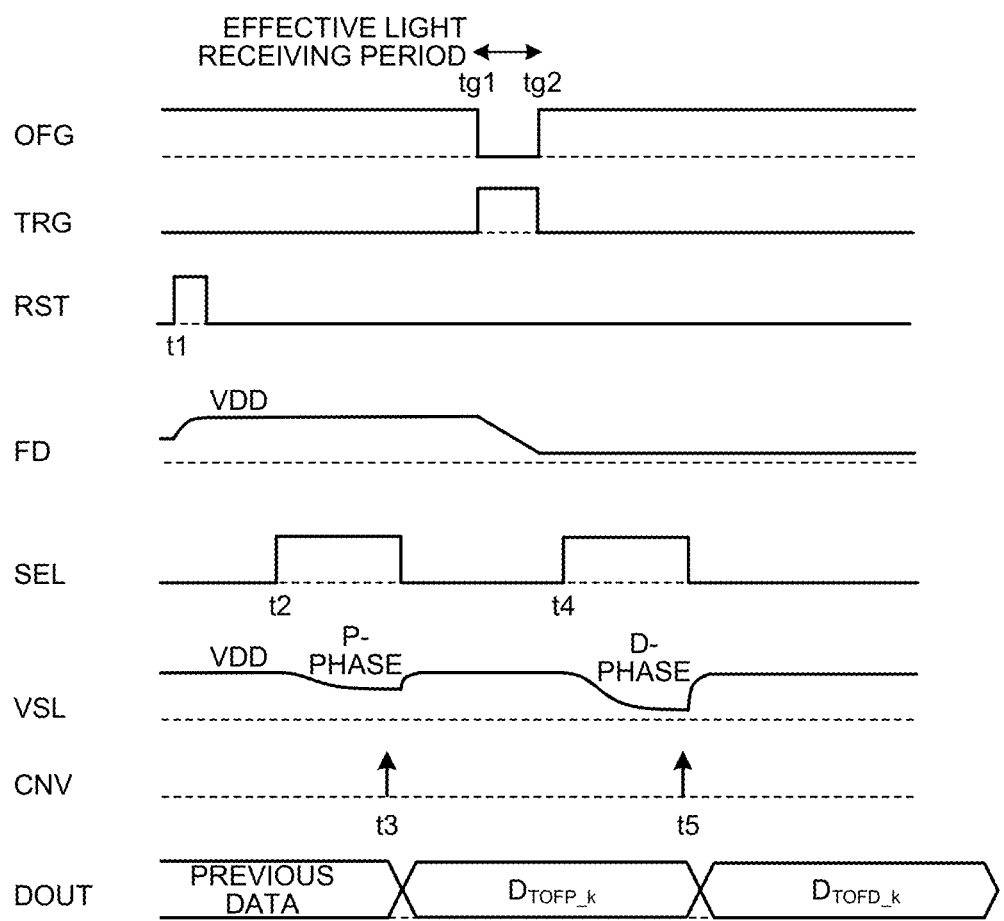
FIG. 25 is a time chart illustrating an example of a readout operation of an IR pixel according to the embodiment of the present disclosure.

FIG. 25 is a time chart illustrating an example of a readout operation of the IR pixel 110A according to the embodiment of the present disclosure. FIG. 25 illustrates an example of the readout operation of the IR pixel 110A illustrated in FIG. 16.

In FIG. 25, "TRG", "RST", and "SEL" indicate a transfer pulse TRG, a reset pulse RST, and a selection signal SEL, respectively. Furthermore, "OFG" indicates a drive signal OFG for driving the discharge transistor 25. "CNV" indicates a readout timing CNV by the first readout circuit 103A. "FD" indicates the amount of charge accumulated in the floating diffusion region FD2 of the IR pixel 110A, and "VSL" indicates a level (voltage) of the pixel signal output from the vertical signal line VSL1. Further, DOUT indicates data DOUT after the AD conversion processing by the first readout circuit 103A.

In the time chart of FIG. 25, in the initial state, each of the selection signal SEL, the reset pulse RST, and the transfer pulse TRG is in the low state. In addition, since the drive signal OFG is in the high state, the photoelectric conversion unit PD1 is not exposed, and no charge is accumulated.

At the time point t1, the reset pulse RST is set to the high state, and the charge of the floating diffusion region FD2 is discharged to the power supply VDD, so that the potential of the floating diffusion region FD2 is reset to a predetermined potential VDD.

At the time point t2, the selection signal SEL is set to the high state, and the selection transistor 24 is turned on. As a result, a signal corresponding to the potential of the floating diffusion region FD2 is output to the vertical signal line VSL1.

Next, at the time point t3, a reset level (black level) signal $D_{TOFP\_k}$ output to the vertical signal line VSL1 is converted into a digital value by the first readout circuit 103A and temporarily stored in, for example, a register of the first readout circuit 103A. The signal $D_{TOFP\_k}$ is offset noise. The readout of the signal $D_{TOFP\_k}$ is referred to as P-phase (Pre-Charge) readout, and a period during which the P-phase readout is performed is referred to as a P-phase period.

Next, the drive signal OFG goes to the low state and the transfer pulse TRG goes to the high state from the time point tg1 to the time point tg2. As a result, the photoelectric conversion unit PD1 is exposed, and the charge generated by photoelectric conversion is accumulated in the floating diffusion region FD2. A period from the time point tg1 to the time point tg2 is referred to as an effective light receiving period, and the IR pixel 110A receives infrared light in this period.

At the time point t4, the selection signal SEL is set to the high state, and the selection transistor 24 is turned on. As a result, a signal corresponding to the potential of the floating diffusion region FD2 is output to the vertical signal line VSL1.

At the time point t5, a signal $D_{TOFD\_k}$ output to the vertical signal line VSL1 is converted into a digital value by the first readout circuit 103A, and is temporarily stored in, for example, a register of the first readout circuit 103A. The signal $D_{TOFD\_k}$ is a signal including offset noise and a pixel signal. The readout of the signal $D_{TOFD\_k}$ is referred to as a D-phase (Data Phase) readout, and a period during which the D-phase readout is performed is referred to as a D-phase period.

The first readout circuit 103A supplies the stored signal $D_{TOFP\_k}$ and the signal $D_{TOFD\_k}$ to the first data processing unit 108A. The first data processing unit 108A obtains a difference between the signal $D_{TOFP\_k}$ and the signal $D_{TOFD\_k}$. As a result, a pixel signal from which the offset noise has been removed can be obtained.

(RGB Pixel 110B)

Figure 26:
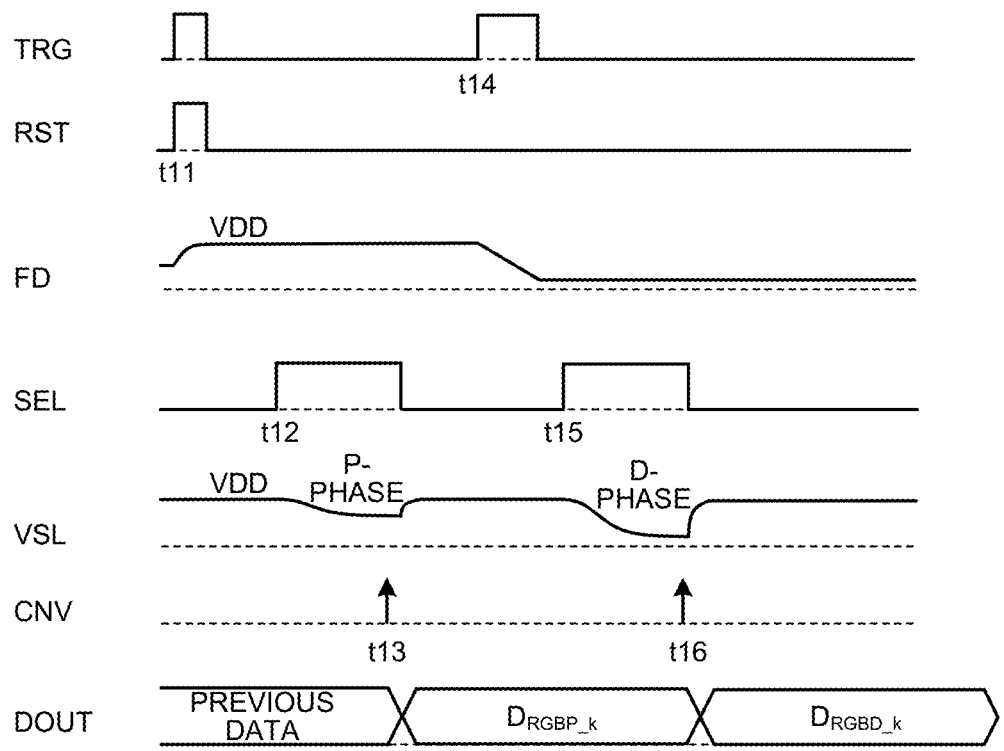
FIG. 26 is a time chart illustrating an example of a readout operation of an RGB pixel according to the embodiment of the present disclosure.

FIG. 26 is a time chart illustrating an example of a readout operation of the RGB pixel 110B according to the embodiment of the present disclosure. FIG. 26 illustrates an example of the readout operation of the RGB pixel 110B illustrated in FIG. 16.

In FIG. 26, "TRG", "RST", and "SEL" indicate a transfer pulse TRG, a reset pulse RST, and a selection signal SEL, respectively. "CNV" indicates a readout timing CNV by the second readout circuit 103B. "FD" indicates the amount of charge accumulated in the floating diffusion region FD1 of the RGB pixel 110B, and "VSL" indicates a level (voltage) of the pixel signal output from the vertical signal line VSL2. Further, DOUT indicates data DOUT after the AD conversion processing by the second readout circuit 103B.

In the time chart of FIG. 26, in the initial state, each of the selection signal SEL, the reset pulse RST, and the transfer pulse TRG is in the low state. In this state, the photoelectric conversion unit PD1 is exposed, and a charge generated by photoelectric conversion is continuously accumulated in the photoelectric conversion unit PD1.

At the time point t11, the reset pulse RST and the transfer pulse TRG are set to the high state, and the charge of the floating diffusion region FD2 is discharged to the power supply VDD, so that the potential of the floating diffusion region FD2 is reset to a predetermined potential VDD.

At the time point t12, the selection signal SEL is set to the high state, and the selection transistor 14 is turned on. As a result, a signal corresponding to the potential of the floating diffusion region FD1 is output to the vertical signal line VSL2.

At the time point t13, a reset level (black level) signal $D_{RGBP\_k}$ output to the vertical signal line VSL2 is converted into a digital value by the second readout circuit 103B, and temporarily stored in, for example, a register of the second readout circuit 103B. The signal $D_{RGBP\_k}$ is offset noise. The readout of the signal $D_{RGBP\_k}$ is referred to as P-phase (Pre-Charge) readout, and a period during which the P-phase readout is performed is referred to as a P-phase period.

Next, at the time point t14, the transfer pulse TRG goes into the high state. As a result, the charge generated by the photoelectric conversion unit PD1 is accumulated in the floating diffusion region FD1.

At the time point t15, the selection signal SEL is set to the high state, and the selection transistor 14 is turned on. As a result, a signal corresponding to the potential of the floating diffusion region FD1 is output to the vertical signal line VSL2.

At the time point t16, a signal $D_{RGBD\_k}$ output to the vertical signal line VSL2 is converted into a digital value by the second readout circuit 103B, and is temporarily stored in, for example, a register of the second readout circuit 103B. The signal $D_{RGBD\_k}$ is a signal including offset noise and a pixel signal. The readout of the signal $D_{RGBD\_k}$ is referred to as D-phase (Data Phase) readout, and a period during which the D-phase readout is performed is referred to as a D-phase period.

The second readout circuit 103B supplies the stored signal $D_{RGBP\_k}$ and signal $D_{RGBD\_k}$ to the second data processing unit 108B. The second data processing unit 108B obtains a difference between the signal $D_{RGBP\_k}$ and the signal $D_{RGBD\_k}$. As a result, a pixel signal from which the offset noise has been removed can be obtained.

(Time Division)

Figure 27:
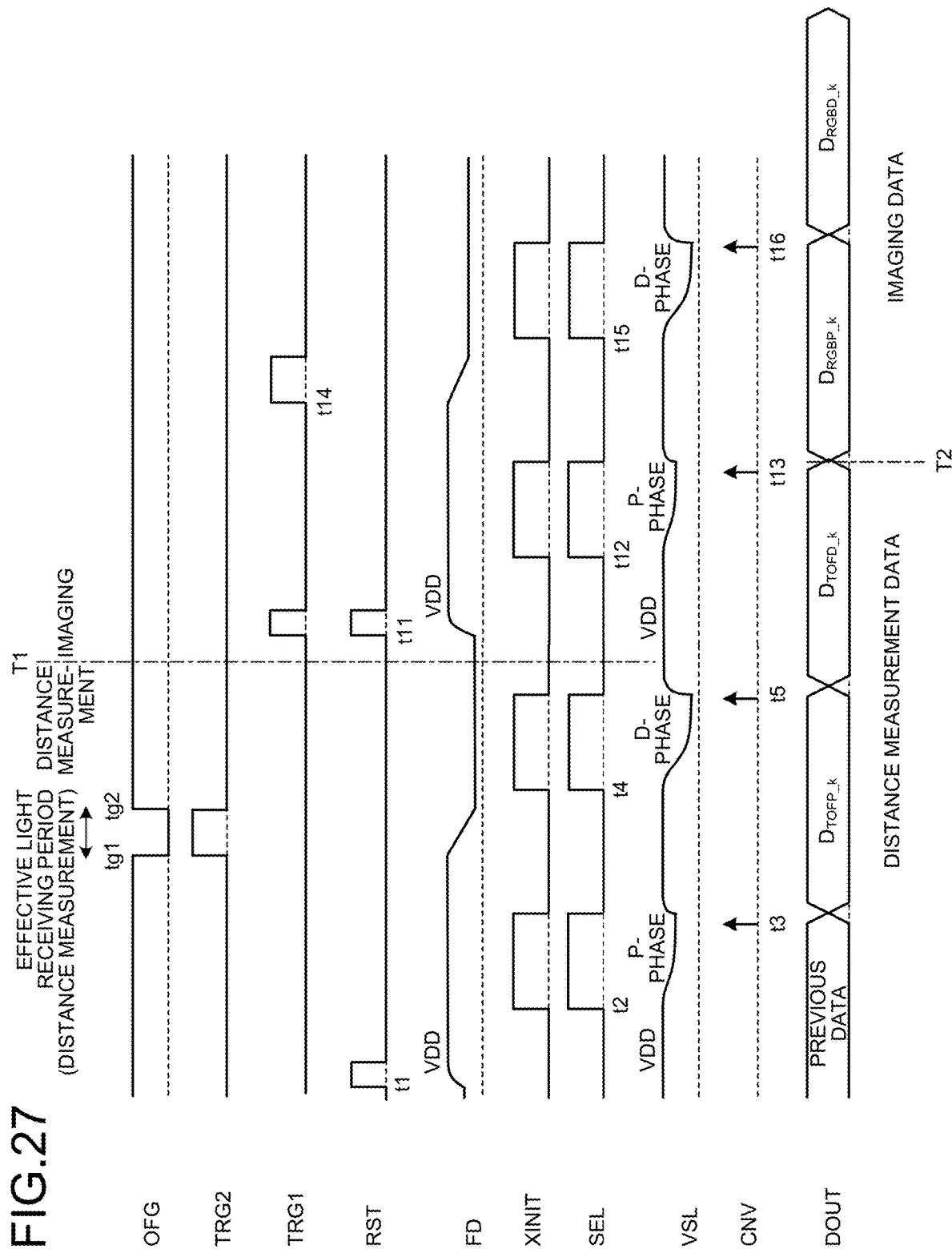
FIG. 27 is a time chart illustrating an example of a readout operation of the unit pixel according to the embodiment of the present disclosure.

FIG. 27 is a time chart illustrating an example of the readout operation of the unit pixel 110 according to the embodiment of the present disclosure. FIG. 27 illustrates an example of the readout operation of the unit pixel 110 illustrated in FIG. 17.

As illustrated in FIG. 27, the solid-state imaging device 100 switches the operation from "distance measurement" to "imaging" at the time point T1. The solid-state imaging device 100 executes the readout operation of the IR pixel 110A until the time point T1, and acquires distance measurement data by performing distance measurement. It is noted that the readout operation of the IR pixel 110A is the same as that in FIG. 25, and thus description thereof is omitted.

Next, the solid-state imaging device 100 executes the readout operation of the RGB pixel 110B after the time point T1, and performs imaging. As a result, the solid-state imaging device 100 acquires the imaging data after the time point T2 when one clock has elapsed from the time point T1. It is noted that the readout operation of the RGB pixel 110B is the same as that in FIG. 26, and thus description thereof is omitted.

<3.2. Detection Operation>

Figure 28:
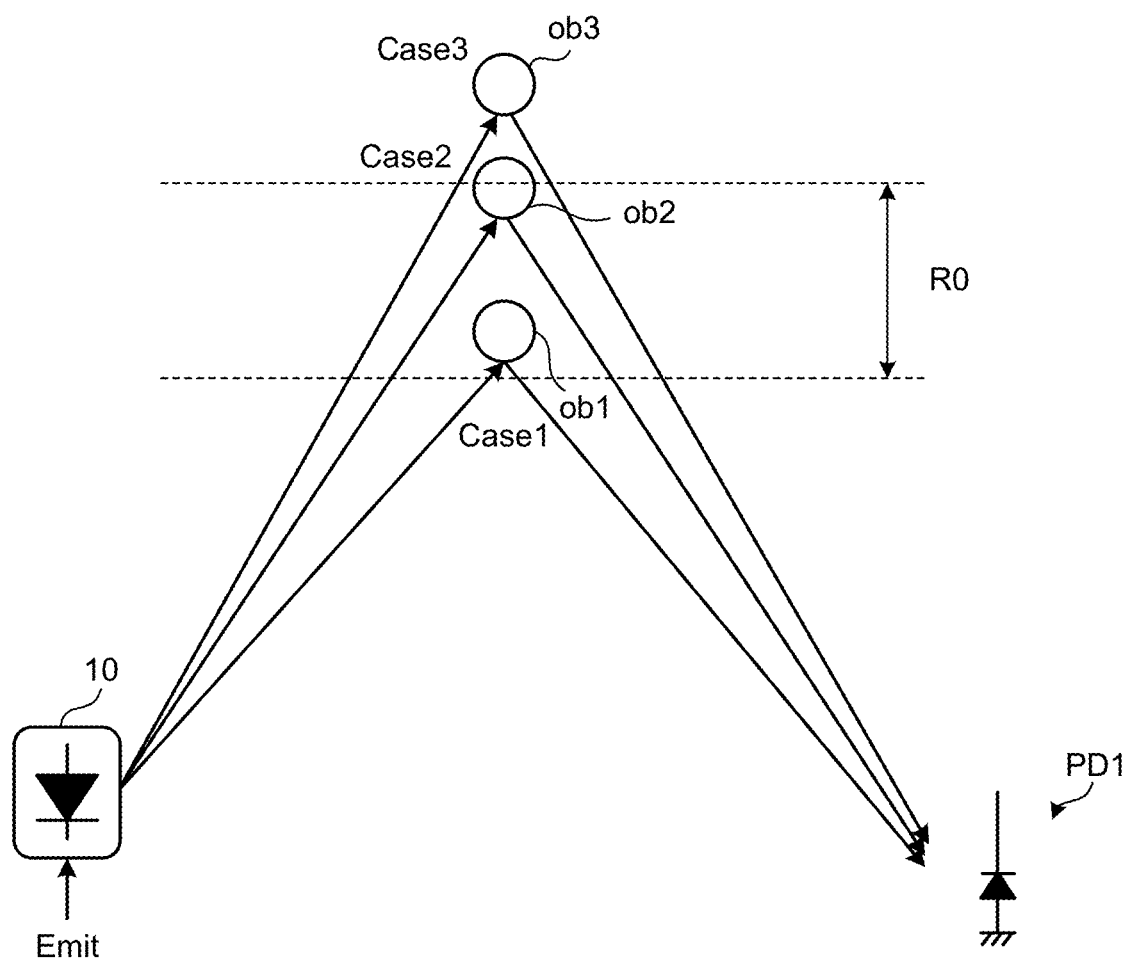
FIG. 28 is a diagram illustrating an object detection operation according to the embodiment of the present disclosure.
Figure 29:
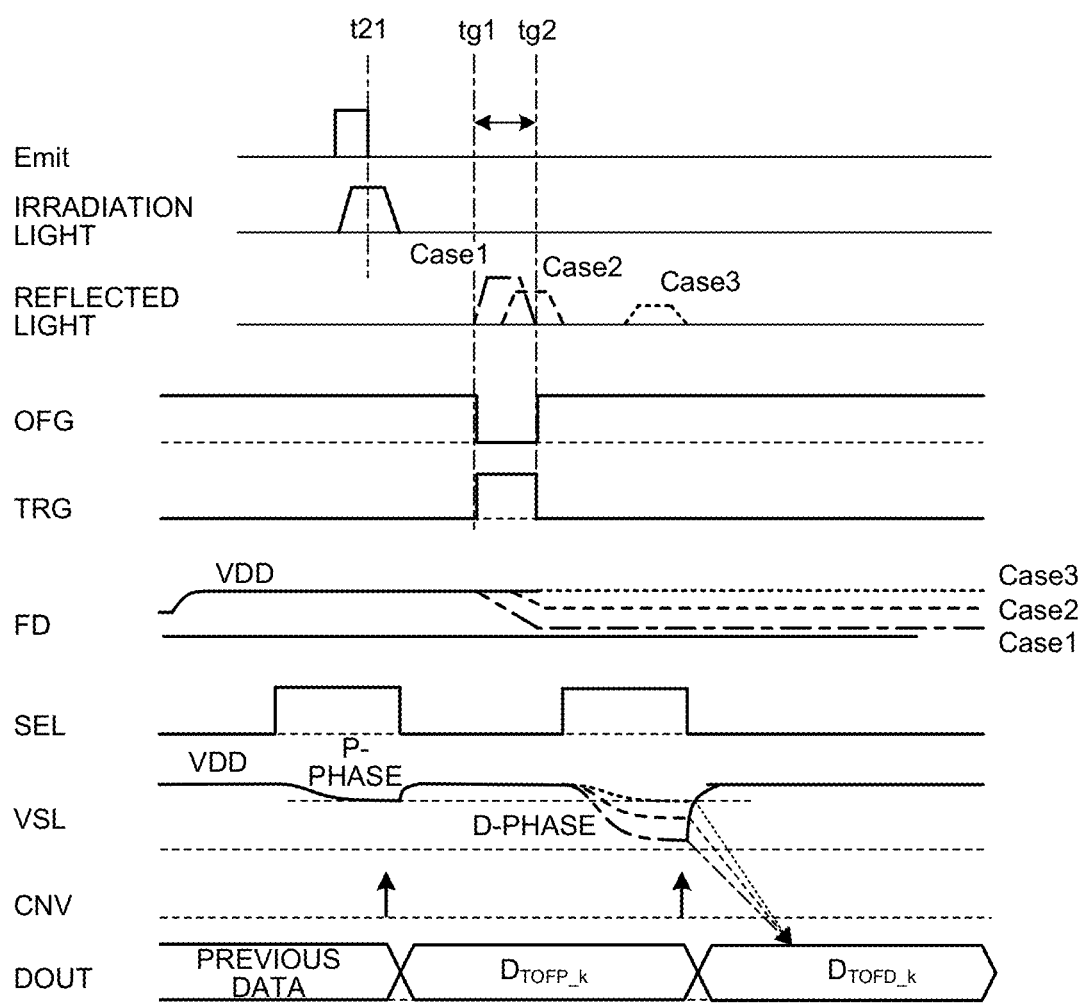
FIG. 29 is a diagram illustrating the object detection operation according to the embodiment of the present disclosure.

Next, an object detection operation by the solid-state imaging device 100 will be described with reference to FIGS. 28 and 29. FIGS. 28 and 29 are diagrams illustrating the object detection operation according to the embodiment of the present disclosure.

As illustrated in FIG. 28, the solid-state imaging device 100 detects the object ob in the distance range R0. Here, a case where the object ob exists within the distance range R0 will be described as Case 1, a case where the object ob exists at a boundary farther from the solid-state imaging device 100 in the distance range R0 will be described as Case 2, and a case where the object ob exists outside the distance range R0 will be described as Case 3.

"Emit" illustrated in FIG. 29 is a control signal Emit for controlling the light source 30, and is generated by the pulse generation unit 104 and supplied to the light source 30. The light source 30 emits light when the control signal Emit is in the high state, and emits irradiation light (IR) at the time t21.

The irradiation light emitted from the light source 30 is reflected by the object ob and is incident on the photoelectric conversion unit PD1 of the IR pixel 110A as reflected light (refer to FIG. 28). The reflected light is incident on the photoelectric conversion unit PD1 with a time difference corresponding to a distance between the solid-state imaging device 100 and the object ob.

As described above, the IR pixel 110A performs exposure in the effective light receiving period, and photoelectrically converts the reflected light. The effective light receiving period is between the time point tg1 and the time point tg2, and is set according to the distance range R0. Assuming that the distance range R0 is a range from a position distant from the solid-state imaging device 100 by a distance R1 to a position distant from the solid-state imaging device 100 by a distance R2 (refer to FIG. 3), R1=c/(tg1/2) and R2=c/(tg2/2). The solid-state imaging device 100 sets the effective light receiving period according to the distance range R0 set in advance.

The solid-state imaging device 100 exposes the IR pixel 110A by setting the drive signal OFG to the low state in the effective light receiving period.

In a case where the object ob exists within the distance range R0 (Case 1), the reflected light reaches the photoelectric conversion unit PD1 within the effective light receiving period. Therefore, in Case 1, the amount of charge accumulated in the floating diffusion region FD2 increases, and the level (voltage) of the pixel signal output from the vertical signal line VSL1 also significantly changes from the level of a P-phase pixel signal.

On the other hand, in a case where the object ob exists near the boundary of the distance range R0 (Case 2), the time at which the reflected light reaches the photoelectric conversion unit PD1 is later than that in Case 1, and is near the end of the effective light receiving period. Further, the intensity of the reflected light is also smaller than that in Case 1. Therefore, in Case 2, the amount of charge accumulated in the floating diffusion region FD2 is smaller than that in Case 1. In addition, a change in the level of the pixel signal output from the vertical signal line VSL1 is smaller than that in Case 1.

In addition, in a case where the object ob exists outside the distance range R0 (Case 3), since reflected light reaches the photoelectric conversion unit PD1 after the effective light receiving period elapses, photoelectric conversion by the reflected light is not performed. Therefore, in Case 3, the amount of charge of the floating diffusion region FD2 does not change, and a D-phase pixel signal level output from the vertical signal line VSL1 is also substantially the same as the P-phase pixel signal level.

As described above, by setting the effective light receiving period according to the distance range R0, the solid-state imaging device 100 can acquire a pixel signal having a high signal level in a case where the object ob exists within the distance range R0.

The first data processing unit 108A of the solid-state imaging device 100 acquires, for example, a difference between the D-phase pixel signal and the P-phase pixel signal from the first readout circuit 103A as a pixel signal of the IR pixel 110A. The first data processing unit 108A compares a threshold value TH with the acquired pixel signal, and determines whether or not the object ob exists in the distance range R0 from the comparison result.

For example, when the level of the pixel signal is equal to or greater than the threshold value TH, the first data processing unit 108A determines that the object ob exists in the distance range R0.

<3.3. Imaging Operation>
(Imaging Processing)

Figure 30:
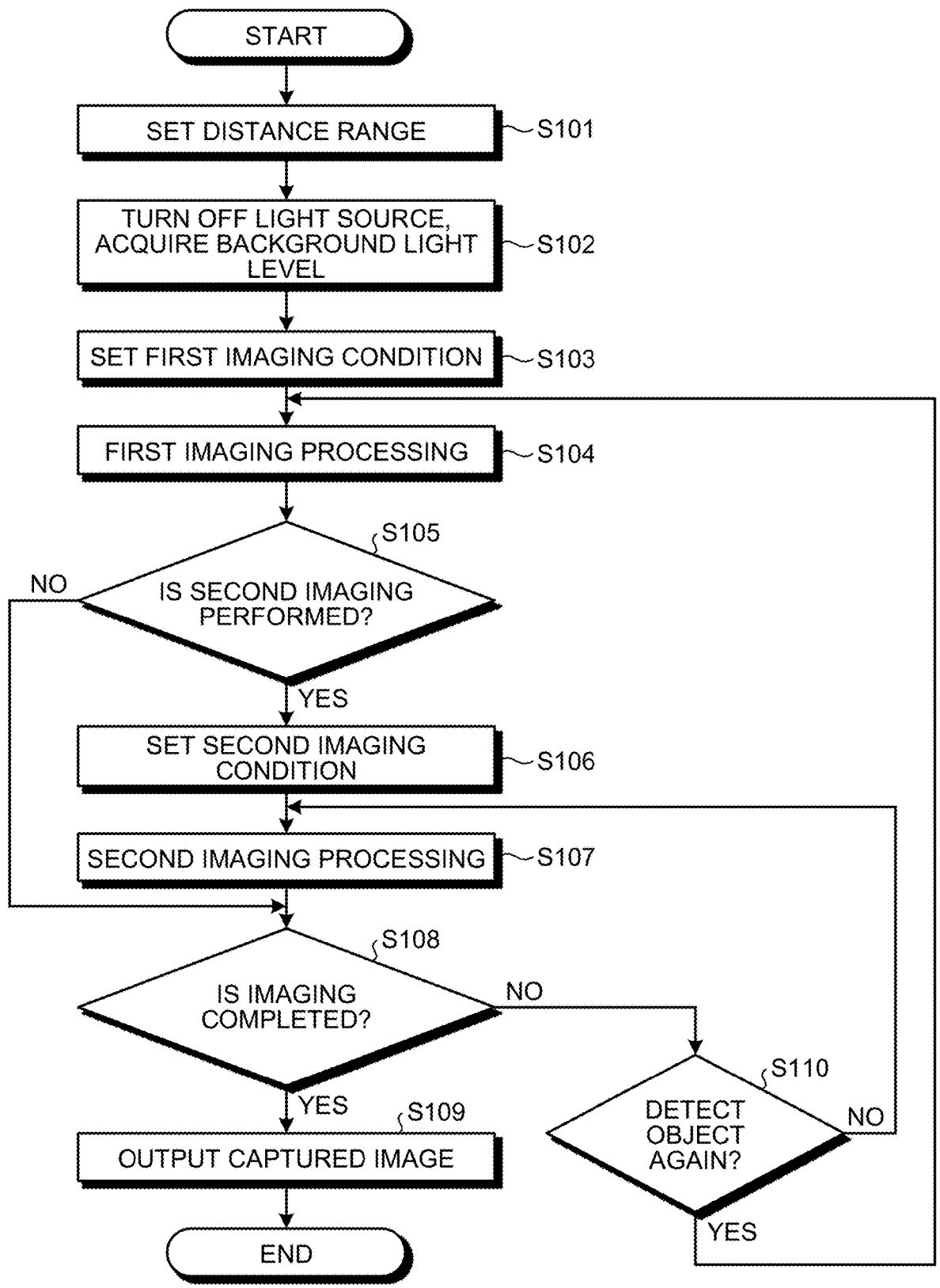
FIG. 30 is a flowchart illustrating an example of a flow of imaging processing by the solid-state imaging device according to the embodiment of the present disclosure.

An imaging operation by the solid-state imaging device 100 will be described with reference to FIG. 30. FIG. 30 is a flowchart illustrating an example of a flow of imaging processing by the solid-state imaging device 100 according to the embodiment of the present disclosure. The solid-state imaging device 100 executes imaging processing illustrated in FIG. 30 as an imaging operation.

As illustrated in FIG. 30, the solid-state imaging device 100 sets a distance range R0 (step S101). For example, the distance range R0 can be set by allowing a user to directly input a specific distance range. Alternatively, the user may specify the distance range R0 by performing a so-called placing pin in which the focus of the solid-state imaging device 100 is adjusted to a desired position in advance. In this case, the solid-state imaging device 100 sets the distance range R0 according to a focal position.

Next, the solid-state imaging device 100 performs imaging by turning off the light source 30, and acquires a background light level (step S102). Subsequently, the solid-state imaging device 100 sets a first imaging condition according to the acquired background light level (step S103). Here, the first imaging is imaging for detecting the object ob existing in the distance range R0, and the same is imaging for performing distance measurement (for example, ToF) by IR.

The solid-state imaging device 100 sets an irradiation level and a light emission time of the light source 30 as the first imaging condition according to, for example, the background light level and the distance range R0. Furthermore, the solid-state imaging device 100 sets tg1 and tg2 (refer to FIG. 29) of the effective light receiving period and the number of times of integration performed in one imaging as the first imaging condition.

It is noted that the first imaging condition is an example, and is not limited thereto. For example, in a case where imaging is performed a predetermined number of times of integration in advance, the solid-state imaging device 100 may partially omit setting of the first imaging condition. Alternatively, the solid-state imaging device 100 may set a first imaging condition other than the above-described first imaging condition.

Subsequently, the solid-state imaging device 100 executes first imaging processing (step S104) and detects whether or not the object ob exists in the distance range R0. Details of the first imaging processing will be described later.

The solid-state imaging device 100 determines whether or not to perform second imaging (step S105). The second imaging is to capture an image of the object ob, and is, for example, imaging for acquiring a color image.

In a case where the object ob, which is an imaging target, does not exist within the distance range R0, the solid-state imaging device 100 determines not to perform the second imaging (step S105; No), and the processing proceeds to step S108.

On the other hand, in a case where the object ob, which is an imaging target, exists within the distance range R0, the solid-state imaging device 100 determines to perform the second imaging (step S105; Yes), and a second imaging condition is set (step S106). For example, the solid-state imaging device 100 sets an exposure time, a scanning range (a size of a captured image), and the like of the second imaging. It is noted that the solid-state imaging device 100 sets the scanning range by designating a drive target row and a readout target column.

As described above, in a case where the object ob exists within the distance range R0, the solid-state imaging device 100 may capture an image of the entire screen (refer to FIGS. 3 and 4), or may capture an image of the extraction region including the object ob (refer to FIGS. 7 and 8).

In a case where the entire screen is imaged, the solid-state imaging device 100 sets the scanning range for all the RGB pixels 110B. On the other hand, in a case where the extraction region is imaged, the solid-state imaging device 100 sets the extraction region, and sets the scanning range for the RGB pixel 110B of the set extraction region. It is noted that details of the setting of the extraction region will be described later.

The solid-state imaging device 100 executes second imaging processing (step S107) to obtain a captured image. The solid-state imaging device 100 determines whether or not to end imaging (step S108).

When ending the imaging (step S108; Yes), the solid-state imaging device 100 outputs the captured image to the processor 20 (refer to FIG. 1) in the subsequent stage (step S109), and ends the processing.

On the other hand, in a case where imaging is continuously performed (step S108; No), the solid-state imaging device 100 determines whether or not to re-detect the object ob (step S110).

For example, when the object ob moves at a high speed, the solid-state imaging device 100 can track and capture an image of the object ob at a high speed by detecting the object ob again every time the second imaging is performed (high-speed tracking mode). On the other hand, when the moving speed of the object ob is slow, the solid-state imaging device 100 can reduce the detection load of the object ob by omitting the detection of the object ob and performing the second imaging under the second imaging condition set in step S106.

When performing imaging in the high-speed tracking mode, the solid-state imaging device 100 determines to re-detect the object ob (step S110; Yes), and the processing returns to step S104. On the other hand, when not performing imaging in the high-speed tracking mode, the solid-state imaging device 100 determines not to re-detect the object ob (step S110; No), and the processing returns to step S107.

(First Imaging Processing)

Figure 31:
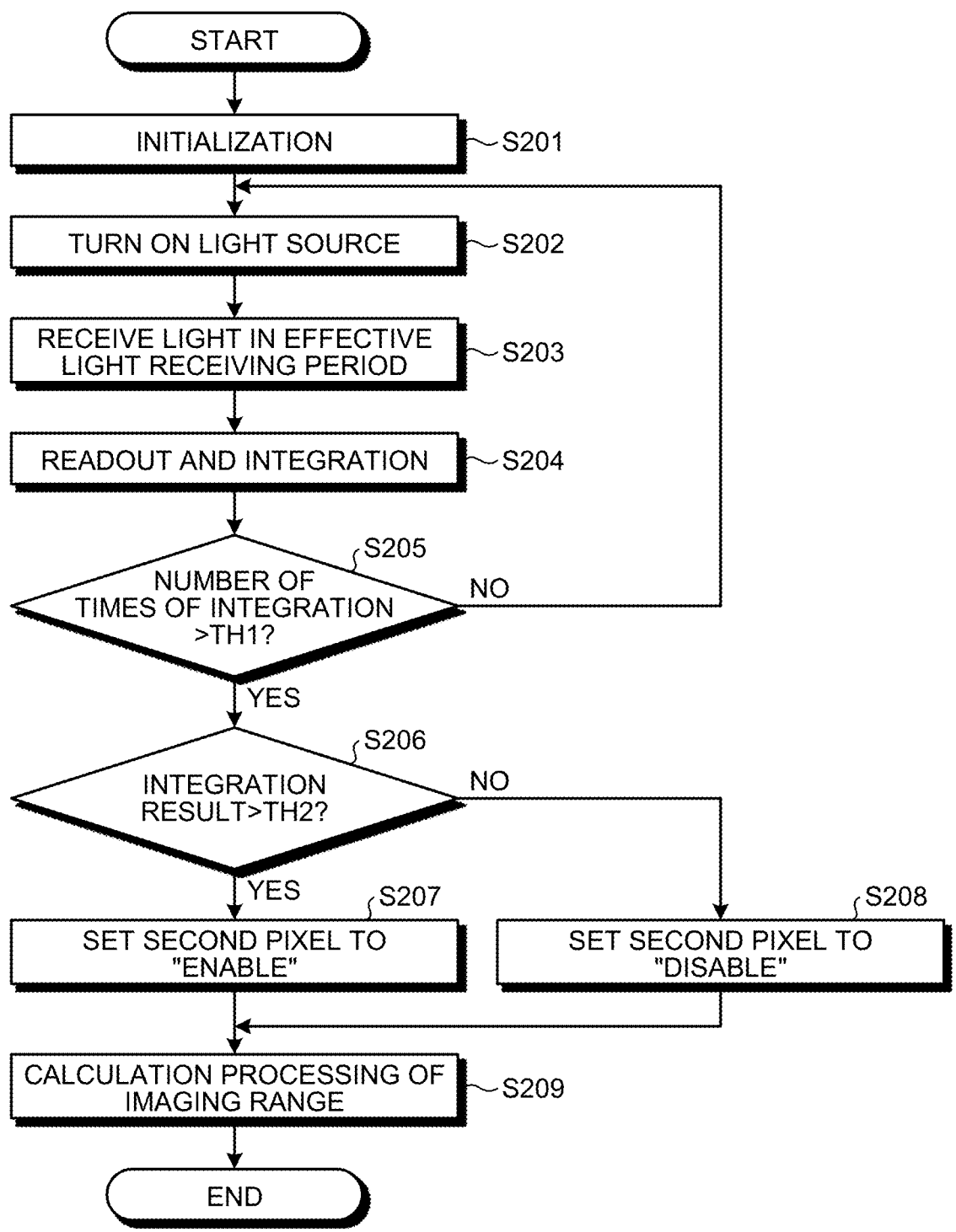
FIG. 31 is a flowchart illustrating an example of a flow of first imaging processing according to the embodiment of the present disclosure.

Next, the first imaging processing will be described with reference to FIG. 31. FIG. 31 is a flowchart illustrating an example of a flow of the first imaging processing according to the embodiment of the present disclosure.

The solid-state imaging device 100 initializes a variable used in the first imaging processing (step S201). For example, the solid-state imaging device 100 initializes a variable for counting the number of times of integration.

Next, the solid-state imaging device 100 turns on the light source 30 at a light emission level and a light emission time based on a first imaging condition, and emits irradiation light (step S202). Subsequently, the solid-state imaging device 100 receives reflected light in the effective light receiving period (step S203).

The solid-state imaging device 100 reads out the charges accumulated in the effective light receiving period and integrates the readout results (step S204). The solid-state imaging device 100 determines whether or not the number of times of integration executed in step S204 is greater than a threshold value TH1 (step S205). When the number of times of integration is equal to or less than the threshold value TH1 (step S205; No), the processing returns to step S202.

When the number of times of integration is greater than the threshold value TH1 (step S205; Yes), the solid-state imaging device 100 determines whether or not the integration result is greater than a threshold value TH2 (step S206).

As described above, in a case where the object ob exists in the distance range R0, the light reception by the reflected light is performed within the effective light receiving period, and the pixel signal increases. Therefore, when the object ob exists in the distance range R0, the integration result becomes greater than the threshold value TH2.

In a case where the integration result is greater than the threshold value TH2 (step S206; Yes), the solid-state imaging device 100 considers that the object ob in the distance range R0 is detected with the first pixel (IR pixel) 110A, and sets the corresponding second pixel (RGB pixel) 110B to "Enable" (step S207). Here, the corresponding second pixel 110B is a pixel included in the same unit pixel 110 as the first pixel 110A that has detected the object ob, and the same is, for example, a pixel arranged in the vicinity of the first pixel 110A that has detected the object ob.

On the other hand, in a case where the integration result is equal to or less than the threshold value TH2 (step S206; No), the solid-state imaging device 100 determines that the object ob in the distance range R0 is not detected by the first pixel, and sets the corresponding second pixel 110B to "Disable" (step S208).

When setting "Enable" or "Disable" to the second pixel 110B, the solid-state imaging device 100 executes calculation processing of the imaging range (extraction region) of the second imaging (step S209). For example, in a case where all the second pixels 110B are set to "Disable", the solid-state imaging device 100 determines that the object ob does not exist within the distance range R0, and determines that there is no imaging range (second imaging is not performed).

On the other hand, in a case where at least one second pixel 110B is set to "Enable", the solid-state imaging device 100 sets the imaging range on the assumption that the object ob exists within the distance range R0. For example, as described above, in a case where the entire screen imaging is performed as the second imaging, the solid-state imaging device 100 calculates the entire screen, in other words, all the second pixels 110B, as the imaging range.

As described above, in a case where the extraction region including the object ob is imaged as the second imaging, the solid-state imaging device 100 sets the extraction region (ROI) as the imaging range. Hereinafter, calculation processing of the imaging range in a case where the extraction region is set as the imaging range will be described with reference to FIGS. 32 and 33.

(Calculation Processing of Imaging Range)

Figure 32:
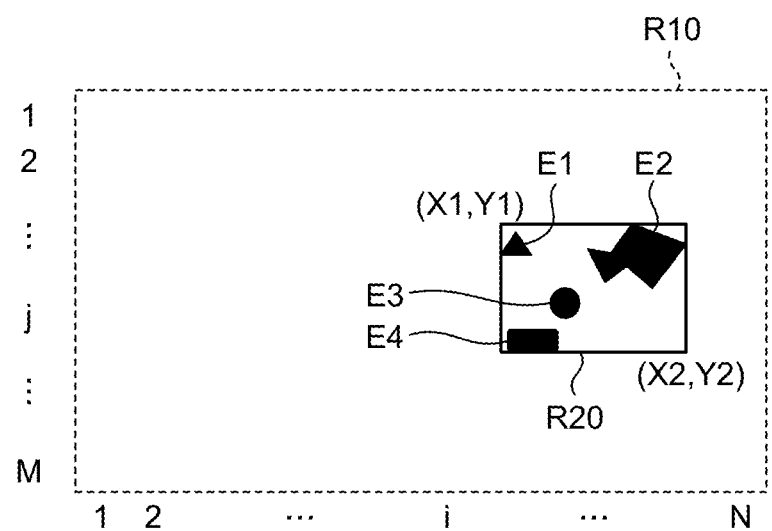
FIG. 32 is a diagram illustrating an imaging range according to the embodiment of the present disclosure.

FIG. 32 is a diagram illustrating an imaging range according to the embodiment of the present disclosure. In FIG. 32, effective regions E1 to E4 including the second pixel 110B set to "Enable" are illustrated in black.

As illustrated in FIG. 32, the solid-state imaging device 100 calculates an extraction region R20 including the effective regions E1 to E4 in an entire screen R10 as an imaging range. FIG. 32 illustrates a case where the extraction region R20 is a rectangular region designated by coordinates (X1, Y1) and (X2, Y2). Furthermore, in the following descriptions, as illustrated in FIG. 32, a first column, a second column, ..., a j-th column, ..., and an M-th column will be described from the top to the bottom of the entire screen R10 of the solid-state imaging device 100, and a first row, a second row, ..., an i-th row, ..., and an N-th row will be described from the left to the right.

Next, a flow of calculation processing of the imaging range will be described with reference to FIG. 33. FIG. 33 is a flowchart illustrating an example of a flow of calculation processing of the imaging range according to the embodiment of the present disclosure.

First, the solid-state imaging device 100 initializes variables used for processing (step S301). For example, the solid-state imaging device 100 initializes variables X1j=N and X2j=1 (j=1 to M) by substituting these variables. It is noted that M indicates the number of columns of the second pixel 110B of the solid-state imaging device 100 and N indicates the number of rows thereof. Next, the solid-state imaging device 100 substitutes 1 for the variable j (step S302).

The solid-state imaging device 100 acquires data Di (i=1 to N) of the N-th row in the j-th column of the pixel array unit 101 (step S303). Here, the data Di is data related to the second pixel 110B, and includes data indicating whether or not the second pixel 110B is a pixel set to "Enable" (hereinafter, the pixel is referred to as an Enable pixel).

The solid-state imaging device 100 scans the data Di in the direction from 1 to N, and stores the X coordinates of the first detected Enable pixel in a variable X1j (step S303). Subsequently, the solid-state imaging device 100 scans the data Di in the reverse direction, that is, in the direction from N to 1, and stores the X coordinates of the first detected Enable pixel in a variable X2j (step S304).

Next, the solid-state imaging device 100 increments the variable j by 1 (j=j+1) (step S306), and determines whether or not j is greater than M (step S307). When the scanning has not been completed up to the last column and j is M or less (step S307; No), the solid-state imaging device 100 returns to step S303 and scans the next column.

On the other hand, in a case where the scanning has been completed up to the last column and j is greater than M (step S307; Yes), the solid-state imaging device 100 determines X coordinates X1, X2 of the imaging range R20 according to the variables X1j, X2j (step S308). Specifically, the solid-state imaging device 100 determines, as X1, a variable having the smallest coordinates among the variables X1j (j=1 to M). Furthermore, the solid-state imaging device 100 determines, as X2, a variable having the largest coordinates among the variables X2j.

Next, the solid-state imaging device 100 initializes variables (step S309). The solid-state imaging device 100 sets the Y coordinate Y1 of the imaging range R20 to Y1=N. Subsequently, the solid-state imaging device 100 substitutes 1 for the variable j (step S310).

The solid-state imaging device 100 determines whether or not the X coordinates of the Enable pixel stored in the variable X1j in the j-th column (hereinafter, simply referred to as X1j) is equal to or less than the X coordinate of the Enable pixel stored in the variable X2j (hereinafter, simply referred to as X2j) (step S311).

As described above, the variable X1j stores the X coordinates of the Enable pixel detected first in a case where scanning is performed in order from the smallest row number, and the variable X2j stores the X coordinates of the Enable pixel detected first in a case where scanning is performed in order from the largest row number. Therefore, in a case where X1j>X2j, there is no Enable pixel in the j-th column, and all the second pixels 110B in the j-th column become Disable pixels. Furthermore, in a case where X1j≤X2j, at least one Enable pixel exists in the j-th column.

Therefore, in a case where the solid-state imaging device 100 determines that X1j>X2j, that is, there is no Enable pixel in the j-th column (step S311; No), the solid-state imaging device 100 increments the variable j by 1 (j=j+1) (step S312), and determines whether or not j is larger than M (step S313). When the scanning has not been completed up to the last column and j is M or less (step S313; No), the solid-state imaging device 100 returns to step S311. When the scanning has been completed up to the last column and j is larger than M (step S313; Yes), the solid-state imaging device 100 proceeds to step S321.

On the other hand, in a case where X1j≤X2j, that is, in a case where it is determined that there is an Enable pixel in the j-th column (step S311; Yes), the Y-coordinate Y1 of the imaging range R20 is set as Y1=j (step S314).

Next, the solid-state imaging device 100 initializes variables (step S315). The solid-state imaging device 100 sets the Y coordinate Y2 of the imaging range R20 to Y2=1. Subsequently, the solid-state imaging device 100 substitutes M for the variable j (step S316).

The solid-state imaging device 100 determines whether or not the X coordinate X1j of the Enable pixel in the j-th column is equal to or less than the X coordinate X2j of the Enable pixel (step S317).

In a case where the solid-state imaging device 100 determines that X1j>X2j, that is, there is no Enable pixel in the j-th column (step S317; No), the solid-state imaging device 100 decreases the variable j by 1 (j=j−1) (step S318), and determines whether or not j is greater than 0 (step S319). In a case where the scanning of all the columns is not completed and j is greater than 0 (step S319; No), the solid-state imaging device 100 returns to step S317. When the scanning of all the columns is completed and j is 0 or less (step S319; Yes), the solid-state imaging device 100 proceeds to step S321.

On the other hand, in a case where X1j≤X2j, that is, in a case where it is determined that there is an Enable pixel in the j-th column (step S317; Yes), the Y coordinate Y2 of the imaging range R20 is set as Y2=j (step S320).

The solid-state imaging device 100 outputs the rectangular region designated by the calculated coordinates (X1, Y1) and (X2, Y2) as the imaging range R20 (step S321), and ends the processing.

It is noted that, in a case where the coordinates (X1, Y1) and (X2, Y2) of the imaging range R20 satisfy X1>X2 and Y1>Y2, the solid-state imaging device 100 can determine that there is no effective imaging range R20, in other words, the object ob to be imaged does not exist within the distance range R0. Furthermore, here, the solid-state imaging device 100 calculates the imaging range R20 from the entire screen R10, but the present disclosure is not limited thereto. The solid-state imaging device 100 may calculate the imaging range R20 by limiting the same to a partial range, such as half of the entire screen R10. For example, the solid-state imaging device 100 can calculate the imaging range R20 in the next imaging from a range based on the previous imaging range R20.

<3.4. Output Format>

The solid-state imaging device 100 outputs the image data captured in the second imaging processing to the processor 20 in the subsequent stage. FIGS. 34 and 35 are diagrams illustrating an example of a format of image data output by the solid-state imaging device 100 according to the embodiment of the present disclosure.

As illustrated in FIG. 34, the image data is data including a header, ROI image data, and a footer. The ROI image data includes at least one set of data obtained in the second imaging processing. One set of data is data of a pixel signal obtained by one second imaging processing, and in a case where the second imaging is performed K times, K sets of data are included in the ROI image data.

As illustrated in FIG. 35, the header includes output start recognition information indicating start of output of image data, and information related to the number of scanning regions, which is the number of times of second imaging. FIG. 35 illustrates that the number of scanning regions is K, and the solid-state imaging device 100 performs the second imaging K times.

The ROI image data includes scanning range-related information I_1 to I_K which is information related to the imaging range R20. In FIG. 35, the scanning range-related information includes the origin coordinates and the size of the imaging range R20, but may include coordinates (X1, Y1) and (X2, Y2) of the imaging range R20.

Further, the ROI image data includes image data D_1 to D_K. The image data D_1 to D_K are data including the image signal acquired from the second pixel 110B. The scanning range-related information and the image data are stored in the ROI image data in association with each other.

The footer includes output end recognition information indicating output end of the image data. The processor 20 recognizes the start of output of the image data by recognizing the output start recognition information, and recognizes the end of output of the image data by recognizing the output end recognition information.

It is noted that the format of the image data output by the solid-state imaging device 100 is not limited to the example of FIG. 35. FIG. 36 is a diagram illustrating another example of the format of the image data output by the solid-state imaging device 100 according to the embodiment of the present disclosure.

The format illustrated in FIG. 36 is different from the format of FIG. 35 in that the header includes the output start recognition information, the number of scanning regions, and a scanning range size. The scanning range size is information indicating the size of the imaging range.

For example, in a case where the second imaging is performed, it is conceivable to perform imaging with a fixed size without changing the size of the imaging range for each imaging. By performing the second imaging with the fixed size in this manner, the solid-state imaging device 100 can reduce the processing load of the calculation processing of the imaging range and the second imaging processing.

In this case, as the format of the image data output by the solid-state imaging device 100, the scanning range size indicating the size of the scanning region (imaging range) may be included in the header, and the origin information of the scanning region may be included in the scanning range-related information of the ROI image data.

As described above, by including the scanning range size indicating the size of the scanning region (imaging range) in the header, the information on the size can be omitted from the scanning range-related information of the ROI image data. As a result, the information amount of the ROI image data, in other words, the information amount of the image data can be reduced.

4. Other Embodiments

<4.1. Correction of Effective Region>

In the above-described embodiment, the second pixel 110B corresponding to the first pixel 110A that has detected the object ob is set as the Enable pixel, but the present disclosure is not limited thereto. For example, the solid-state imaging device 100 may correct the set effective region.

Figure 37:
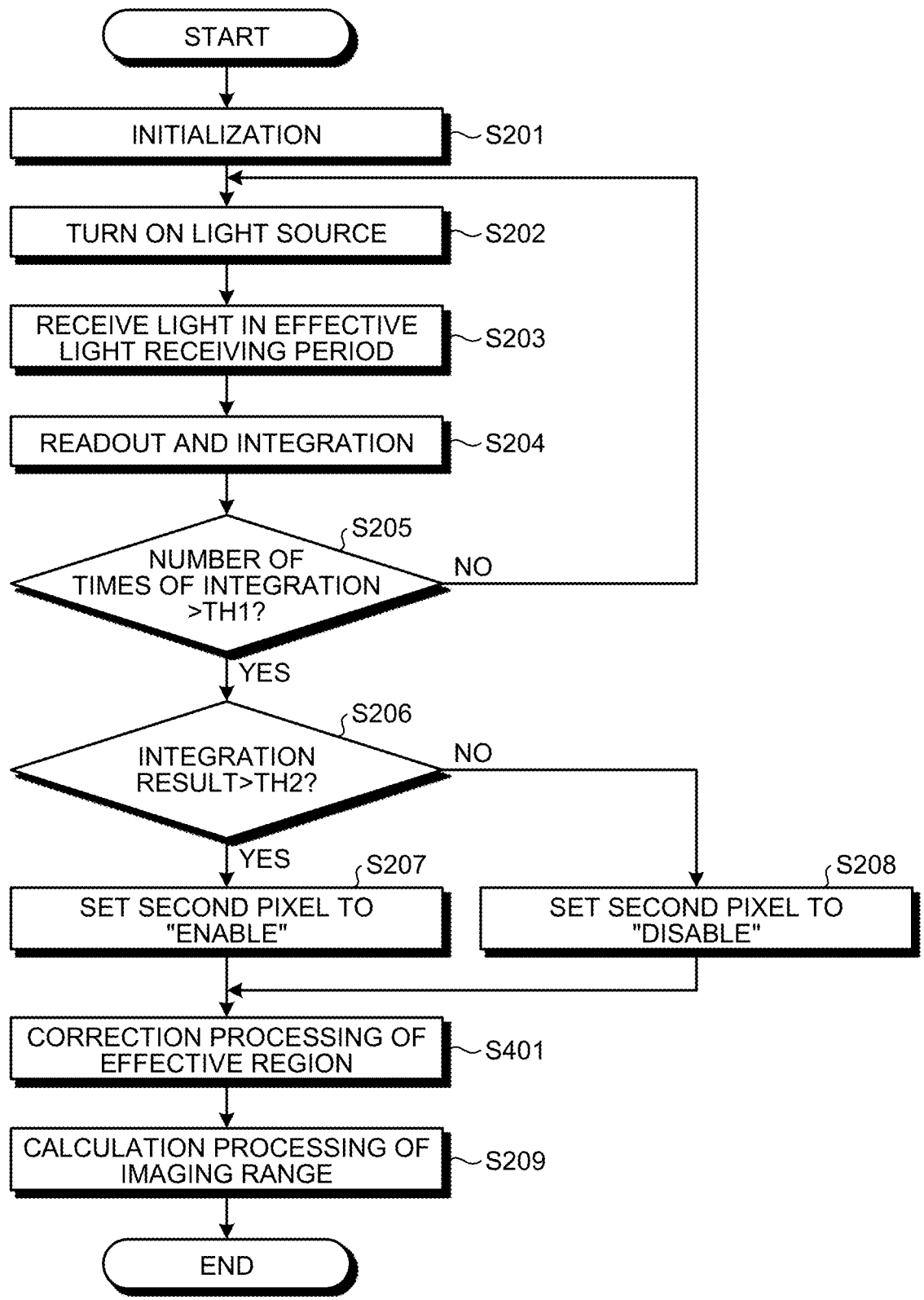
FIG. 37 is a flowchart illustrating another example of the flow of the first imaging processing according to the embodiment of the present disclosure.

FIG. 37 is a flowchart illustrating another example of the flow of the first imaging processing according to the embodiment of the present disclosure. The first imaging processing illustrated in FIG. 37 is the same as the first imaging processing illustrated in FIG. 31 except that the correction processing of the effective region is performed in step S401 after the Enable pixel and the Disable pixel are set in steps S207 and S208.

As illustrated in FIG. 37, after setting the Enable pixel and the Disable pixel in steps S207 and S208, the solid-state imaging device 100 executes the correction processing of the effective region (step S401). For example, the solid-state imaging device 100 corrects the effective region using a function for correcting the effective region. It is assumed that the function is defined in advance.

FIGS. 38A, 38B, 38C, 38D, 38E, and 38F are diagrams illustrating a correction example of the effective region by the solid-state imaging device 100 according to the embodiment of the present disclosure. In FIG. 38A, an example of the effective region before correction is indicated by a black region. In FIGS. 38B, 38C, 38D, 38E, and 38F, an example of the effective region before correction is indicated by a black region, and an example of the effective region after correction is indicated by a solid line.

For example, the solid-state imaging device 100 can correct the effective region by enlarging the effective region before correction (FIG. 38B). It is noted that, here, the correction of enlarging the effective region has been described, but similarly, the solid-state imaging device 100 may perform correction of reducing the effective region.

Alternatively, the solid-state imaging device 100 can correct the effective region, for example, by smoothing the effective region before correction (FIG. 38C).

Furthermore, the solid-state imaging device 100 can correct the effective region, for example, by performing single connection that connects a plurality of effective regions into one (FIG. 38D). For example, the solid-state imaging device 100 can correct the effective region by connecting the plurality of effective regions into one and performing convexization for smoothing on the connected effective region (FIG. 38E). It is noted that, here, the solid-state imaging device 100 is assumed to connect a plurality of effective regions into one, but the number of effective regions after connection is not limited to one and may be plural in number.

For example, the solid-state imaging device 100 can correct the effective region by performing normalization to convert the effective region before correction into a region of a prescribed shape (FIG. 38F). FIG. 38F illustrates an example in which the prescribed shape is normalized by a rectangular region having a prescribed vertical and horizontal size. In this case, for example, the solid-state imaging device 100 corrects the effective region by determining a rectangular region having a prescribed shape so that the center of gravity of the region matches the center of gravity of the effective region before correction.

As described above, the solid-state imaging device 100 can acquire image data in accordance with, for example, signal processing in the subsequent stage by correcting the effective region. In addition, by correcting the effective region to a simple shape or reducing the number of the plurality of effective regions, it is possible to reduce the processing load of the signal processing in the subsequent stage.

<4.2. Correction of Captured Image>

In the above-described embodiment, the solid-state imaging device 100 performs the second imaging with the extraction region as the imaging range and outputs the captured image, but the present disclosure is not limited thereto. For example, the solid-state imaging device 100 may correct the captured image.

Figure 39:
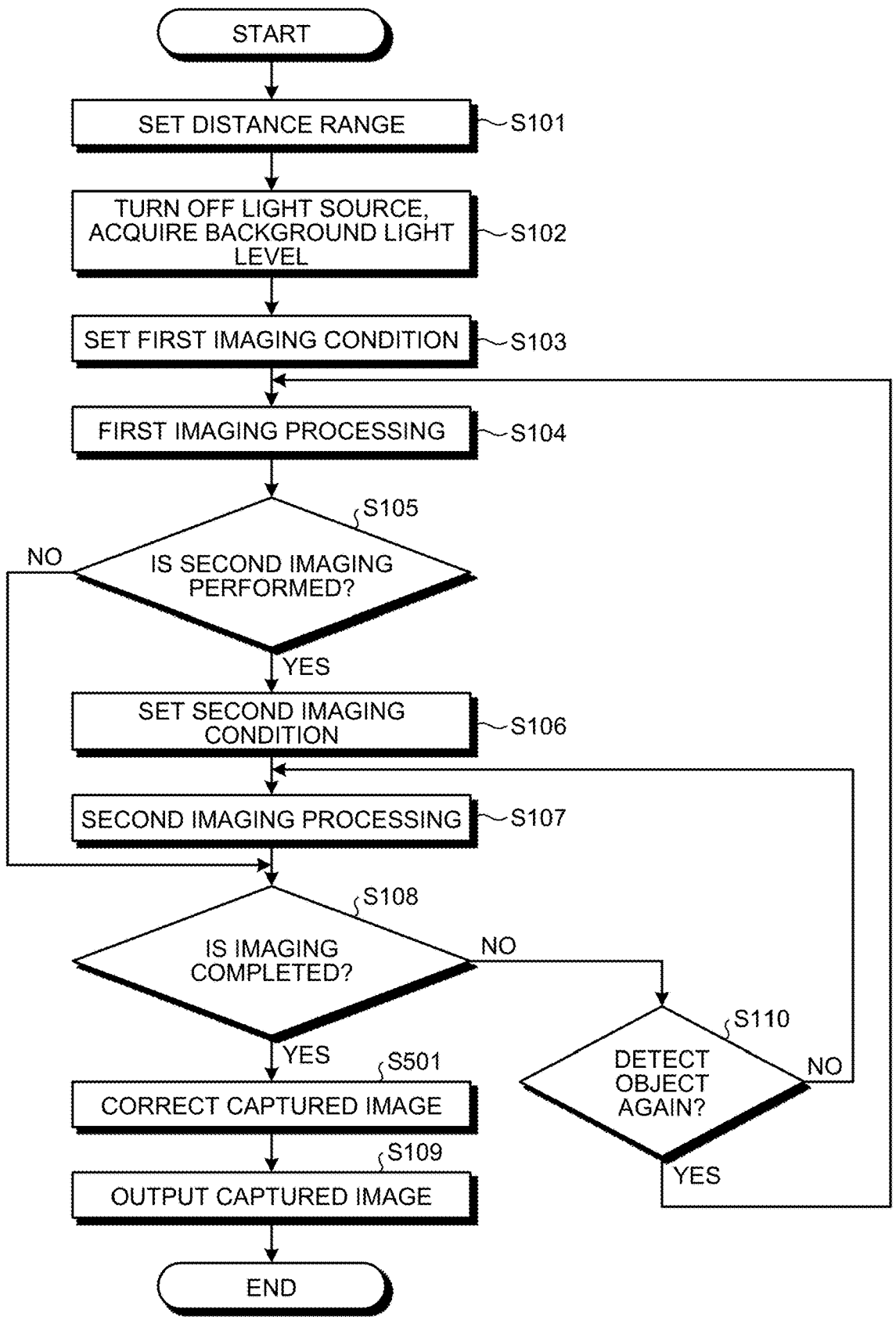
FIG. 39 is a flowchart illustrating another example of the flow of the imaging processing according to the embodiment of the present disclosure.

FIG. 39 is a flowchart illustrating another example of the flow of the imaging processing according to the embodiment of the present disclosure. The imaging processing illustrated in FIG. 39 is the same as the imaging processing illustrated in FIG. 30 except that the captured image is corrected in step S501 after it is determined in step S108 that the imaging is ended.

Figure 40:
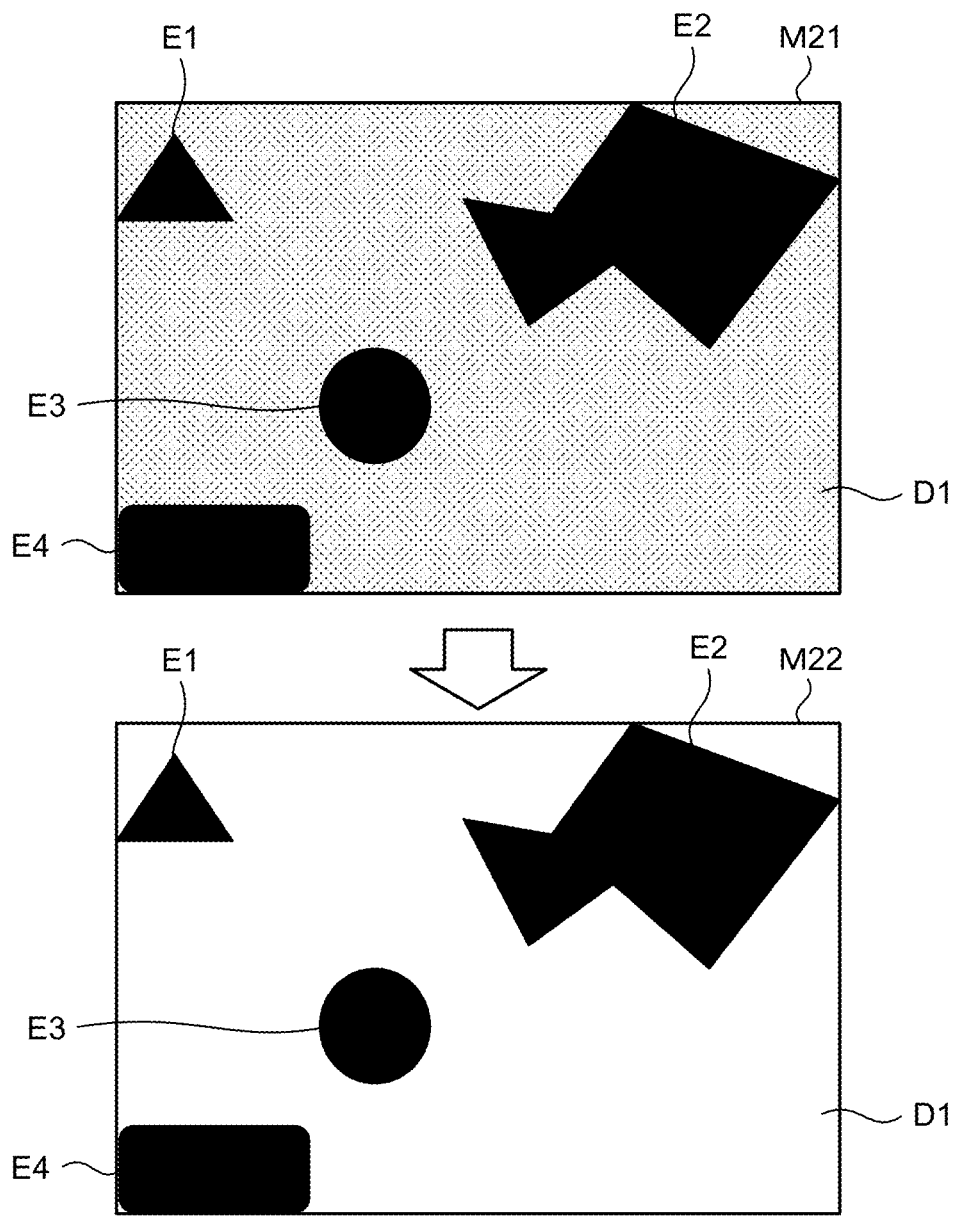
FIG. 40 is a diagram illustrating an example of correction of a captured image according to the embodiment of the present disclosure.

FIG. 40 is a diagram illustrating an example of correction of a captured image according to the embodiment of the present disclosure. As illustrated in the upper diagram of FIG. 40, the solid-state imaging device 100 captures an image of an imaging region including effective regions E1 to E4 including Enable pixels and an ineffective region D1 including Disable pixels, and acquires a captured image M21. At this time, the ineffective region D1 includes image data actually captured by the second pixel 110B. That is, the ineffective region D1 includes background data of the object ob (corresponding to the effective region E1 to E4).

The solid-state imaging device 100 corrects the ineffective region D1 of the captured image by replacing the data (pixel value) of the ineffective region D1 with a predetermined value. In a case where one pixel of the captured image is represented by 12 bits, the solid-state imaging device 100 generates a captured image M22 in which the data of the ineffective region is replaced with, for example, "FFF", as illustrated in the lower diagram of FIG. 40. Such correction can be performed, for example, by the second data processing unit 108B of the solid-state imaging device 100.

As described above, the solid-state imaging device 100 can facilitate the extraction of the object ob (effective regions E1 to E4) and reduce the processing load of the subsequent image processing by performing the correction to replace the background (ineffective region D1) of the captured image with the predetermined value.

It is noted that the correction of the captured image is not limited to the example described above. For example, the solid-state imaging device 100 may perform correction of cutting out a part of the captured image.

Figure 41:
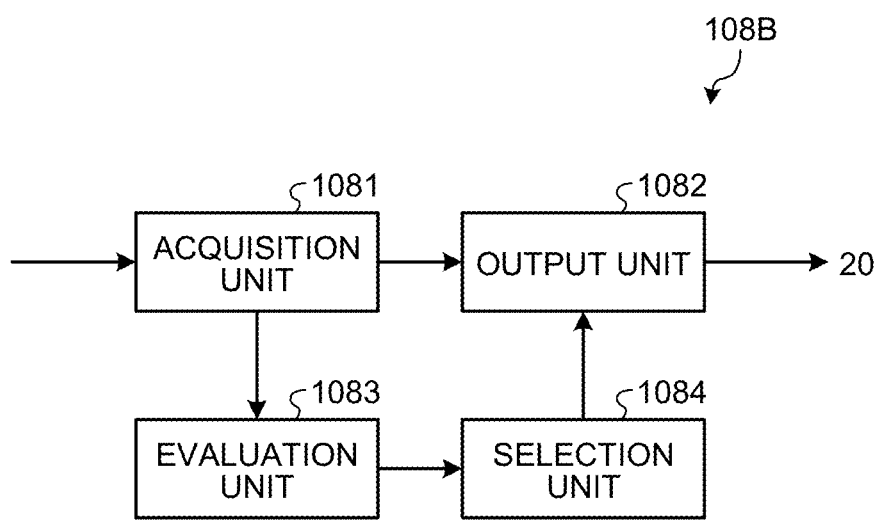
FIG. 41 is a block diagram illustrating a configuration example of a second data processing unit according to the embodiment of the present disclosure.

FIG. 41 is a block diagram illustrating a configuration example of the second data processing unit 108B according to the embodiment of the present disclosure. The second data processing unit 108B includes an acquisition unit 1081, an output unit 1082, an evaluation unit 1083, and a selection unit 1084.

The acquisition unit 1081 acquires the captured image from the second readout circuit 103B. The output unit 1082 outputs a region selected by the selection unit 1084 in the captured image to the processor 20 as an output image.

The evaluation unit 1083 performs image evaluation necessary for the selection of the output image by the selection unit 1084. For example, the evaluation unit 1083 calculates the area of the effective region included in the captured image and calculates the center of gravity of the effective region.

The selection unit 1084 selects the output image from the captured image based on the evaluation by the evaluation unit 1083. For example, the selection unit 1084 narrows down the captured image so that an extraction region including the effective region having the largest area among the plurality of effective regions is set as the output image. Alternatively, the selection unit 1084 may narrow down the captured image so that a region including the vicinity of the center of gravity of the effective region is set as the output image. For example, the selection unit 1084 sets the ROI so that the center of gravity of an ROI smaller than the captured image coincides with the center of gravity of the effective region, and selects the ROI as the output image.

As described above, in the solid-state imaging device 100, the selection unit 1084 selects the output image from the captured image based on the evaluation by the evaluation unit 1083. As a result, the data amount of the output image can be reduced.

<4.3. Setting of Second Imaging Condition>

In the above-described embodiment, the solid-state imaging device 100 sets the second imaging condition after the first imaging processing and executes the second imaging processing, but the present disclosure is not limited thereto. For example, the solid-state imaging device 100 may perform temporary imaging of the second imaging after the first imaging processing, and set the second imaging condition based on the result of the temporary imaging.

For example, in a case where the second imaging is performed after the object ob enters the distance range R0, there is a possibility that an optimum second imaging condition such as an exposure period or focus cannot be set depending on the object ob serving as a subject. Therefore, after the first imaging processing, the solid-state imaging device 100 temporarily performs the second imaging and then determines the second imaging condition. As a result, the solid-state imaging device 100 can set the second imaging condition according to the actual object ob.

Figure 42:
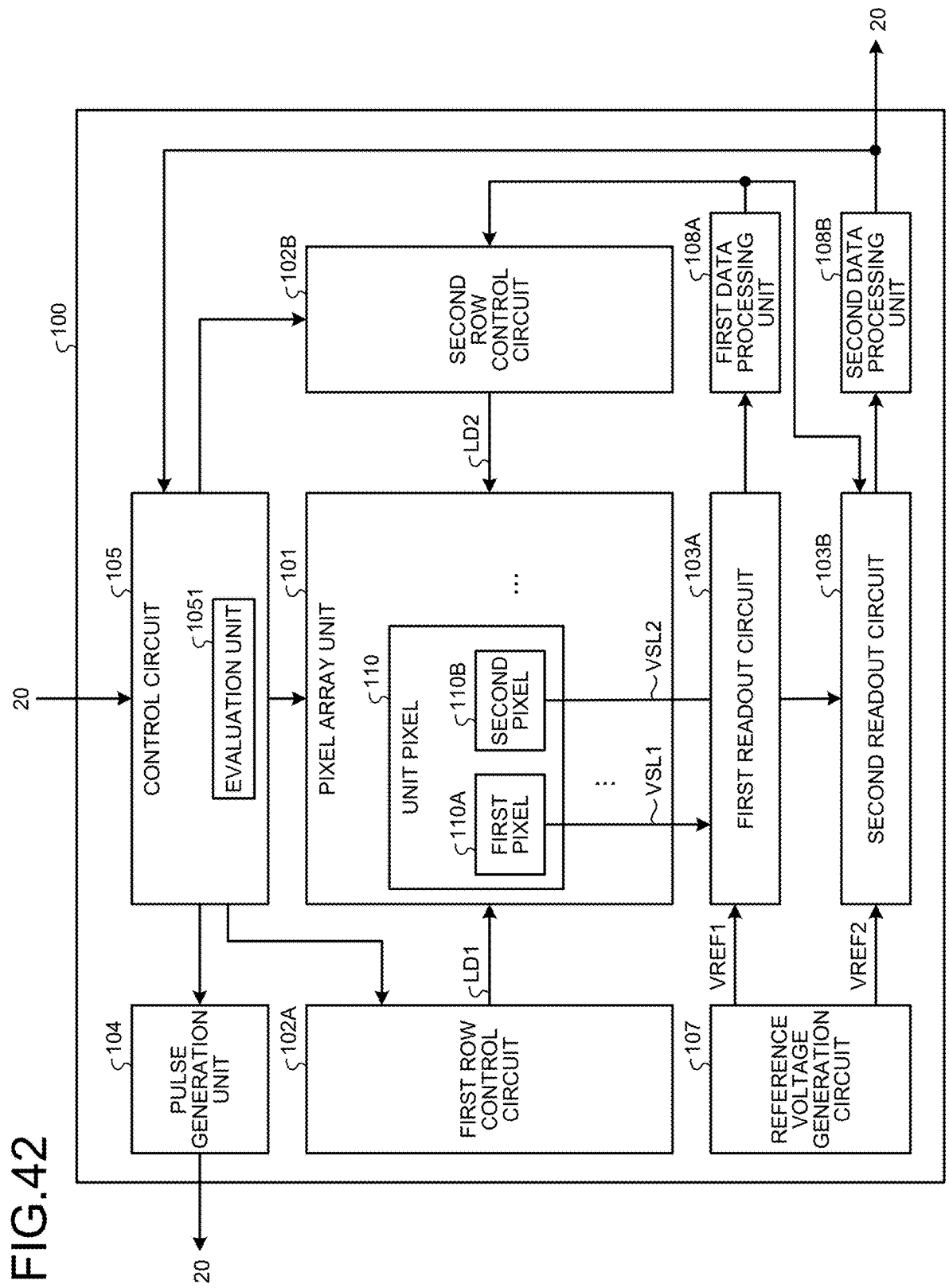
FIG. 42 is a block diagram illustrating another example of the configuration of the solid-state imaging device according to the embodiment of the present disclosure.

FIG. 42 is a block diagram illustrating another example of the configuration of the solid-state imaging device 100 according to the embodiment of the present disclosure. The solid-state imaging device 100 illustrated in FIG. 42 has the same configuration as the solid-state imaging device 100 illustrated in FIG. 11 except that the control circuit 105 includes an evaluation unit 1051.

The evaluation unit 1051 acquires the result of the temporary imaging from the second data processing unit 108B. The evaluation unit 1051 evaluates the brightness of the temporary imaging data and determines the exposure (accumulation) time of the second imaging. Alternatively, in a case where the second pixel 110B includes a phase difference pixel, the evaluation unit 1051 may perform focus adjustment using a pixel signal of the phase difference pixel.

The evaluation unit 1051 performs the second imaging (main imaging) under the second imaging condition by controlling each unit of the solid-state imaging device 100 according to the evaluation result.

Figure 43:
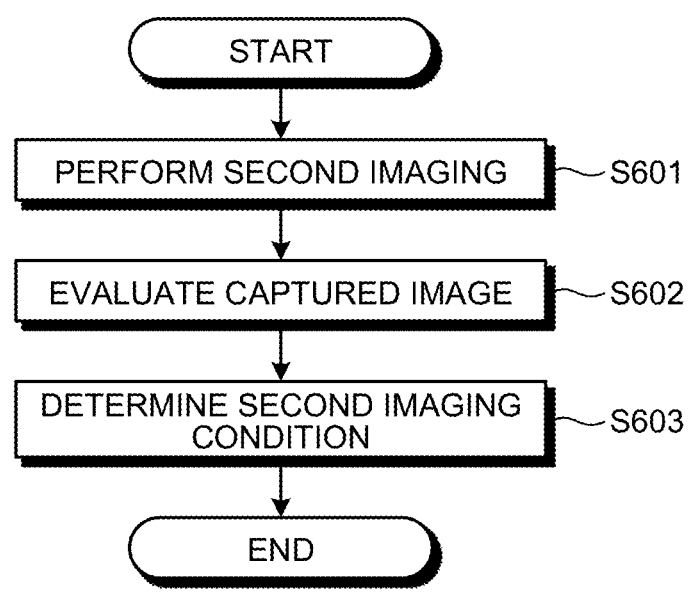
FIG. 43 is a flowchart illustrating a flow of determination processing of a second imaging condition according to the embodiment of the present disclosure.

FIG. 43 is a flowchart illustrating a flow of determination processing of the second imaging condition according to the embodiment of the present disclosure. For example, in a case where the second imaging condition is set in step S106 in FIG. 30, the solid-state imaging device 100 executes the determination processing illustrated in FIG. 43.

First, the solid-state imaging device 100 performs second imaging (step S601). Such imaging is temporary imaging. The imaging condition of the second imaging performed here may be a predetermined condition or may be a condition set according to the result of the first imaging processing.

Next, the solid-state imaging device 100 evaluates the captured image of the second imaging performed in step S601 (step S602). Such a captured image is a temporarily captured image obtained by temporary imaging.

The solid-state imaging device 100 determines the second imaging condition according to the evaluation result (step S603).

In this manner, the solid-state imaging device 100 can perform the second main imaging by setting the second imaging condition after performing the second temporary imaging by the second pixel 110B immediately before the second main imaging. As a result, the solid-state imaging device 100 can perform the second main imaging under an imaging condition suitable for the object ob. That is, the solid-state imaging device 100 can perform the second imaging by setting an appropriate second imaging condition even in so-called "standby imaging".

It is noted that the imaging range (ROI) of the temporary imaging and the imaging range (ROI) of the main imaging may be the same or different. For example, by making the imaging range of the temporary imaging smaller than that of the main imaging, the solid-state imaging device 100 can shorten the acquisition time of the temporarily captured image and shorten the time until the main imaging is performed. Furthermore, by setting the same imaging range in the temporary imaging and the main imaging, the solid-state imaging device 100 can set a more appropriate second imaging condition.

<4.4. Imaging Processing by Processor>

In the above-described embodiment, the solid-state imaging device 100 performs imaging processing, but the present disclosure is not limited thereto. For example, the processor 20 may perform at least a part of the imaging processing.

Figure 44:
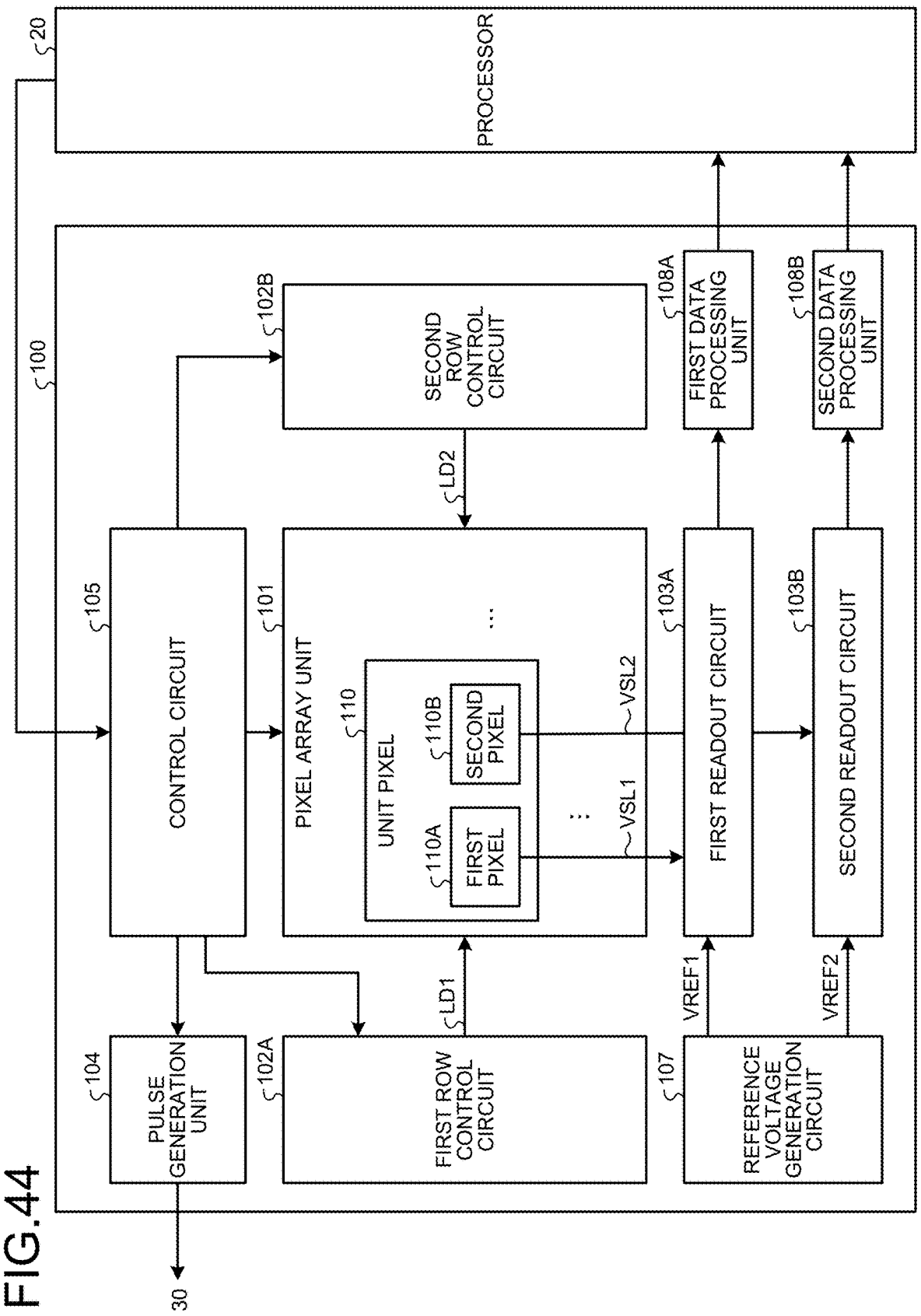
FIG. 44 is a block diagram illustrating another example of the configuration of the solid-state imaging device according to the embodiment of the present disclosure.

FIG. 44 is a block diagram illustrating another example of the configuration of the solid-state imaging device 100 according to the embodiment of the present disclosure. The solid-state imaging device 100 illustrated in FIG. 44 is different from the solid-state imaging device 100 illustrated in FIG. 11 in that the first data processing unit 108A outputs a first imaging result to the processor 20.

The processor 20 performs the imaging processing by controlling the solid-state imaging device 100 based on various data (first imaging result or the like) received from the solid-state imaging device 100. The processor 20 may execute all the imaging processing, or may execute a part of the imaging processing such as one of the first imaging processing and the second imaging processing.

As described above, the processor 20 executes at least a part of the imaging processing, so that the processing load of the solid-state imaging device 100 can be reduced.

5. Application Example

The technique according to the present disclosure (present technique) can be applied to various products. For example, the technique according to the present disclosure may be implemented as a device mounted on any type of moving body such as an automobile, an electric vehicle, a hybrid electric vehicle, a motorcycle, a bicycle, a personal mobility, an airplane, a drone, a ship, and a robot.

Figure 45:
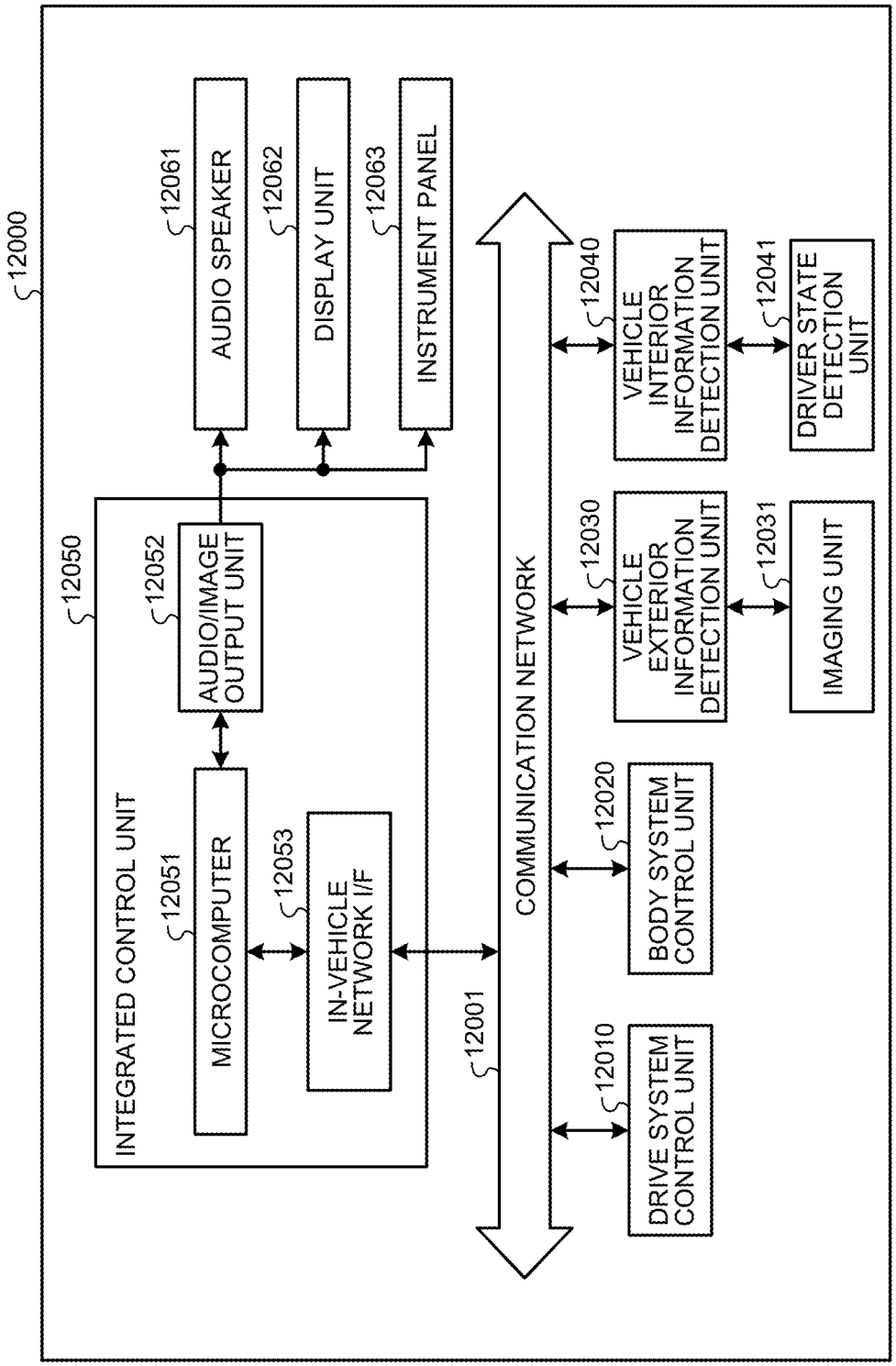
FIG. 45 is a block diagram illustrating an example of a schematic configuration of a vehicle control system.

FIG. 45 is a block diagram illustrating a schematic configuration example of a vehicle control system which is an example of a moving body control system to which the technique according to the present disclosure can be applied.

A vehicle control system 12000 includes a plurality of electronic control units connected to each other via a communication network 12001. In the example illustrated in FIG. 45, the vehicle control system 12000 includes a drive system control unit 12010, a body system control unit 12020, a vehicle exterior information detection unit 12030, a vehicle interior information detection unit 12040, and an integrated control unit 12050. Furthermore, as a functional configuration of the integrated control unit 12050, a microcomputer 12051, an audio/image output unit 12052, and an in-vehicle network interface (I/F) 12053 are illustrated.

The drive system control unit 12010 controls the operation of a device related to a drive system of a vehicle according to various programs. For example, the drive system control unit 12010 functions as a control device of a drive force generation device for generating a drive force of the vehicle such as an internal combustion engine or a drive motor, a drive force transmission mechanism for transmitting a drive force to wheels, a steering mechanism for adjusting a steering angle of the vehicle, a braking device for generating a braking force of the vehicle, and the like.

The body system control unit 12020 controls operations of various devices mounted on the vehicle body according to various programs. For example, the body system control unit 12020 functions as a control device of a keyless entry system, a smart key system, a power window device, or various lamps such as a head lamp, a back lamp, a brake lamp, a blinker, and a fog lamp. In this case, radio waves transmitted from a portable device that substitutes for a key or signals of various switches can be input to the body system control unit 12020. The body system control unit 12020 receives input of these radio waves or signals, and controls a door lock device, a power window device, a lamp, and the like of the vehicle.

The vehicle exterior information detection unit 12030 detects information on the outside of the vehicle on which the vehicle control system 12000 is mounted. For example, an imaging unit 12031 is connected to the vehicle exterior information detection unit 12030. The vehicle exterior information detection unit 12030 causes the imaging unit 12031 to capture an image of the outside of the vehicle, and receives the captured image. The vehicle exterior information detection unit 12030 may perform object detection processing or distance detection processing of a person, a vehicle, an obstacle, a sign, a character on a road surface, or the like based on the received image.

The imaging unit 12031 is an optical sensor configured to receive light and output an electric signal corresponding to the amount of received light. The imaging unit 12031 can output the electric signal as an image or can output the electric signal as distance measurement information. Furthermore, the light received by the imaging unit 12031 may be visible light or invisible light such as infrared rays.

The vehicle interior information detection unit 12040 detects information on the inside of the vehicle. For example, a driver state detection unit 12041 configured to detect a state of a driver is connected to the vehicle interior information detection unit 12040. The driver state detection unit 12041 includes, for example, a camera that images the driver, and the vehicle interior information detection unit 12040 may calculate a degree of fatigue or a degree of concentration of the driver or may determine whether or not the driver is dozing off based on the detection information input from the driver state detection unit 12041.

The microcomputer 12051 can calculate a control target value of the drive force generation device, the steering mechanism, or the braking device based on the information on the inside and outside of the vehicle acquired by the vehicle exterior information detection unit 12030 or the vehicle interior information detection unit 12040, and output a control command to the drive system control unit 12010. For example, the microcomputer 12051 can perform cooperative control for the purpose of implementing functions of an advanced driver assistance system (ADAS) including collision avoidance or impact mitigation of the vehicle, follow-up traveling based on an inter-vehicle distance, vehicle speed maintenance traveling, vehicle collision warning, vehicle lane departure warning, or the like.

Furthermore, the microcomputer 12051 controls the drive force generation device, the steering mechanism, the braking device, or the like based on the information on surroundings of the vehicle acquired by the vehicle exterior information detection unit 12030 or the vehicle interior information detection unit 12040, thereby performing cooperative control for the purpose of automatic driving or the like in which the vehicle autonomously travels without depending on the operation of a driver.

Furthermore, the microcomputer 12051 can output a control command to the body system control unit 12020 based on the vehicle exterior information acquired by the vehicle exterior information detection unit 12030. For example, the microcomputer 12051 can perform cooperative control for the purpose of preventing glare, such as switching from a high beam to a low beam, by controlling a headlamp according to the position of a preceding vehicle or an oncoming vehicle detected by the vehicle exterior information detection unit 12030.

The audio/image output unit 12052 transmits an output signal of at least one of a sound and an image to an output device capable of visually or audibly notifying an occupant of the vehicle or the outside of the vehicle of information. In the example of FIG. 45, an audio speaker 12061, a display unit 12062, and an instrument panel 12063 are illustrated as the output device. The display unit 12062 may include, for example, at least one of an on-board display and a head-up display.

Figure 46:
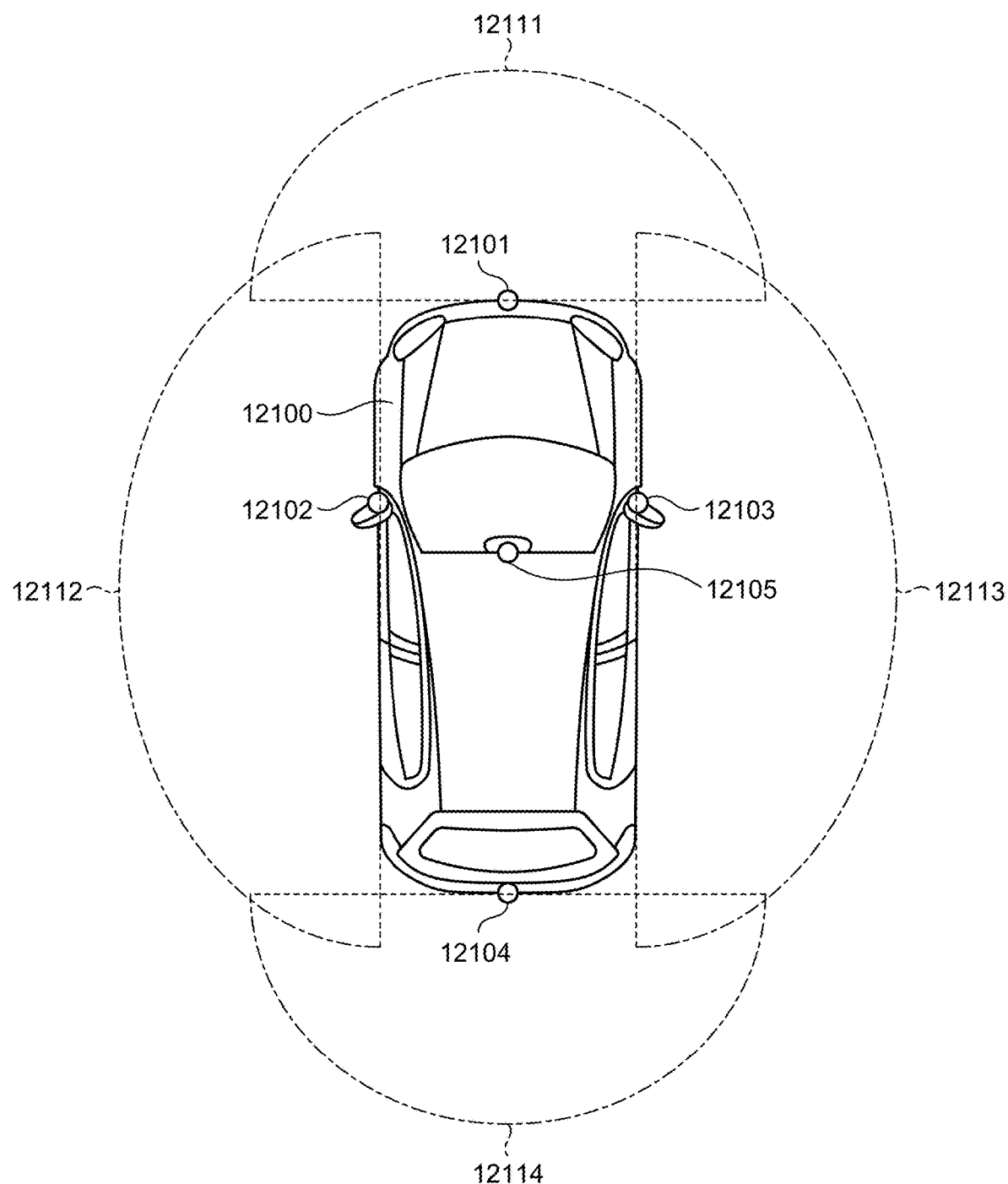
FIG. 46 is an explanatory diagram illustrating an example of an installation position of a vehicle exterior information detection unit and an imaging unit.

FIG. 46 is a diagram illustrating an example of an installation position of the imaging unit 12031.

In FIG. 46, imaging units 12101, 12102, 12103, 12104, and 12105 are included as the imaging unit 12031.

The imaging units 12101, 12102, 12103, 12104, and 12105 are provided, for example, at positions such as a front nose, a side mirror, a rear bumper, a back door, and an upper portion of a windshield in a vehicle interior of a vehicle 12100. The imaging unit 12101 provided at the front nose and the imaging unit 12105 provided at the upper portion of the windshield in the vehicle interior mainly acquire images in front of the vehicle 12100. The imaging units 12102 and 12103 respectively provided at the side mirrors mainly acquire images of the sides of the vehicle 12100. The imaging unit 12104 provided on the rear bumper or the back door mainly acquires an image behind the vehicle 12100. The imaging unit 12105 provided at the upper portion of the windshield in the vehicle interior is mainly used to detect a preceding vehicle, a pedestrian, an obstacle, a traffic light, a traffic sign, a lane, or the like.

It is noted that FIG. 46 illustrates an example of imaging ranges of the imaging units 12101 to 12104. An imaging range 12111 indicates an imaging range of the imaging unit 12101 provided at the front nose, imaging ranges 12112 and 12113 indicate imaging ranges of the imaging units 12102 and 12103 respectively provided at the side mirrors, and an imaging range 12114 indicates an imaging range of the imaging unit 12104 provided at the rear bumper or the back door. For example, by superimposing image data captured by the imaging units 12101 to 12104, an overhead view image of the vehicle 12100 viewed from above is obtained.

At least one of the imaging units 12101 to 12104 may have a function of acquiring distance information. For example, at least one of the imaging units 12101 to 12104 may be a stereo camera including a plurality of imaging elements, or may be an imaging element having pixels for phase difference detection.

For example, the microcomputer 12051 obtains a distance to each three-dimensional object in the imaging ranges 12111 to 12114 and a temporal change of the distance (relative speed with respect to the vehicle 12100) based on the distance information obtained from the imaging units 12101 to 12104, thereby extracting, as a preceding vehicle, a three-dimensional object traveling at a predetermined speed (for example, 0 km/h or more) in substantially the same direction as the vehicle 12100, in particular, the closest three-dimensional object on the traveling path of the vehicle 12100. Furthermore, the microcomputer 12051 can set an inter-vehicle distance to be secured in advance in front of the preceding vehicle, and can perform automatic brake control (including follow-up stop control), automatic acceleration control (including follow-up start control), and the like. As described above, it is possible to perform cooperative control for the purpose of automatic driving or the like in which the vehicle autonomously travels without depending on the operation of the driver.

For example, based on the distance information obtained from the imaging units 12101 to 12104, the microcomputer 12051 can classify three-dimensional object data regarding three-dimensional objects into a two-wheeled vehicle, an ordinary vehicle, a large vehicle, a pedestrian, and other three-dimensional objects such as utility poles, extract the three-dimensional object data, and use the three-dimensional object data for automatic avoidance of an obstacle. For example, the microcomputer 12051 identifies an obstacle around the vehicle 12100 as an obstacle that can be visually recognized by the driver of the vehicle 12100 and an obstacle that is difficult to be visually recognized. Then, the microcomputer 12051 determines a collision risk indicating a risk of collision with each obstacle, and when the collision risk is a set value or more and there is a possibility of collision, the microcomputer 12051 can perform driving assistance for collision avoidance by outputting an alarm to the driver via the audio speaker 12061 or the display unit 12062 or performing forced deceleration or avoidance steering via the drive system control unit 12010.

At least one of the imaging units 12101 to 12104 may be an infrared camera that detects infrared rays. For example, the microcomputer 12051 can recognize a pedestrian by determining whether or not a pedestrian is present in the captured images of the imaging units 12101 to 12104. Such pedestrian recognition is performed by, for example, a procedure of extracting feature points in the captured images of the imaging units 12101 to 12104 as infrared cameras, and a procedure of performing pattern matching processing on a series of feature points indicating an outline of an object to determine whether or not the object is a pedestrian. When the microcomputer 12051 determines that a pedestrian is present in the captured images of the imaging units 12101 to 12104 and recognizes the pedestrian, the audio/image output unit 12052 controls the display unit 12062 to superimpose and display a square contour line for emphasis on the recognized pedestrian. Furthermore, the audio/image output unit 12052 may control the display unit 12062 to display an icon or the like indicating a pedestrian at a desired position.

6. Summary

Although the embodiments and modifications of the present disclosure of the present disclosure have been described in detail with reference to the accompanying drawings, the technical scope of the present disclosure is not limited to such examples. It is obvious that a person having ordinary knowledge in the technical field of the present disclosure can conceive various modifications or changes within the scope of the technical idea described in the claims, and it is naturally understood that these also belong to the technical scope of the present disclosure.

In addition, the above-described embodiments and modifications can be appropriately combined within a range that does not contradict processing contents.

Furthermore, the effects described in the present specification are merely illustrative or exemplary, and are not restrictive. That is, the technique according to the present disclosure can exhibit other effects obvious to those skilled in the art from the description of the present specification together with or instead of the above effects.

It is noted that the following configurations also belong to the technical scope of the present disclosure.

(1)

A solid-state imaging device comprising:
    a pixel unit including a plurality of sets of a first pixel and a second pixel, the first pixel and the second pixel being arranged in a pixel region, the first pixel being configured to receive light other than visible light and the second pixel being configured to receive the visible light;
    a first acquisition unit configured to acquire a first signal from the first pixel; and
    a second acquisition unit configured to acquire a second signal from the second pixel when an object within a predetermined distance range is detected based on the first signal.

(2)

The solid-state imaging device according to (1), wherein the second acquisition unit acquires the second signal from the second pixel corresponding to an extraction region including the first pixel that has detected the object.

(3)

The solid-state imaging device according to (2), wherein the second acquisition unit acquires a signal having a predetermined value as the second signal output from the second pixel in the pixel region corresponding to the first pixel that has not detected the object within the predetermined distance range in the extraction region.

(4)

The solid-state imaging device according to (2) or (3), wherein the extraction region is a rectangular region.

(5)

The solid-state imaging device according to (2), wherein the second acquisition unit acquires the second signal from the second pixel corresponding to an extraction region corresponding to a correction region obtained by correcting a detection region corresponding to the first pixel that has detected the object.

(6)

The solid-state imaging device according to anyone of (1) to (5), wherein the first acquisition unit acquires the first signal generated by the first pixel in a second period after a first period has elapsed since a light source emitted light.

(7)

The solid-state imaging device according to (6), wherein the first period and the second period are periods according to the predetermined distance range of the object.

(8)

The solid-state imaging device according to (6) or (7), wherein the second acquisition unit acquires the second signal from the second pixel corresponding to an extraction region determined according to a comparison result between the first signal generated by the first pixel in the second period and a threshold value.

(9)

The solid-state imaging device according to anyone of (1) to (8), wherein the first acquisition unit acquires the first signal from the first pixel when the second acquisition unit acquires the second signal from the second pixel in an extraction region a plurality of times.

(10)

The solid-state imaging device according to anyone of (1) to (9), further comprising a setting unit configured to set an imaging condition by the second pixel based on the second signal acquired by the second acquisition unit immediately before.

(11)

The solid-state imaging device according to anyone of (1) to (10), further comprising an output selection unit configured to select the second signal so as to output the second signal of at least a partial region of the extraction region based on the second signal acquired by the second acquisition unit.

(12)

The solid-state imaging device according to anyone of (1) to (11), wherein the second pixel includes an organic photoelectric conversion film.

(13)

The solid-state imaging device according to anyone of (1) to (12), wherein at least a part of the second pixel included in the set overlaps the first pixel in a first direction.

(14)

An imaging system comprising:
a light source configured to emit light other than visible light; a solid-state imaging device; and a control unit configured to control the light source and the solid-state imaging device,
wherein the solid-state imaging device includes:
a pixel unit including a plurality of sets of a first pixel and a second pixel, the first pixel and the second pixel being arranged in a pixel region, the first pixel being configured to receive the light other than the visible light and the second pixel being configured to receive light of the visible light;
a first acquisition unit configured to acquire a first signal from the first pixel; and
a second acquisition unit configured to acquire a second signal from the second pixel when an object within a predetermined distance range is detected based on the first signal.

(15)

The imaging system according to (14),
wherein the second acquisition unit acquires the second signal from the second pixel corresponding to an extraction region including the first pixel that has detected the object, and
the solid-state imaging device further includes a control unit configured to determine the extraction region based on the first signal and to control the second acquisition unit so as to acquire the second signal in the determined extraction region.

(16)

The imaging system according to (14),
wherein the second acquisition unit acquires the second signal from the second pixel corresponding to an extraction region including the first pixel that has detected the object, and the control unit determines the extraction region based on the first signal and controls the second acquisition unit so as to acquire the second signal in the determined extraction region.

REFERENCE SIGNS LIST

1 IMAGING SYSTEM
20 PROCESSOR
30 LIGHT SOURCE
40 STORAGE UNIT
100 SOLID-STATE IMAGING DEVICE
101 PIXEL ARRAY UNIT
102 ROW CONTROL CIRCUIT
103 READOUT CIRCUIT
104 PULSE GENERATION UNIT
105 CONTROL CIRCUIT
107 REFERENCE VOLTAGE GENERATION CIRCUIT
108 DATA PROCESSING UNIT
110 UNIT PIXEL
110A FIRST PIXEL
110B SECOND PIXEL

The invention claimed is:

1. A solid-state imaging device, comprising:
a pixel array including a plurality of sets of a first pixel and a second pixel, wherein
the first pixel and the second pixel are in a pixel region of the pixel array,
the first pixel is configured to receive light different from visible light, and
the second pixel is configured to receive the visible light;
a first arithmetic processor configured to acquire a first signal from the first pixel based on the received light;
a control circuit configured to determine, based on the first signal, an object is outside a specific distance range associated with the solid-state imaging device, wherein the object is in an extraction region; and
a second arithmetic processor configured to acquire a second signal having a specific value from the second pixel based on the determination that the object is outside the specific distance range.

2. The solid-state imaging device according to claim 1, wherein the extraction region is a rectangular region.

3. The solid-state imaging device according to claim 1, further comprising a light source configured to emit the light, wherein
the first arithmetic processor is further configured to acquire the first signal from the first pixel in a second period after a first period has elapsed since the light source emitted the light.

4. The solid-state imaging device according to claim 3, wherein each of the first period and the second period is based on the specific distance range.

5. The solid-state imaging device according to claim 3, wherein
the first pixel is further configured to generate the first signal in the second period, and
the control circuit is further configured to determine the extraction region based on a comparison result between the first signal generated by the first pixel in the second period and a threshold value.

6. The solid-state imaging device according to claim 1, wherein
the second arithmetic processor is further configured to acquire a plurality of times the second signal from the second pixel in the extraction region, and the first arithmetic processor is further configured to acquire the first signal from the first pixel based on the second signal acquired for the plurality of times.

7. The solid-state imaging device according to claim 1, wherein the second pixel is further configured to set, immediately before a main imaging operation by the solid-state imaging device, an imaging condition based on the second signal.

8. The solid-state imaging device according to claim 1, further comprising an analog to digital converter configured to:
   select the second signal; and
   output the selected second signal of at least a partial region of the extraction region.

9. The solid-state imaging device according to claim 1, wherein the second pixel includes an organic photoelectric conversion film.

10. The solid-state imaging device according to claim 1, wherein at least a part of the second pixel overlaps the first pixel in a specific direction.

11. An imaging system, comprising:
   a light source configured to emit light different from visible light;
   a solid-state imaging device; and
   a control circuit configured to control the light source and the solid-state imaging device, wherein
   the solid-state imaging device includes:
      a pixel array including a plurality of sets of a first pixel and a second pixel, wherein
         the first pixel and the second pixel are in a pixel region of the pixel array,
         the first pixel is configured to receive the emitted light, and
         the second pixel is configured to receive the visible light; and
      a first arithmetic unit configured to acquire a first signal from the first pixel based on the received light,
   the control circuit is further configured to:
      determine, based on the first signal, an object is within a specific distance range associated with the solid-state imaging device; and
      determine an extraction region based on the first signal,
   the extraction region includes the object,
   the solid-state imaging device further includes a second arithmetic processor configured to acquire a second signal from the second pixel based on the determination that the object is within the specific distance range, and
   the control circuit is further configured to control the second arithmetic processor to acquire the second signal in the determined extraction region.

12. A solid-state imaging device, comprising:
   a pixel array including a plurality of sets of a first pixel and a second pixel, wherein
      the first pixel and the second pixel are in a pixel region of the pixel array,
      the first pixel is configured to receive light different from visible light, and
      the second pixel is configured to receive the visible light;
   a first arithmetic processor configured to acquire a first signal from the first pixel based on the received light;
   a control circuit configured to determine, based on the first signal, an object is within a specific distance range associated with the solid-state imaging device; and
   a second arithmetic processor configured to acquire a second signal from the second pixel based on the determination that the object is within the specific distance range, wherein
      the second pixel is further configured to set, immediately before a main imaging operation by the solid-state imaging device, an imaging condition based on the acquired second signal.

\* \* \* \* \*